United States Patent
Kato et al.

(10) Patent No.: US 6,415,200 B1
(45) Date of Patent: *Jul. 2, 2002

(54) APPARATUS AND METHOD FOR FEEDBACK-ADJUSTING WORKING CONDITION FOR IMPROVING DIMENSIONAL ACCURACY OF PROCESSED WORKPIECES

(75) Inventors: Chisato Kato; Takahiro Kobayashi; Kazuo Kitao, all of Toyota (JP)

(73) Assignee: Toyota Jidosha Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/016,979

(22) Filed: Feb. 12, 1993

(30) Foreign Application Priority Data

| Feb. 14, 1992 | (JP) | 4-061305 |
|---|---|---|
| Feb. 14, 1992 | (JP) | 4-061306 |
| May 26, 1992 | (JP) | 4-158787 |
| Aug. 11, 1992 | (JP) | 4-235402 |
| Sep. 22, 1992 | (JP) | 4-278146 |
| Nov. 16, 1992 | (JP) | 4-329985 |
| Nov. 16, 1992 | (JP) | 4-329986 |
| Nov. 16, 1992 | (JP) | 4-329987 |
| Dec. 25, 1992 | (JP) | 4-359342 |
| Dec. 25, 1992 | (JP) | 4-359343 |
| Dec. 26, 1992 | (JP) | 4-358239 |
| Dec. 26, 1992 | (JP) | 4-358240 |
| Dec. 28, 1992 | (JP) | 4-360111 |

(51) Int. Cl.$^7$ ............................ G06F 19/00
(52) U.S. Cl. .................. 700/193; 700/78; 700/108; 702/84
(58) Field of Search ................. 364/468, 148, 364/149, 150, 474.21, 474.2, 474.35, 551.01, 551.02, 552; 700/193, 108, 78; 702/84

(56) References Cited

U.S. PATENT DOCUMENTS 4,320,463 A * 3/1982 Himmelstein ............ 364/552
4,719,586 A * 1/1988 Moyer et al. ............ 364/468

(List continued on next page.)

FOREIGN PATENT DOCUMENTS

| AU | 291554 | 2/1966 |
|---|---|---|
| AU | 31924 | 1/1968 |

(List continued on next page.)

OTHER PUBLICATIONS

European Search Report.
Automation, vol. 35, No. 10, pp. 74–75.
European Search Report dated Jul. 8, 1997.

Primary Examiner—Paul P. Gordon
Assistant Examiner—Sheela S. Rao
(74) Attorney, Agent, or Firm—Finnegan, Henderson, Farabow, Garrett & Dunner, L.L.P.

(57) ABSTRACT

A feedback compensating apparatus for adjusting the working condition of a working machine of a working system adapted to process working portions of successive workpieces under control of a machine controller, which determines the working condition from an extraneous signal. The apparatus is used with the controller and a measuring device for measuring the dimensions of the processed working portions of the workpieces, and includes a device for obtaining dimensional data based on outputs of the measuring device during and/or after a working operation of the machine on each workpiece. The dimensional data include a dimensional error of the processed working portions, and a variable indicative of a tendency of change in the dimensional error. The apparatus further includes a device for determining the extraneous signal based on the dimensional data, and applying the signal to the machine controller to adjust the working condition of the machine. Also disclosed is a method of processing workpieces using the apparatus.

45 Claims, 49 Drawing Sheets

U.S. PATENT DOCUMENTS

| | | | | |
|---|---|---|---|---|
| 4,829,717 A | * | 5/1989 | Pozzetti | 51/165.76 |
| 4,864,490 A | | 9/1989 | Nomoto et al. | 364/157 |
| 4,887,221 A | * | 12/1989 | Davis et al. | 364/474.21 |
| 4,945,685 A | * | 8/1990 | Kajitane et al. | 51/165.93 |
| 5,111,404 A | * | 5/1992 | Kotani | 364/149 |
| 5,191,638 A | * | 3/1993 | Wakami et al. | 395/51 |
| 5,196,997 A | * | 3/1993 | Kurtzberg et al. | 364/468 |

FOREIGN PATENT DOCUMENTS

| | | |
|---|---|---|
| EP | 0 412 795 | 8/1990 |
| EP | 431572 A2 | 6/1991 |
| EP | 443552 A2 | 8/1991 |
| EP | 469471 A2 | 2/1992 |

* cited by examiner

FIG. 6
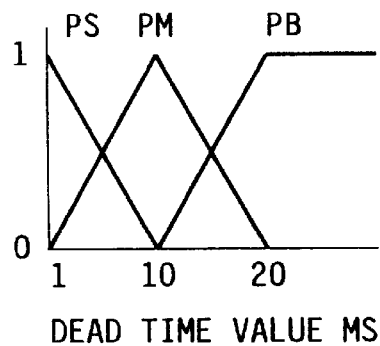
DEAD TIME VALUE MS
FIG. 7
| DATA STORED IN AUXILIARY MEMORY 32 | | | | |
|---|---|---|---|---|
| MEASURED VALUES | MOVING AVERAGES | PROVISIONAL COMPENSATING VALUES | FINAL COMPENSATING VALUES | APPLIED FUZZY RULES |
| X0<br>X1<br>X2<br>⋮<br>Xi<br>⋮ | P0<br>P1<br>P2<br>⋮<br>Pi<br>⋮ | U0<br>U1<br>U2<br>⋮<br>Ui<br>⋮ | U0*<br>U1*<br>U2*<br>⋮<br>Ui*<br>⋮ | ⋮<br>⋮<br>⋮<br>⋮<br>⋮<br>⋮ |
FIG. 18
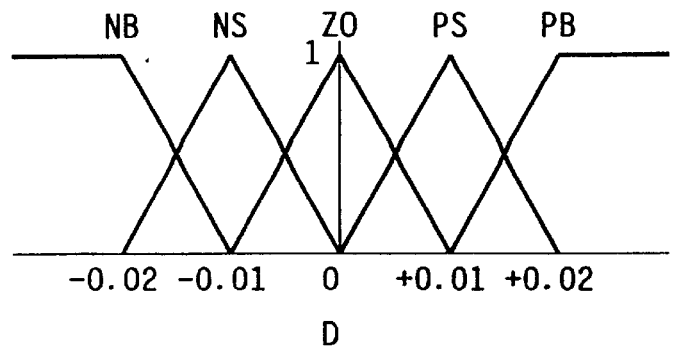

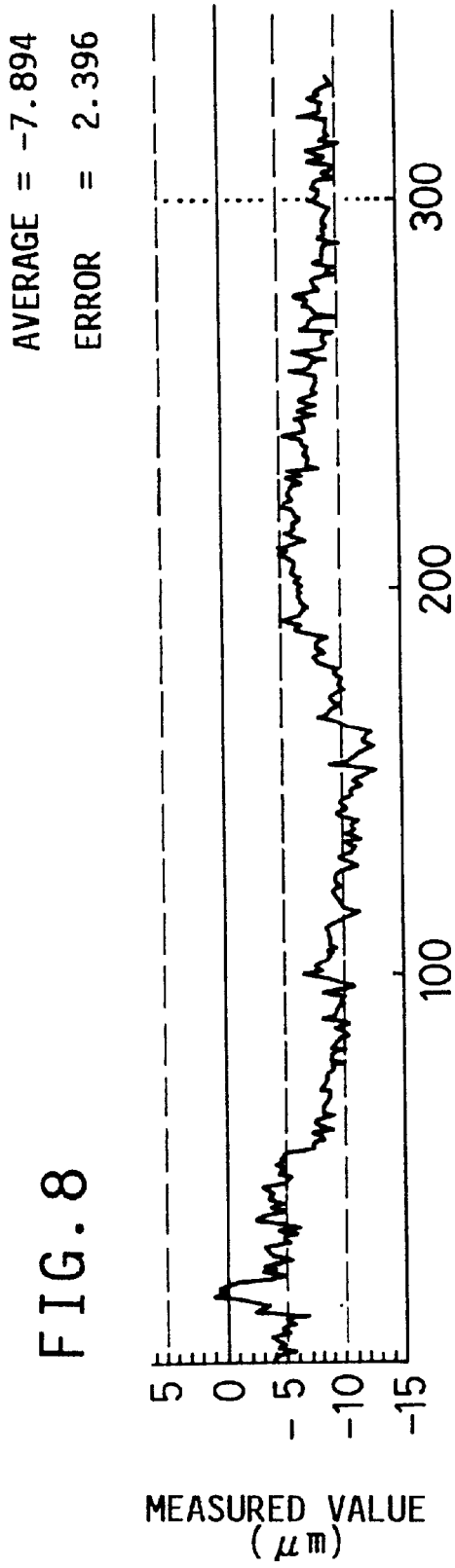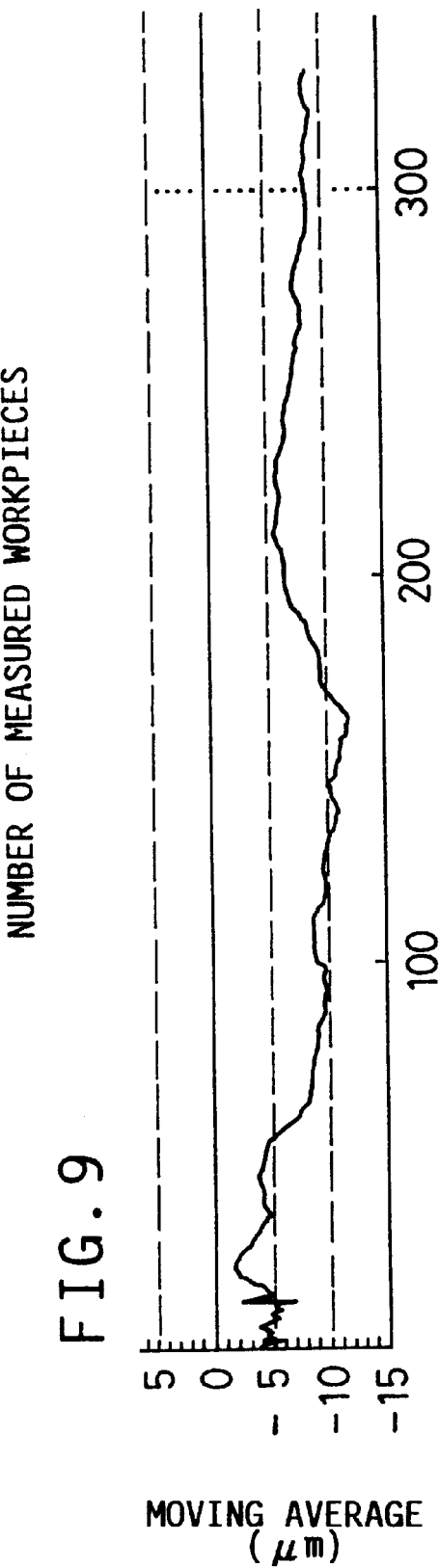
FIG. 8
FIG. 9

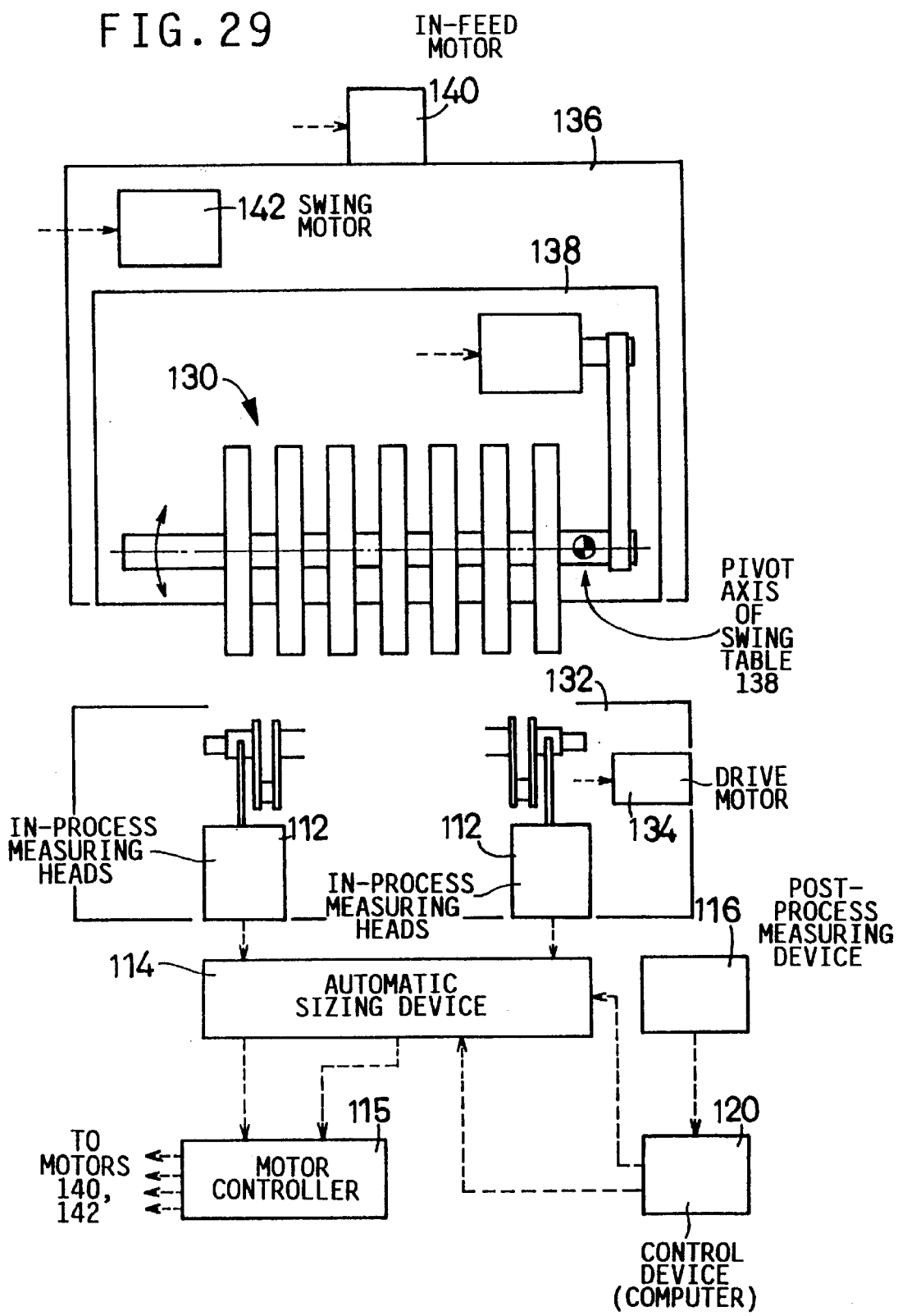

K : NUMBER OF MEASURED VALUES TO OBTAIN MOVING AVERAGE

APPARATUS AND METHOD FOR FEEDBACK-ADJUSTING WORKING CONDITION FOR IMPROVING DIMENSIONAL ACCURACY OF PROCESSED WORKPIECES

BACKGROUND OF THE INVENTION

1. Field of the Invention

The present invention relates in general to a feedback compensating apparatus used with a controller for a working machine (e.g., a metal working machine such as a grinding machine), which apparatus is adapted to adjust the working condition of the working machine by feeding back to the controller a compensating signal or data obtained during and/or after a working operation on the workpiece, so that the controller controls the working machine so as to improve the dimensional accuracy of the workpiece processed by the machine. More particularly, the present invention is concerned with techniques for improving the accuracy of adjustment of the working condition by the compensating apparatus.

2. Discussion of the Prior Art

For assuring high dimensional accuracy of processed portions of a workpiece after the workpiece is machined, ground or otherwise processed, there are available various feedback control methods such as an in-process control method, a post-process control method, and a hybrid control method. These control methods are practiced, for example, to finish inner cylindrical surfaces of cylinder bores formed in cylinder blocks of an engine of a motor vehicle, or outer cylindrical surfaces of a crankshaft of such engine, with high precision, so that the dimension such as the inside diameter of the finished cylinder bores or outside diameter of ground journals of the crankshaft is as close to the nominal value as possible.

The in-process control employs an in-process measuring device for measuring the dimension of the working portion of the workpiece during a working operation on the workpiece, so that the working operation is terminated when the measured dimension coincides with the nominal value.

Usually, the in-process control is based on an assumption that the desired or nominal dimension is obtained when the actually measured dimension reaches a reference value corresponding to the nominal dimension. To this end, the dimension of the working portion of the workpiece is continuously measured, and the measured dimension is compared with the reference value, to determine the moment when the actually measured dimension becomes equal to the reference value.

The post-process control employs a post-process measuring device for measuring the dimension of the working portion of the workpiece after the working portion has been processed or finished. A difference of the actually measured dimension from the nominal value, namely, a dimensional error of the finished workpiece is fed back to the controller for the working machine, so that the working data such as numerical control data (NC data) subsequently used by the machine for effecting the working operation on the following workpiece or workpieces are suitably adjusted so as to eliminate or reduce the dimensional error.

The post-process measuring device does not necessarily acts on the workpiece or its working portion immediately after the appropriate working operation, but may operate in a mode in which the measurement is effected a given length of time after the working operation, during which the other working portions or other workpieces are machined or otherwise processed.

The hybrid control, which is a combination of the in-process and post-process control methods, is adapted to feed back the dimensional error of the processed workpieces obtained by the measurement by the post-process measuring device, to compensate the reference value used in the in-process control, for zeroing the post-process dimensional error.

However, the known control methods indicated above and the apparatus to practice these known methods suffer from a problem that the control logics, rules and programs used in the known systems do not permit sufficiently high accuracy of adjustment of the working condition of the working machine. One presumed reason for the insufficient accuracy in the prior art lies in the mere use of the dimensional error per se to adjust the working condition, whereas various other factors or parameters affect the actual dimensions of the working portions of the workpieces and should be taken into account for improved accuracy of compensation of the working condition to eliminate the dimensional error.

SUMMARY OF THE INVENTION

It is therefore a first object of the present invention to provide a feedback compensating apparatus for use with machine control means of a working system, which apparatus assures improved accuracy of adjustment of the working condition of the working machine of the system, with suitable factors taken into account to determine a compensating signal to adjust the working condition.

It is a second object of the present invention to provide a method of processing the workpiece with high precision, while adjusting the working condition of the working machine, with suitable factors taken into account so as to assure improved dimensional accuracy of the processed workpiece.

The above first object may be achieved according to a first aspect of this invention, which provides a feedback compensating apparatus for a working system including (a) a working machine for performing a working operation on each of at least one working portion of each of a plurality of workpieces, to process each working portion as desired, such that working operations on the plurality of the workpieces take place successively one after another, (b) machine control means for determining a working condition of the working machine on the basis of an extraneous signal, and controlling the working machine according to the determined working condition, and (c) a measuring device for measuring actual dimensions of the working portions of the workpieces processed or under processing by the working machine, the feedback compensating apparatus being used with the machine control means and the measuring device, the apparatus comprising: (i) data obtaining means for obtaining dimensional data on the basis of outputs of the measuring device during at least one of a first period and a second period following the first period, the working operation on each working portion being performed during the first period, the dimensional data including a dimensional error of the working portions of the workpieces, and a variable indicative of a tendency of change in the dimensional error of the workpieces; and (ii) compensating means for determining a compensating signal as the extraneous signal on the basis of the dimensional data, and applying the compensating signal to the machine control means, to adjust the working condition of the working machine.

In the feedback compensating apparatus of the present invention constructed as described above, the working condition of the machine is adjusted on the basis of not only the dimensional error of the processed working portions of the workpieces, but also the tendency of change in the dimensional error. The use of a variable indicative of the actual change in the dimensional error in addition to the dimensional error makes it possible to more accurately estimate the actual working condition of the machine, than the use of only the dimensional error. Thus, the present compensating apparatus permits improved adequacy of the compensating signal used to adjust the working condition for enhanced dimensional accuracy of the processed working portions of the workpieces.

The principle of the present invention described above is applicable to various types and modes of operation of a working system, which include (1) a configuration wherein a plurality of workpieces each having only one working portion are successively processed one after another by a single working tool, (2) a configuration wherein a plurality of workpieces each having a plurality of working portions are successively processed, such that the different working portions on each workpiece are successively processed by a single working tool, and (3) a configuration wherein a plurality of workpieces each having a plurality of working portions are successively processed, such that the different working portions on each workpiece are processed by respective working tools, either successively or simultaneously.

In the third configuration indicated at (3) above, the present invention is applicable to all the working portions of each workpiece, such that the compensating signal is determined for each one of the different working portions of the same workpiece. Where the working portions of each workpiece have substantially the same shape and size, however, the dimensional data may be obtained for only a selected one or ones of the working portions, but not for all the working portions. In this case, the compensating signals for the non-selected working portions are determined by utilizing the compensating signal or signals actually determined based on the dimensional data on the selected working portions.

The term "working portion" used herein may be a cylindrical surface of the workpiece which has the same diameter over the entire axial length, or each of a plurality of coaxial cylindrical surfaces of the workpiece which have different diameters at respective axial positions. In the former case, the cylindrical surface as the working portion has only one "dimension" within the meaning of the present invention. In the latter case, each of the cylindrical surfaces having different diameters has the "dimension".

The term "to adjust the working condition" used herein is interpreted to mean any adjustment which eventually causes a change in the working condition of the machine, and which may be a direct adjustment of a specific parameter that determines the working condition, or an indirect adjustment of a parameter whose change will result in a change in the working condition.

The term "compensating signal" used herein is interpreted to mean a signal to be fed from the compensating means to the machine control means, which signal may be a signal indicative of an amount of adjustment of the currently established working condition of the machine, or a signal indicating that the actually measured dimensional error of the workpiece or the actually obtained tendency of change in the dimensional error is not held within a tolerable range. In the former case, the compensating means may be adapted to determine a compensating value on the basis of at least the dimensional error and the variable indicative of the tendency of change in the dimensional error, and apply to the machine control means the compensating signal indicative of the compensating value, so that the working condition of the machine is adjusted according to the compensating value. In the latter case, the compensating means may be adapted to determine on the basis of the dimensional error and the variable, whether the dimensional error of the workpiece is held within the tolerable range or not, and further adapted to apply the compensating signal to the machine control means when the dimensional error is outside the tolerable range, so that the working condition is adjusted by a predetermined amount according to the compensating signal. In this case, the compensating means may be arranged to produce the compensating signal each time the excessive dimensional error of the workpiece is detected, or when the excessive dimensional error is detected two or more successive times. Alternatively, the machine control means may be adapted to adjust the working condition each time the compensating signal is received from the compensating means, or when the two or more successive compensating signals are received.

According to one form of the present invention, the measuring device includes a post-process measuring device for measuring the actual dimensions of the processed working portions of the workpieces during the second period, and the working system further includes an in-process measuring device for measuring the actual dimensions of the working portions during the first period. Further, the data obtaining means obtains, as the dimensional error, differences between the actual dimensions of the processed working portions measured by the post-process measuring device and a nominal value of the working portions. The data obtaining means further obtains a variable indicative of a tendency of change in the differences. The compensating means determines the compensating signal on the basis of the differences and the variable indicative of the tendency of change in the differences, and applies the compensating signal to the machine control means so as to adjust a reference value which is set in the machine control means as the working condition, so that an output of the in-process measuring device is compared with the reference value as adjusted according to the compensating signal. The working operations of the machine are terminated when the output of the in-process measuring device coincides with the adjusted reference value.

The above arrangement is adapted to effect a semi-hybrid control of the working condition of the machine, wherein the dimensional data on processed working portions or workpieces are used to adjust the working condition of the machine for subsequently processing the following working portions or the following workpieces. In this semi-hybrid control, the in-process measuring device temporarily functions as if it were a post-process measuring device.

However, the principle of the present invention may be embodied as a feedback compensating apparatus adapted to effect an in-process control of the working condition of the machine. In this case, the measuring device is an in-process measuring device, and the data obtaining means obtains the dimensional error in the form of differences between the actual dimensions of the individual working portions measured by the in-process measuring device and the nominal dimension of the working portions, while the working operation is in progress on each working portion. The data obtaining means also obtains the tendency of change in the obtained dimensional error (above-indicated differences) in the process of the working operation on each working portion. The compensating means determines the compensating signal on the basis of the dimensional error and the tendency of change in the dimensional error, so that the working condition (e.g., a feeding amount or rate of the working tool or tools) of the machine is adjusted during the working operation on the working portion whose dimensional data are obtained based on the output of the in-process measuring device.

The present invention may also be embodied as a feedback compensating apparatus adapted to effect a post-process control of the working condition of the machine. In this case, the measuring device is a post-process measuring device for measuring the dimensions of the processed working portions of the workpieces, and the data obtaining means obtains the dimensional error and tendency of change in the dimensional error of the processed working portions, on the basis of the output of the post-process measuring device. The compensating means determines the compensating signal based on the dimensional error and the tendency of change, so that the working condition of the machine in the form of numerical data, for example, is adjusted according to the compensating signal fed back from the compensating means.

According to another form of the present invention, the compensating means determines the compensating signal in the form of successive compensating values representative of respective amounts of adjustment of the working condition, on the basis of the dimensional data on the working portions successively processed by the machine. In this form of the invention, the compensating means comprises determining means for determining the successive compensating values such that a present one of the successive compensating values is determined on the basis of the dimensional data currently obtained by the data obtaining means, and at least one preceding compensating value of the successive compensating values which precedes the present one compensating value. For instance, the determining means may be adapted to determine a present provisional compensating value as the present one of the successive compensating values on the basis of the dimensional error and the variable indicative of the tendency of change in the dimensional error, and adjust the present provisional compensating value into a present final compensating value such that the present final compensating value lies on a line which is determined by the present provisional compensating value and a plurality of preceding provisional compensating values which precede the present provisional compensating value, the line assuring a gradual change in the amounts of adjustment of the working condition.

The above form of the invention is based on a general tendency that the dimensional error of the processed working portions of the different workpieces or the same workpiece changes gradually without a sudden or abrupt change, as the number of the workpieces increases or as the working operation on the same workpiece progresses. To improve the dimensional accuracy of the processed working portions, therefore, it is desirable that the compensating value which determines the amount of adjustment of the working condition of the machine gradually changes with a gradual change in the dimensional error. In this respect, the present compensating value is preferably determined on the basis of not only the dimensional data (dimensional error and the tendency of its change) but also at least one preceding compensating value which was used previously to adjust the working condition. The present arrangement permits increased accuracy of adjustment of the working condition by the feedback compensating apparatus.

While the present final compensating value described above is determined by adjusting the present provisional compensating value based on the preceding compensating values (preceding provisional compensating values), the present final compensating value may be obtained by adjusting the present provisional compensating value on the basis of the preceding final compensating values. Alternatively, the present final compensating value may be obtained directly on the basis of the dimensional data and at least one preceding final compensating value.

According to a further form of the invention described above, the data obtaining means obtains on the basis of the outputs of the measuring device, the dimensional error, a first variable indicative of the tendency of change in the dimensional error, and a second variable indicative of a tendency of change in the first variable, during at least one of the first and second periods. This arrangement permits more adequate adjustment of the working condition, owing to the additional use of the second variable which accurately reflects an actual change in the dimensions of the processed workpieces.

The second object indicated above may be achieved also according to the first aspect of this invention, which provides a method of processing at least one working portion provided on each of a plurality of workpieces, such that the workpieces are successively processed one after another by a working machine, comprising the steps of: (i) obtaining dimensional data including a dimensional error of the processed working portions of the workpieces, and a variable indicative of a tendency of change in the dimensional error of the workpieces, during at least one of a first period during which a working operation on each of the at least one working portion is performed and a second period following the first period; and (ii) feeding back the dimensional data to the working machine, to adjust a working condition of the machine on the basis of the dimensional data, for subsequent working operations on the working portions of the workpieces according to the adjusted working condition.

The first object may also be achieved according to a second aspect of the present invention, which provides a feedback compensating apparatus for a working system including (a) a working machine for successively processing a plurality of workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, the feedback compensating apparatus being used with the machine control means and the measuring device, the apparatus comprising (i) data obtaining means for obtaining dimensional data on the basis of outputs of the measuring device, and (ii) compensating means for determining a compensating signal as the extraneous signal on the basis of the dimensional data. The dimensional data include a dimensional error of the processed workpieces, and a variable indicative of a tendency of change in the dimensional error of the workpieces. The data obtaining means obtains a present value of an estimated dimension of the working portions of the workpieces on the basis of a predetermined first number of successive measured values represented by the outputs of the measuring device, when each of the workpieces is measured by the measuring device, the predetermined number of successive measured values consisting of a currently measured value currently obtained by the measuring device and at least one measured value which precedes the currently measured value. The data obtaining means further obtains a present dimensional error value which is a difference of the present value of the estimated dimension from a nominal dimension of the working portion of each workpiece. The data obtaining means obtains a present value of the variable indicative of the tendency of change in the dimensional error, on the basis of a predetermined second number of successive dimensional error values, when the present dimensional error value is obtained, the predetermined number of successive dimensional error values consisting of the present dimensional error value and at least one error value which precedes the present dimensional error value. The data obtaining means includes at least one of dimension estimating means and variable obtaining means. The dimension estimating means obtains the present value of the estimated dimension in a standard manner when the number of the successive measured values currently available is not smaller than the predetermined first number, and in a special manner different from the standard manner, when the number of the successive measured values currently available is smaller than the predetermined first number. The variable obtaining means obtains the present value of the variable in a standard manner when the number of the successive dimensional error values currently available is not smaller than the predetermined second number, and in a special manner different from the standard manner for the variable, when the number of the successive dimensional error values currently available is smaller than the predetermined second number. The compensating means applies the compensating signal to the machine control means, to adjust the working condition of the working machine.

In the feedback compensating apparatus constructed according to the second aspect of this invention described above, the data obtaining means includes the dimension estimating means and/or the variable obtaining means which operate as described above. Namely, when the number of the successive measured values of the workpieces currently available to obtain the present value of the estimated dimension is smaller than the predetermined number, the dimension estimating means operates in a special mode in which the present value of the estimated dimension is obtained in the special manner different from the standard manner practiced when the number of the currently available successive measured values is equal to or larger than the predetermined number. When the number of the successive dimensional error values currently available to obtain the present value of the variable indicative of the tendency of change in the dimensional error is smaller than the predetermined number, the variable obtaining means operates in a special mode in which the present value of the variable is obtained in the special manner different from the standard manner practiced when the number of the currently available successive dimensional error values is equal to or larger than the predetermined number.

According to the above arrangement, the estimated dimension of the processed workpieces can be obtained even when the number of the currently available successive measured values is smaller than the required number, if the the data obtaining means is provided with the dimension estimating means. Similarly, the variable indicated above can be obtained even when the number of the currently available successive dimensional error values is smaller than the required number, if the data obtaining means is provided with the variable obtaining means. Accordingly, the provision of the dimension estimating means and/or the variable obtaining means effectively reduces or eliminates a time during which it is impossible to determine the compensating signal on the basis of the dimensional data, due to shortage of the currently available data on the measured dimensions of the workpieces and the variable indicative of the tendency of change in the dimensional error.

The above second object may also be achieved also according to the second aspect of the present invention, which provides a method of processing a plurality of workpieces by a working system including (a) a working machine for successively processing the plurality of workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, the method being characterized by comprising: (i) a step of obtaining dimensional data on the basis of outputs of the measuring device, the dimensional data including a dimensional error of the processed workpieces, and a variable indicative of a tendency of change in the dimensional error of the workpieces, the step of obtaining dimensional data including the sub-steps of (a) obtaining a present value of an estimated dimension of the working portions of the workpieces on the basis of a predetermined first number of successive measured values represented by the outputs of the measuring device, when each of the workpieces is measured by the measuring device, the predetermined number of successive measured values consisting of a currently measured value currently obtained by the measuring device and at least one measured value which precedes the currently measured value, (b) obtaining a present dimensional error value which is a difference of the present value of the estimated dimension from a nominal dimension of the working portion of the each workpiece, and (c) obtaining a present value of the variable, on the basis of a predetermined second number (L) of successive dimensional error values, when the present dimensional error value is obtained, the predetermined number of successive dimensional error values consisting of the present dimensional error value and at least one error value which precedes the present dimensional error value; and (ii) a step of determining a compensating signal as the extraneous signal on the basis of the present value of the estimated dimension and the present value of the variable, and applying the compensating signal to the machine control means, to adjust the working condition of the working machine, and wherein the step of obtaining dimensional data is characterized by comprising at least one of two features (d) and (e), the feature (d) consisting in obtaining the present value of the estimated dimension in a standard manner when the number of the successive measured values currently available is not smaller than the predetermined first number, and in a special manner different from the standard manner, when the number of the successive measured values currently available is smaller than the predetermined first number, the feature (e) consisting in obtaining the present value of the variable in a standard manner when the number of the successive dimensional error values currently available is not smaller than the predetermined second number, and in a special manner different from the standard manner for said variable, when the number of said successive dimensional error values currently available is smaller than said predetermined second number.

The first object may also be attained according to a third aspect of this invention, which provides a feedback compensating apparatus for a working system including (a) a working machine for successively processing a plurality of workpieces one after another, each of the workpieces having a plurality of working portions in the form of a plurality of coaxial outer cylindrical surfaces arranged in an axial direction thereof, the working machine including an array of working tools which correspond to the plurality of working portions, respectively, the array of working tools being moved relative to each workpiece to simultaneously process the working portions, (b) an in-process measuring device having two in-process measuring heads for measuring diameter values of respective two end working portions of the plurality of working portions, during a working operation of the machine on each workpiece, the two end working portions being located near opposite axial ends of each workpiece, (c) a post-process measuring device for measuring diameter values of the plurality of working portions, respectively, after each workpiece is processed by the machine, and (d) machine control means for controlling the machine such that an operating angle of the array of working tools relative to each workpiece is adjusted and the working operation of the machine on each workpiece is terminated, on the basis of the diameter values of the two end working portions measured by the in-process measuring heads, in relation to two reference values set for the two end working portions, respectively, the feedback compensating apparatus being used with the post-process measuring device and the machine control means, the apparatus comprising: (i) determining means for determining two compensating values for adjusting the two reference values, on the basis of the diameter values of all of the plurality of working portions of each workpiece measured by the post-process measuring device; and (ii) applying means for applying the two compensating values to the machine control means.

In the feedback compensating apparatus constructed as described above according to the third aspect of this invention, the compensating values for adjusting the reference values of the two end working portions of the workpiece are determined on the basis of not only the diameter values of these two end working portions measured by the post-process measuring device, but also the measured diameter values of the other working portions. This arrangement permits the reference values used to control the machine to be adequately adjusted so as to minimize the dimensional error of the processed working portions of the workpieces, in view of the diameter values of all the working portions actually measured by the post-process measuring device.

The term "a plurality of coaxial outer cylindrical surfaces" as the working portions of each workpiece is interpreted to include not only coaxial cylindrical portions of the workpiece which have the same outside diameter, but also coaxial cylindrical portions thereof which have different outside diameters.

Further, the term "two end working portions" of each workpiece is interpreted to mean not only the two axially outermost outer cylindrical surfaces nearest to the opposite axial ends of the workpiece, but also two outer cylindrical surfaces which are axially inside the axially outermost outer cylindrical surfaces and are relatively near the opposite axial ends of the workpiece.

Each of the "two reference values set for the two end working portions" is interpreted to include at least a reference value indicative of an amount of movement of the array of working tools relative to the workpiece, which amount is required to establish a nominal outside diameter of the corresponding end working portion. That is, the reference value for each of the two end working portions should include a reference value indicative of a time at which the working operation on the corresponding end working portion is terminated, and may include at least one reference value corresponding to an outside diameter of the end working portion which is larger than the nominal outside diameter.

The phrase "an operating angle of the array of working tools relative to each workpiece is adjusted and the working operation of the machine on each workpiece is terminated, on the basis of the diameter values of the two end working portions measured by the in-process measuring heads, in relation to two reference values set for the two end working portions, respectively" may be interpreted to mean the following two modes of control of the machine by the machine control means, for example.

In one mode of control of the machine, when one of the two reference values set for the respective two end working portions is reached before the other reference value, the operating angle is adjusted based on a difference between the above-indicated other reference value and a value corresponding to the outside diameter value of the corresponding end working portion actually measured by the post-process measuring device. With the adjusted operating angle, the working operation is continued until the above-indicated other reference value is reached, namely, until the actually measured outside diameter values of the two end working portions have become equal to the respective reference values.

In the second mode of control of the machine, two reference values are set for each end working portion. These two reference values correspond to intermediate and nominal (final) outside diameters of the end working portion. The intermediate outside diameter is larger than the nominal or final outside diameter. The operating angle of the array of working tools is adjusted when the reference value corresponding to the intermediate outside diameter of one of the two end working portions is reached. This adjustment is made based on a difference to the reference value corresponding to the intermediate outside diameter of the other end working portion. With the adjusted operating angle, the working operation is continued to finish the working portions, until the reference value corresponding to the nominal outside diameter of one of the two end working portions is first reached, or until the two reference values corresponding to the nominal outside diameters of the two end working portions are both reached, one after the other.

In one form of the apparatus according to the above third aspect of the invention, the determining means includes: diameter adjusting means for adjusting the diameter values of the two end working portions of the workpiece measured by the post-process measuring device, on the basis of the diameter values of all of the plurality of working portions measured by the post-process measuring device; data obtaining means for obtaining dimensional error data relating to a dimensional error of each of the two end working portions, on the basis of the diameter values of the two end working portions adjusted by the diameter adjusting means; and means for determining the two compensating values for adjusting the two reference values, on the basis of the dimensional error data.

The term "dimensional error data" is interpreted to cover not only the data indicative of the dimensional error per se of the end working portions, but also data indicative of a tendency of change in the dimensional error, and even data indicative of a tendency of change in the tendency of change in the dimensional error.

In an alternative form of the apparatus according to the same third aspect of the invention, the determining means includes: data obtaining means for obtaining dimensional error data relating to a dimensional error of each of the plurality of working portions, on the basis of the diameter values of the plurality of working portions measured by the post-process measuring device; data adjusting means for adjusting the dimensional error data on the two end working portions, on the basis of the dimensional error data on all of the plurality of working portions; and means for determining the two compensating values for adjusting the two reference values, on the basis of the adjusted dimensional error data of the two end working portions.

In another alternative form of the apparatus according to the third aspect of the invention, the determining means includes: data obtaining means for obtaining dimensional error data relating to a dimensional error of each of the plurality of working portions, on the basis of the diameter values of the plurality of working portions measured by the post-process measuring device; provisional value determining means for determining provisional compensating values corresponding to the plurality of working portions, respectively, on the basis of the dimensional error data on all of the plurality of working portions; and means for adjusting the provisional compensating values corresponding to the two end working portions, to obtain respective final compensating values as the two compensating values to be applied to the machine control means, on the basis of the provisional compensating values corresponding to all of the plurality of working portions.

The above second object may also be achieved also according to the third aspect of the present invention, which provides a method of processing a plurality of workpieces by a working system including (a) a working machine for successively processing the plurality of workpieces one after another, each of the workpieces having a plurality of working portions in the form of a plurality of coaxial outer cylindrical surfaces arranged in an axial direction thereof, the working machine including an array of working tools which correspond to the plurality of working portions, respectively, the array of working tools being moved relative to each workpiece to simultaneously process the working portions, (b) an in-process measuring device having two in-process measuring heads for measuring diameter values of respective two end working portions of the plurality of working portions, during a working operation of the machine on each workpiece, the two end working portions being located near opposite axial ends of each workpiece, (c) a post-process measuring device for measuring diameter values of the plurality of working portions, respectively, after each workpiece is processed by the machine, and (d) machine control means for controlling the machine such that an operating angle of the array of working tools relative to each workpiece is adjusted and the working operation of the machine on each workpiece is terminated, on the basis of the diameter values of the two end working portions measured by the in-process measuring heads, in relation to two reference values set for the two end working portions, respectively, the method comprising the steps of: (i) determining two compensating values for adjusting the two reference values, on the basis of the diameter values of all of the plurality of working portions of each workpiece measured by the post-process measuring device; and (ii) applying the two compensating values to the machine control means.

The first object may also be achieved according to a fourth aspect of this invention, which provides a feedback compensating apparatus for a working system including (a) working machine for performing a working operation on each of at least one working portion of each of a plurality of workpieces of at least one kind, to process each working portion as desired, such that working operations on the plurality of workpieces take place successively one after another, (b) machine control means for determining a working condition of the machine on the basis of an extraneous signal, and controlling the machine according to the determined working condition, and (c) a post-process measuring device for measuring actual dimensions of the working portions of the workpieces processed by the machine, the feedback compensating apparatus being connected to the machine control means and the post-process measuring machine, the apparatus comprising: (i) dimensional data obtaining means for obtaining a set of dimensional error data relating to a dimensional error of the processed working portions of the workpieces, for each of the at least one kind of the workpieces, on the basis of outputs of the post-process measuring device; (ii) number data obtaining means for obtaining the number of pre-measured workpieces of each of the at least one kind which have been processed by the machine and which have not been measured by the post-process measuring device; and (iii) compensating means for determining as the extraneous signal a compensating value for each kind of the workpieces, on the basis of the set of dimensional error data and the number of the pre-measured workpieces of the corresponding kind which have been obtained by the dimensional data obtaining means and the number data obtaining means, respectively, the compensating means applying the compensating value to the machine control means, to adjust the working condition of the machine for the workpieces of each kind to be subsequently processed.

In the present feedback compensating apparatus according the fourth aspect of the invention described above, the compensating value for each kind of the workpieces to be applied to the machine control means is determined based on not only the dimensional error data actually obtained for the corresponding kind of the workpieces by the dimensional data obtaining means from the outputs of the post-process measuring device, but also the number of the pre-measured workpieces of the same kind obtained by the number data obtaining means. Since the number of the pre-measured workpieces is taken into account in determining the compensating value, the accuracy of adjustment of the working condition for each kind of the workpieces is improved even when the number of the pre-measured workpieces varies from time to time during continuous operation of the machine on a succession of workpieces.

The apparatus according to the fourth aspect of the invention described above is applicable to the working operations to be performed on successive workpieces of either the same kind or different kinds. Regarding the kind of the workpieces, workpieces whose working portions have the same nominal dimension may be considered to be of different kinds. In this respect, it is desirable in some cases that the workpieces whose working portions have the same nominal dimension be processed in different working conditions of the machine, for example, due to different rigidity values of the workpieces. In this case, the workpieces are considered to be of different kinds.

In one form of the apparatus according to the above fourth aspect of the present invention, the plurality of workpieces are of a single kind, and the compensating means includes memory means for storing a plurality of control rules which correspond to selected respective values of the number of the pre-measured workpieces and which define respective different relationships between the compensating value and the set of dimensional error data for the single kind of workpieces. The memory means also stores a plurality of data groups which correspond to the plurality of control rules and which define relationships between the number of the pre-measured workpieces to be obtained by the number data obtaining means, and an optimum degree of influence of the control rules to be given on the compensating value to be determined. In operation, the compensating means determines the optimum degree of influence of each of the control rules, which optimum degree corresponds to the number of the pre-measured workpieces obtained by the number data obtaining means. Finally, the compensating means determines the compensating value based on the determined optimum degree of influence, the plurality of control rules and the dimensional error data.

In another form of the apparatus according to the fourth aspect of the invention, the compensating means includes memory means for storing a plurality of control rules which correspond to respective combinations of the number of the pre-measured workpieces and the number of the at least one kind of the workpieces and each of which define a relationship between the dimensional error data and the compensating value. In operation, the compensating means selects one of the control rules, depending upon the number of the pre-measured workpieces obtained by the number data obtaining means and the kind of the workpieces, and determining the compensating value on the basis of the selected control rule.

In a further form of the apparatus according to the fourth aspect of the invention, the compensating means includes memory means for storing one control rule for each of the at least one kind of the workpiece, which control rule defines a relationship between the dimensional error data and the compensating value. The memory means also stores data which define a relationship between the number of the pre-measured workpieces and a compensating coefficient used to determine the compensating value. In operation, the compensating means first determines a provisional compensating value on the basis of the dimensional error data obtained by the dimensional data obtaining means, and according to the control rule corresponding to the kind of the workpieces. Then, the compensating means determines the compensating coefficient which corresponds to the number of the pre-measured workpieces obtained by the number data obtaining means. Finally, the compensating means determines a final compensating value to be applied to the machine control means, on the basis of the determined provisional compensating value and the compensating coefficient.

In a still further form of the apparatus according to the fourth aspect of the invention, the compensating means includes memory means for storing a control rule for each of the at least one kind of the workpiece, which control rule defines a relationship among the number of the pre-measured workpieces, the dimensional error data and the compensating value. In operation, the compensating means determines the compensating value, on the basis of the number of the pre-measured workpieces obtained by the number data obtaining means and the dimensional error data obtained by the dimensional data obtaining means, and according to the control rule corresponding to the kind of the workpieces.

The above second object may also be achieved also according to the fourth aspect of the invention, which provides a method of processing a plurality of workpieces by a working system including (a) a working machine for performing a working operation on each of at least one working portion of each of the workpieces of at least one kind, to process each working portion as desired, such that working operations on the plurality of workpieces take place successively one after another, (b) machine control means for determining a working condition of the machine on the basis of an extraneous signal, and controlling the machine according to the determined working condition, and (c) a post-process measuring device for measuring actual dimensions of the working portions of the workpieces processed by the machine, the method comprising the steps of: (i) obtaining a set of dimensional error data relating to a dimensional error of the processed working portions of the workpieces, for each of the at least one kind of the workpieces, on the basis of outputs of the post-process measuring device; (ii) obtaining the number of pre-measured workpieces of each of the at least one kind which have been processed by the machine and which have not been measured by the post-process measuring device; (iii) determining as the extraneous signal a compensating value for each kind of the workpieces, on the basis of the set of dimensional error data and the number of the pre-measured workpieces of the corresponding kind which have been obtained by the dimensional data obtaining means and the number data obtaining means, respectively; and (iv) applying the compensating value to the machine control means, to adjust the working condition of the machine for the workpieces of each kind to be subsequently processed.

The first object may also be achieved according to a fifth aspect of the present invention, which provides a feedback compensating apparatus for a working system including (a) a working machine for successively processing a plurality of workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, the working system being adapted to permit existence between the machine and the measuring device, of at least one pre-measured workpiece which has been processed by the machine and which has not been measured by the measuring device, the feedback compensating apparatus being used with the machine control means and the measuring device, the apparatus comprising: (i) determining means for determining as the extraneous signal a compensating value for adjusting the working condition of the machine for the workpieces to be processed subsequently by the machine, on the basis of the actual dimensions of the working portions of the workpieces which have been measured by the measuring device, the determining means updating the compensating value from time to time on an intermittent basis while the workpieces processed by the machine are measured successively by the measuring device; and (ii) applying means for applying the compensating value to the machine control means.

In the feedback compensating apparatus according to the fifth aspect of this invention described above, the actual dimensions of the working portions of the processed workpieces are successively measured one after another, while the compensating value is determined from time to time on an intermittent basis, and is not determined upon measurement of each processed workpiece. Therefore, the compensating value is not updated in synchronization of the measurement of the processed workpieces.

Since there are some pre-measured workpieces between the machine and the measuring device, there is a measurement delay corresponding to the number of the pre-measured workpieces. Accordingly, updating the compensating value within a period corresponding the measurement delay is meaningless, because an influence of the presently determined or updated compensating value on the measured dimensions of the processed workpieces will not appear until the first workpiece influenced by the compensating value has reached the measuring device and been measured by the measuring device. In view of this fact, the present compensating apparatus determines or updates the compensating value on an intermittent basis as described below in more detail. The present arrangement is effective to reduce the work load of the apparatus, since the frequency of determination of the compensating value is considerably reduced as compared with that where the compensating value is updated when each processed workpiece is measured.

The determining means may be arranged to determine the compensating values based on only dimensional error values which are differences between the actually measured dimensions of the workpieces and the nominal dimension. Alternatively, the determining means may be designed to determine the compensating value based on a variable indicative of a tendency of change in the dimensional error, as well as the dimensional error per se. Further, the determining means may also use a variable indicative of a tendency of change in the variable indicative of the tendency of change in the dimensional error.

In one form of the apparatus according to the fifth aspect of this invention described above, the determining means updates the compensating value from a last value to a present value, and determines the present value only after a first one of the workpieces processed by the machine under the working condition adjusted by the last value has been measured by the measuring device.

In the presence of some number of the pre-measured workpieces between the machine and the measuring device, it is desirable that the present compensating value to be determined reflects more or less an influence of the last compensating value. To this end, it is necessary to determine the present compensating value, namely, to update the compensating value, at a moment not earlier than the moment when the first workpiece influenced by the last compensating value has been measured by the measuring device. In this respect, the above form of the invention is adapted such that the present compensating value is not determined until the first workpiece influenced by the last compensating value has been measured. Thus, the apparatus updates the compensating value on an intermittent basis, with a time interval between adjacent occurrences of determination of the compensating value. This is effective to reduce the work load of the feedback compensating apparatus.

According to another form of the apparatus according to the same fifth aspect of the invention, the determining means includes memory means for storing measured values of the actual dimensions of the processed workpieces obtained by the measuring device, and determines a present value of the compensating value on the basis of a predetermined number of the measured values stored in the memory means, when the number of the stored measured values has become equal to the predetermined number. The determining means clears the memory means and resuming an operation to store therein the measured values obtained by the measuring device, after completion of determination of the present value.

In the light of an unavoidable error in the measurement of each processed workpiece, it is desirable to use not only the present output value of the measuring device, but also some preceding output values of the measuring device, in order to assure improved adequacy of determination of the compensating value. To this end, the above form of the apparatus is adapted to store measured values of the workpieces one after another, so that the present compensating value is determined on the basis of a predetermined number of the stored measured values. Thus, the compensating value is updated each time the predetermined number of the measured values are stored in the memory means. Thus, the compensating value is updated intermittently based on successively measured and stored values of the dimensions of the processed workpieces, irrespective of the number of the pre-measured workpieces. This arrangement also reduces the work load of the compensating apparatus.

The above second object may also be achieved also according to the fifth aspect of this invention, which provides a method of processing a plurality of workpieces by a working system including (a) a working machine for successively processing the workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, such that between the machine and the measuring device, there exist a predetermined number of pre-measured workpieces which have been processed by the machine and which have not been measured by the measuring device, the method comprising the steps of: (i) determining as the extraneous signal a compensating value for adjusting the working condition of the machine for the workpieces to be processed subsequently by the machine, on the basis of the actual dimensions of the working portions of the workpieces which have been measured by the measuring device, the determining means updating the compensating value from time to time on an intermittent basis while the workpieces processed by the machine are measured successively by the measuring device; and (ii) applying the compensating value to the machine control means.

The above first object may also be achieved according to a sixth aspect of this invention, which provides a feedback compensating apparatus for a working system including (a) a working machine for successively processing the workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, the feedback compensating apparatus being used with the machine control means and the measuring device, the apparatus comprising: (i) determining means for determining as the extraneous signal a compensating value for adjusting the working condition of the machine for the workpieces to be processed subsequently by the machine, on the basis of the actual dimensions of the working portion of the workpieces which have been measured by the measuring device, and according to a compensation rule which changes with a change in a vibration level of measured values of the actual dimensions obtained by the measuring device; and (ii) applying means for applying the compensating value to the machine control means.

For instance, the compensating rule is changed so that the compensating value to be determined according to the compensating rule is relatively less responsive to a change in the dimensional error of the processed workpieces when the vibration level is relatively high, while on the other hand the compensating value to be determined is relatively highly responsive to the change in the dimensional error when the vibration level is relatively low. Thus, the present arrangement assures adequate determination of the compensating value so as to reduce the dimensional error of the processed workpieces even when the measured values of the workpieces vibrate to a considerable extent due to vibration of the machine.

The determining means described above may be arranged to determine the compensating values based on only dimensional error values which are differences between the actually measured dimensions of the workpieces and the nominal dimension. Alternatively, the determining means may be designed to determine the compensating value based on a variable indicative of a tendency of change in the dimensional error, as well as the dimensional error per se. Further, the determining means may also use a variable indicative of a tendency of change in the variable indicative of the tendency of change in the dimensional error.

The above second object may also be achieved also according to the sixth aspect of the invention, which provides a method of processing a plurality of workpieces by a working system including (a) a working machine for successively processing the workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, the method comprising the steps of: (i) determining as the extraneous signal a compensating value for adjusting the working condition of the machine for the workpieces to be processed subsequently by the machine, on the basis of the actual dimensions of the working portion of the workpieces which have been measured by the measuring device, and according to a compensation rule which changes with a change in a vibration level of measured values of the actual dimensions obtained by the measuring device; and (ii) applying the compensating value to the machine control means.

The above first object may also be achieved according to a seventh aspect of the present invention, which provides a feedback compensating apparatus for a working system including (a) a working machine for performing a working operation on each of at least one working portion of each of a plurality of workpieces, to process the each working portion as desired, such that working operations on the plurality of the workpieces take place successively one after another, (b) machine control means for determining a working condition of the working machine on the basis of an extraneous signal, and controlling the working machine according to the determined working condition, and (c) a measuring device for measuring actual dimensions of the working portions of the workpieces processed or under processing by the working machine, the feedback compensating apparatus being used with the machine control means and the measuring device, the apparatus comprising: (i) data obtaining means for obtaining dimensional data on the basis of outputs of the measuring device during at least one of a first period and a second period following the first period, the working operation on the each working portion being performed during the first period, the dimensional data including a dimensional error of the processed working portions of the workpieces; and (ii) compensating means for determining a compensating value as the extraneous signal on the basis of the dimensional data, and effecting the adjustment of the working condition of the working machine according to the determined compensating value when the compensating value is outside a predetermined tolerable range, the compensating means inhibiting the adjustment of the working condition according to the compensating value when the compensating value falls within the tolerable range.

In the feedback compensating apparatus according to the seventh aspect of the invention as described above, the working condition of the machine is not adjusted, i.e., remains unchanged, when the determined compensating value is sufficiently close to zero or within a tolerable range. In other words, the determined compensating value is utilized to adjust the working condition of the machine when the compensating value is outside the tolerable range. This arrangement permits enhanced stability of the dimensional accuracy of the processed workpieces, as compared with an arrangement in which each compensating value determined by the compensating means is actually used to adjust the working condition, irrespective of whether the determined compensating value is sufficiently close to zero.

The inhibition of the adjustment of the working condition of the machine according to the compensating value may be accomplished by zeroing the compensating value to be applied to the machine control means, or by applying to the machine control means a signal which inhibits the adjustment of the working condition according to the compensating value. Alternatively, the adjustment of the working condition may be inhibited by inhibiting the application of the compensating value to the machine control means.

The above second object may also be achieved also according to the above seventh aspect of this invention, which provides a method of processing at least one working portion provided on each of a plurality of workpieces such that the workpieces are successively processed one after another by a working machine, comprising the steps of: (i) obtaining dimensional data including a dimensional error of the working portions of the workpieces, during at least one of a first period and a second period following the first period, the working operation on the each working portion being performed during the first period; (ii) determining a compensating value as the extraneous signal on the basis of the dimensional data; and (iii) adjusting the working condition of the working machine according to the compensating value when the compensating value is outside a predetermined tolerable range, and inhibiting the adjustment of the working condition according to the compensating value when the compensating value falls within the tolerable range.

The above first object may also be achieved according to the eighth aspect of this invention, which provides a feedback compensating apparatus for a working system including (a) a working machine for successively processing the workpieces, (b) machine control means for determining a working condition of the working machine on the basis of an extraneous signal, and controlling the working machine according to the determined working condition, and (c) a measuring device for measuring actual dimensions of working portions of the workpieces processed by the working machine, the feedback compensating apparatus being used with the machine control means and the measuring device, the apparatus comprising: (i) manual compensating means for effecting an manual adjustment of the working condition of the machine, the manual compensating means determining as the extraneous signal a manual compensating value to adjust the working condition of the machine, in response to manual compensating data entered by an operator of the machine, the manual compensating means applying the manual compensating value to the machine control means; and (ii) automatic compensating means for effecting an automatic adjustment of the working condition, the automatic compensating means determining also as the extraneous signal an automatic compensating value for adjusting the working condition of the machine for the workpieces to be processed subsequently by the machine, on the basis of the actual dimensions of the working portion of the workpieces which have been measured by the measuring device, the automatic compensating means applying the automatic compensating value to the machine control means. The automatic compensating means interrupting an operation to effect the automatic adjustment when the manual adjustment by the manual compensating means is started, and resuming the operation to effect the automatic adjustment, at a moment not earlier than a moment when a first one of the workpieces processed by the machine under the working condition adjusted by the manual compensating value has been measured by the measuring device.

In the present apparatus according to the eighth aspect of this invention as described above, the working condition of the machine is adjusted by the machine control means, according to the manual compensating value received from the manual compensating means, or the automatic compensating value received from the automatic compensating means. When the manual adjustment according to the manual compensating value is started, the operation of the automatic compensating means is interrupted, until the first workpiece processed under the working condition adjusted by the manual compensating value has been measured by the measuring device. That is, the operation to effect the automatic adjustment of the working condition is resumed when or after the first workpiece influenced by the manual adjustment has been measured. Thus, the manual adjustment of the working condition is predominant over the automatic adjustment, and the automatic compensating value is determined on the basis of the measured dimensions of the workpieces processed under the influence of the manual compensating value.

Where there are some pre-measured workpieces which have been processed but have not been measured, the dimensions of these workpieces measured after the manual adjustment is started does not reflect an influence of the manual compensating value, and the use of these dimensions to determine the automatic compensating value is meaningless. Accordingly, the automatic compensating value is determined only after the first workpiece influenced by the manual compensating value has been measured and is available to determine the automatic compensating value. Thus, the present apparatus assures high accuracy of automatic adjustment of the working condition of the machine even after the manual adjustment.

The manual compensating data may be directly entered into the machine control means, or indirectly through the automatic compensating means.

The interruption of the operation to effect the automatic adjustment of the working condition of the machine is interpreted to cover at least inhibiting the application of the determined automatic compensating value to the machine control means. Namely, the operation of the automatic compensating means may be stopped after the automatic compensating means is determined but before the determined automatic compensating value is supplied to the machine control means.

The term "resuming the operation to effect the automatic adjustment" is interpreted to mean that actions of the automatic compensating means to determine the automatic compensating value and apply it to the machine control means are both resumed where the "interruption" is effected with respect to these actions, or mean that an action to apply the determined automatic compensating value to the machine control means is resumed where the "interruption" is effected with respect to this action only.

Where there are any pre-measured workpieces between the machine and the measuring device, the first workpiece processed under the influence of the manual compensating value is not measured immediately after the manual compensating value is applied to the machine control means. In this sense, the moment at which the operation of the automatic compensating means is resumed is determined to be a moment not earlier than the moment at which the above-indicated first workpiece has been measured. The term "not earlier than" means that the operation of the automatic compensating means may be resumed when two or more workpieces processed under the influence of the manual compensating values have been measured.

In one form of the apparatus according to the eighth aspect of the invention, the automatic compensating means includes memory means for storing the dimensions of the processed workpieces which are successively measured by the measuring device. The automatic compensating means determines the automatic compensating value on the basis of the dimension of the workpiece measured last by the measuring device, and at least one dimension previously measured and stored in the memory means. The automatic compensating means resumes the operation to effect the automatic adjustment by storing the dimensions to be subsequently measured with the memory means cleared, at the moment not earlier than the moment when the first workpiece influenced by the manual compensating value has been measured.

The phrase "determines the automatic compensating value on the basis of the dimension of the workpiece measured last by the measuring device, and at least one dimension previously measured and stored in the memory means" may be interpreted to cover: (1) a case in which the automatic compensating value is determined based on a dimensional error which is a difference between the measured dimension and a nominal dimension of the workpiece, and a tendency of change in this dimensional error; (2) a case in which the automatic compensating value is determined based on each measured dimension, a tendency of change in the measured dimension, and a tendency of change in the tendency of change in the measured dimension; and (3) a case in which the automatic compensating value is determined based on each measured dimension as adjusted by the previously measured dimension or dimensions. The tendency of change in the dimensional error may be represented by a first time derivative of the dimensional error, and the tendency of change in the tendency of change in the measured dimension may be represented by a second time derivative of the measured dimension.

BRIEF DESCRIPTION OF THE DRAWINGS

The above and optional objects, features and advantages of this invention will be better understood by reading the following detailed description of presently preferred embodiments of the invention, when considered in connecting with the accompanying drawings, in which:

FIG. 6 is a graph indicating stored membership functions associated with number MS of the workpieces between honing station and post-process measuring device of the honing system;

FIG. 7 is a view schematically showing kinds of data to be stored in an auxiliary memory of the honing system;

FIG. 8 is a graph indicating an example of a succession of measured values obtained by the post-process measuring device of the embodiment of FIG. 1;

FIG. 9 is a graph indicating a succession of moving average of the measured values of FIG. 8;

FIG. 18 is a graph similar to those of FIGS. 3–5, indicating membership functions associated with a second derivative D of the dimensional error R, which are stored in the read-only memory for adjusting the working condition of the honing system;

FIG. 29 is a schematic view of the grinding system, showing the details of a grinding machine;

DETAILED DESCRIPTION OF THE PREFERRED EMBODIMENTS

Referring first to FIGS. 1–13, there will be described one embodiment of a feedback compensating apparatus of the present invention for a honing system, for adjusting the honing condition in which the workpiece is honed.

The honing system is adapted to hone the inner cylindrical surfaces of a plurality of cylinder bores formed in each cylinder block for an engine of an automotive vehicle.

In the present embodiment applied to the honing system as one form of the working system, the cylinder blocks are one form of the workpiece, and the cylinder bores are one form of the working portion of the workpiece.

Figure 1:
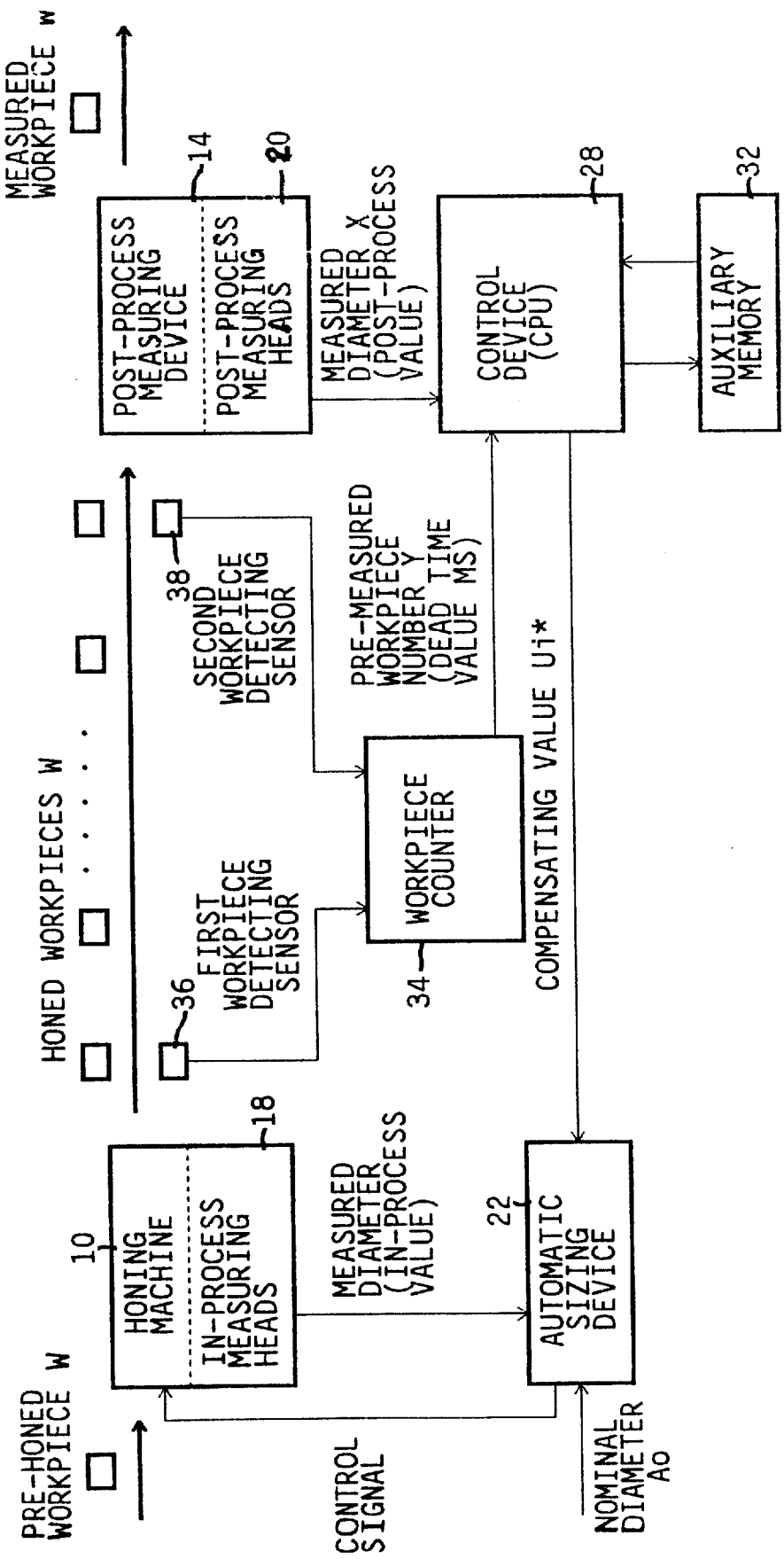
FIG. 1 is a schematic view showing a working system in the form of a honing system incorporating a feedback compensating apparatus constructed according to one embodiment of this invention for adjusting the working condition of the honing system so as to eliminate a dimensional error of the honed workpiece.

Reference is now made to FIG. 1, wherein a working line indicated by arrows extends through the honing system, so that the cylinder blocks as the workpieces W of the same kind are successively transferred. At a relatively upstream position of the working line, there is disposed a working machine in the form of honing machine 10 for honing the cylinder bores in each workpiece W. At a relatively downstream position of the working line, there is disposed a post-process measuring device 14 for measuring the inside diameter X of each cylinder bore of each honed workpiece W.

The honing machine 10 has a plurality of honing heads for honing the respective cylinder bores, which are driven by respective drive devices. Therefore, the numbers of the honing heads and the drive devices are the same as the number of the cylinder bores to be honed. Each honing head incorporates an in-process measuring head 18 of air micrometer type, which is adapted to measure the inside diameter of the appropriate cylinder bore under honing while the measuring head 18 is moved with the honing head. The post-process measuring device 14 has a plurality of post-process measuring heads 20 of electric micrometer type, which are adapted to measure the inside diameters of the respective cylinder bores of each honed workpiece W.

It will be understood that the inside diameter of the cylinder bore is one form of the dimension to be controlled by the present compensating apparatus, and the post-process measuring device 14 is one form of the dimension measuring means of the apparatus.

The honing machine 10 and the in-process measuring heads 18 are electrically connected to an automatic sizing device 22, while the post-process measuring device 14 is electrically connected to a control device 28 principally constituted by a computer which includes a central processing unit (CPU), a read-only memory (ROM) and a random-access memory (RAM). The control device 28 is also connected to the automatic sizing device 22, and to an auxiliary memory 32 for storing various sorts of data.

In the present embodiment, the post-measuring device 14 is spaced from the honing machine 10 by a suitable distance along the working line, so that a certain number Y of the honed workpieces W are present between the honing machine 10 and the device 14. These honed workpieces W are transferred along the working line toward the measuring device 14, for intermittent measurement of the inside diameters of the honed workpieces W. The number Y of these honed and pre-measured workpieces W is counted by a workpiece counter 34 principally constituted by a computer. The workpiece counter 34 is connected to a first workpiece detecting sensor 36 (in the form of a limit switch, for example) which detects the honed workpiece W to be fed out from the honing machine 10, and a second workpiece detecting sensor 38 (e.g., limit switch) which detects the honed workpiece W to be fed into the post-measuring device 14. The workpiece counter 34 counts the number Y of the honed pre-measured workpieces W, by incrementing the count each time the first sensor 36 detects the transfer of one honed workpiece W from the machine 10, and decrementing the count each time the second sensor 38 detects the transfer of one honed workpiece W into the device 14. Thus, the number Y of the pre-measured workpieces W existing between the machine 10 and the device 14 can be counted by the workpiece counter 34.

In the present embodiment, the workpiece counter 34 cooperates with the first and second workpiece detecting sensors 36, 38 to constitute one form of means for counting the number Y of the pre-measured workpieces W.

The number Y of the honed and pre-measured workpieces W means a dead time MS of a control system which receives an input signal in the form of a compensating value $Ui^*$ from the control device 28 and which produces an output signal in the form of measured values X generated by the post-processing measuring heads 20. Described more specifically, when the number Y is zero, the post-measuring device 14 measures the workpiece W immediately after the honing operation on the workpiece W is finished, and there is no pre-measured workpiece W waiting for the measurement. In this case, a value MS of the dead time is set to be "1". Therefore, when the number of the pre-measured workpieces W is equal to Y ($\geq 1$), the device 14 measures the workpiece W which was honed by the machine 10 (Y+1) times of honing operations prior to the last honing operation. In this case, the dead time value MS is equal to (Y+1). Thus, the dead time value MS varies as a function of the number Y of the honed pre-measured workpieces W.

There will next be described an operation of the honing system including the feedback compensating apparatus. It is noted that the following description refers to a honing operation associated with one of the cylinder bores of each workpiece, by way of example, while in fact the honing operations are simultaneously effected on all the cylinder bores, in the same manner.

In the same sense, it is to be understood that when the cylinder bore or the honing operation on that cylinder bore is referred to in the following description, reference should be made to the corresponding honing head and in-process measuring head 18 of the honing machine 10, the corresponding post-process measuring head 20, and the corresponding or associated portions of the automatic sizing device 22, control device 28 and auxiliary memory 32.

Before a series of honing operations on a given number of workpieces W, the automatic sizing device 22 is calibrated by the operator, such that the output voltage (indicative of the measured inside diameter of the cylinder bore) of the in-process measuring head 18 coincides with a reference voltage representative of the desired nominal inside diameter, while the in-process measuring head 18 is measuring a master workpiece whose bore has the inside diameter equal to the nominal diameter. During a honing operation on each workpiece W, the automatic sizing device 22 monitors the output voltage of the in-process measuring head 18 to thereby monitor the inside diameter of the cylinder bore of the workpiece W under honing, and applies a control signal to the drive device of the appropriate honing head of the machine 10, so as to terminate the honing operation of the honing head when the output voltage of the head 18 becomes equal to the reference voltage, that is, when the inside diameter measured by the head 18 coincides with the nominal value. The automatic sizing device 22 is adapted to receive a compensation signal in the form of the compensating value Ui* (final compensating value) sent from the control device 28, so that the reference voltage indicated above is changed according to the compensating value Ui*, in order to hold an error of the inside diameter of the honed cylinder bore within a predetermined tolerance.

In the present embodiment, the reference voltage used by the automatic sizing device 22 is one form of the working condition to be adjusted by the compensating apparatus. Further, the control device 28 is one form of means for determining the compensating value Ui* to be sent to the automatic sizing device 22 and thereby adjusting the working condition, i.e., the reference voltage. This control device 28 receives compensating data in the form of the output of the post-process measuring head 20 indicative of the measured inside diameter of the honed cylinder bore, and determines by fuzzy inference the compensating value Ui* to adjust the reference voltage of the automatic sizing device 22, on the basis of the output of the post-process measuring head 20.

Figure 2:
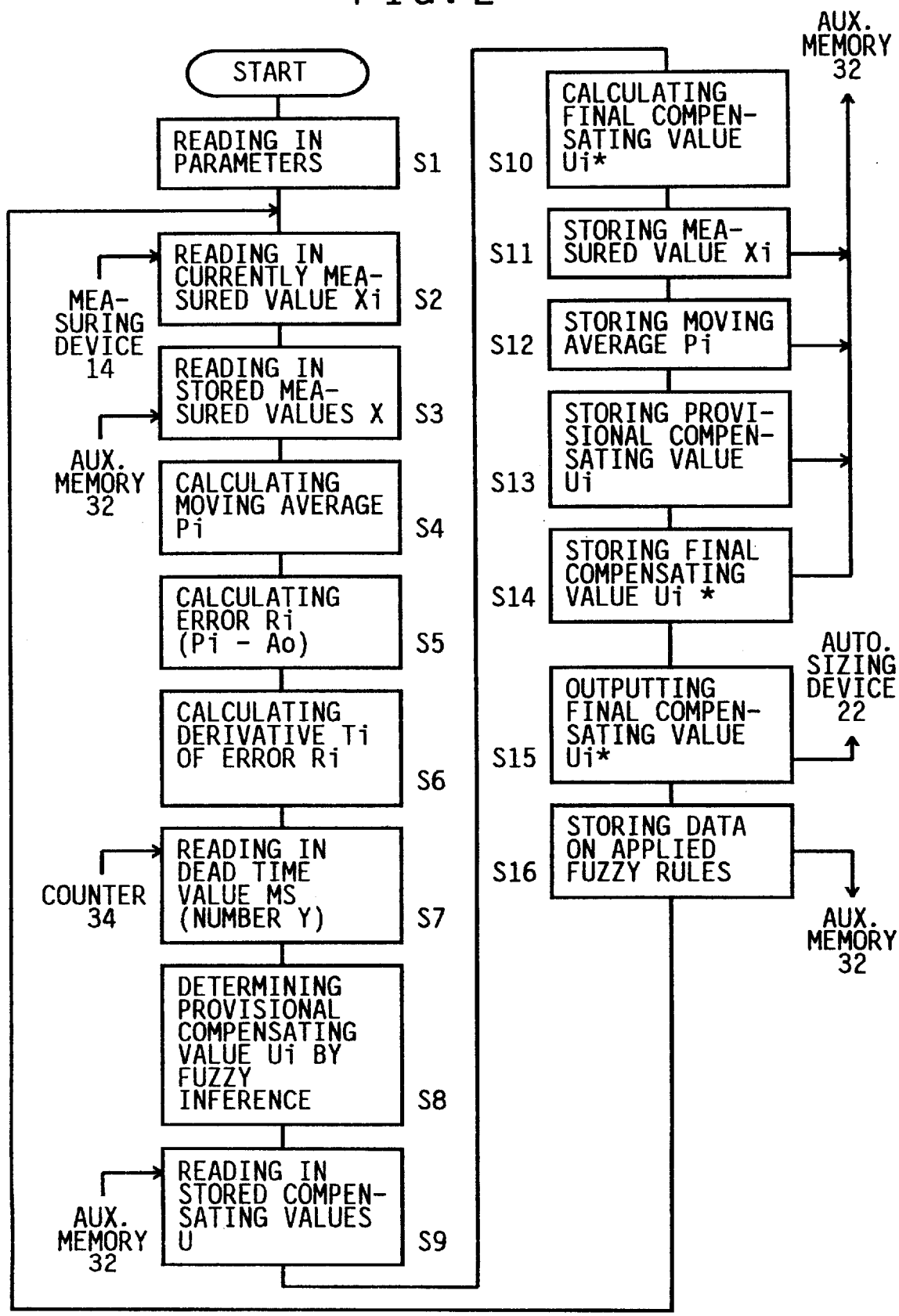
FIG. 2 is a flow chart illustrating a control program stored in a read-only memory of a computer used in a control device for the honing system of FIG. 1.

For the control device 28 to perform the above function, the read-only memory (ROM) provided therein stores a control program for effecting a control operation illustrated in the flow chart of FIG. 2, and also stores fuzzy inference data used for determining the compensating value Ui by fuzzy inference. The fuzzy inference data include: (a) fuzzy inference programs; (b) membership functions associated with an error value R which is a difference between the measured value X obtained by the post-process measuring head 20 and the nominal value Ao; (c) membership functions associated with a derivative T of the error value R; (d) membership functions associated with the compensating value U (provisional compensating value); (e) membership functions associated with the dead time value MS (number Y of the honed pre-measured workpieces W); and (f) three groups of fuzzy rules for defining relationships among the error value R, derivative T and compensating value U.

Figure 3:
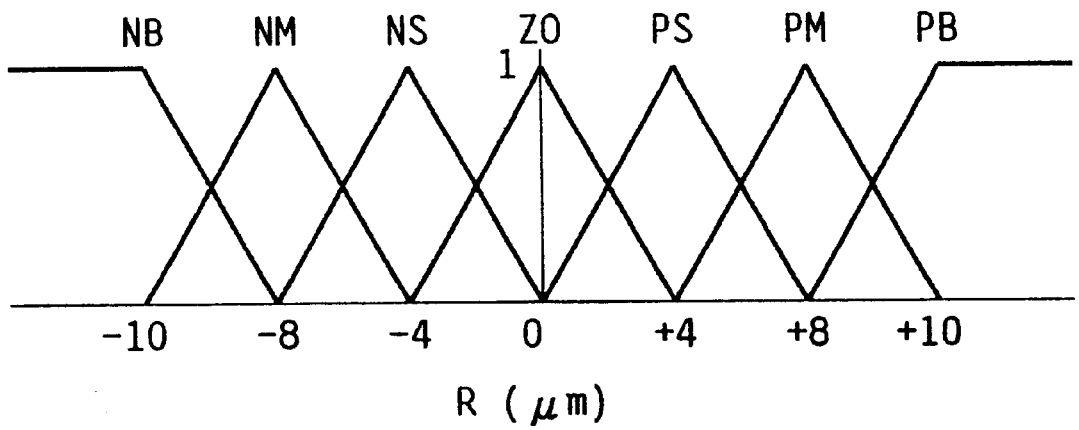
FIG. 3 is a graph indicating membership functions associated with a dimensional error R, which are stored in the read-only memory for adjusting the working condition of the honing system.

For the error value R, the control device 28 uses seven fuzzy labels NB (negative big), NM (negative medium), NS (negative small), ZO(zero), PS (positive small), PM (positive medium) and PB (positive big), whose values increase in the order of description from a negative value to a positive value. The membership functions of these fuzzy labels are indicated in the graph of FIG. 3.

Figure 4:
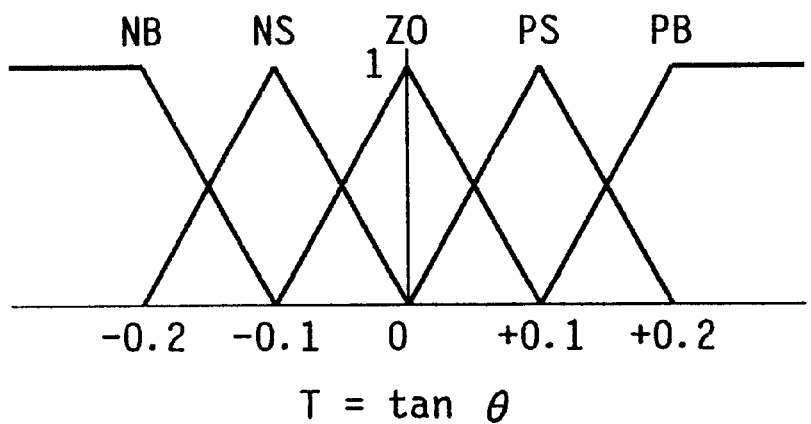
FIG. 4 is a graph indicating membership functions associated with a derivative T of the error R, which are also stored in the read-only memory.

For the derivative T of the error value R, the control device 28 uses five fuzzy labels NB, NS, ZO, PS and PB, whose values increase in the order of description from a negative value to a positive value. The membership functions of these fuzzy labels are indicated in the graph of FIG. 4.

Figure 5:
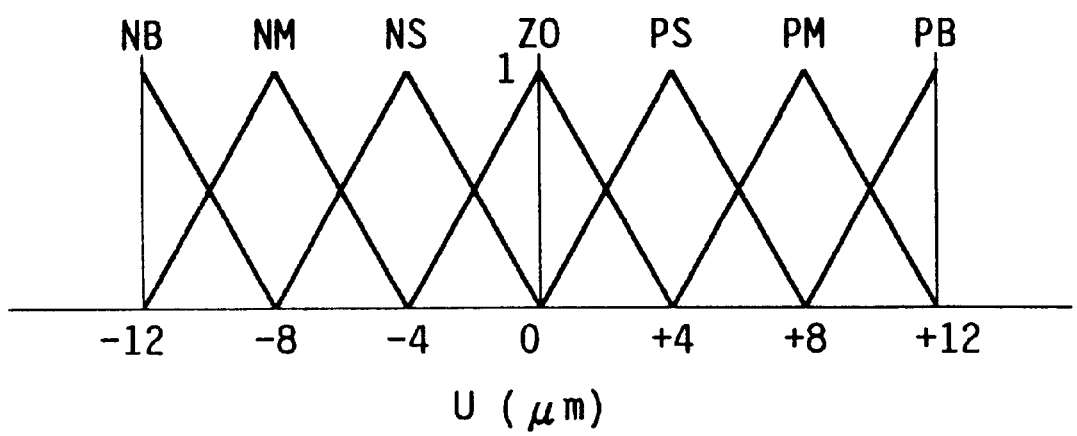
FIG. 5 is a graph indicating stored membership functions associated with a compensating value U used to adjust the working condition.

For the compensating value U, the control device 28 uses the seven fuzzy labels NB, NM, NS, ZO, PS, PM and PB, as described above with respect to the error value R, The membership functions of these seven fuzzy labels are indicated in FIG. 5. An increase in the compensating value U results in an increase in the reference voltage of the automatic sizing device 22, which in turn results in an increase in the inside diameter of the honed cylinder bore. On the other hand, a decrease in the compensating value U results in a decrease in the reference voltage, which in turn results in a decrease in the inside diameter of the cylinder bore.

For the dead time value MS (number Y of the pre-measured workpieces W), there are used three fuzzy labels PS, PM and PB, whose values increase in the order of description from "1" to "20". The membership functions of these three fuzzy labels are indicated in the graph of FIG. 6.

The control device 28 uses the three groups of fuzzy rules, which are optimally used for fuzzy inference to determine the compensating value U when the dead time value MS is equal to 1, 10 and 20, respectively. The first fuzzy rule group optimal in the case of MS=1 is indicated in TABLE 1 below:

TABLE 1

| | | R ($\mu$m) | | | | | |
|---|---|---|---|---|---|---|---|
| MS = 1 | | NB | NM | NS | ZO | PS | PM | PB |
| T | NB | PB | PB | PM | PS | ZO | NS | NM |
| | NS | PB | PM | PS | ZO | NS | NM | NB |
| | ZO | PB | PM | PS | ZO | NS | NM | NB |
| | PS | PB | PM | PS | ZO | NS | NM | NB |
| | PB | PM | PS | ZO | NS | NM | NB | NB |

An example of a fuzzy rule of the first group is expressed as follows:
IF R=NS and T=PS, THEN U=PS
The second group of fuzzy rules optimal in the case of MS=10 is indicated in TABLE 2 below:

TABLE 2

| | | R ($\mu$m) | | | | | |
|---|---|---|---|---|---|---|---|
| MS = 10 | | NB | NM | NS | ZO | PS | PM | PB |
| T | NB | ZO | PS | ZO | ZO | ZO | ZO | ZO |
| | NS | PM | PM | PS | ZO | NS | NS | NM |
| | ZO | PB | PM | PS | ZO | NS | NM | NB |
| | PS | PM | PS | PS | ZO | NS | NM | NM |
| | PB | ZO | ZO | ZO | ZO | ZO | NS | ZO |

The third group of fuzzy rules optimal in the case of MS=20 is indicated in TABLE 3 below:

TABLE 3

| | | R ($\mu$m) | | | | | |
|---|---|---|---|---|---|---|---|
| MS = 20 | | NB | NM | NS | ZO | PS | PM | PB |
| T | NB | ZO | ZO | PS | ZO | ZO | ZO | ZO |
| | NS | PB | PM | PS | ZO | ZO | NS | NM |
| | ZO | PB | PM | PS | ZO | NS | NM | NB |
| | PS | PM | PS | ZO | ZO | NS | NM | NB |
| | PB | ZO | ZO | ZO | ZO | NS | ZO | ZO |

The above fuzzy rules are formulated on the following concept:

The in-process measuring head 18 measures the inside diameter of the honed cylinder bore in the varying condition which adversely influences the measurement, for instance, in the presence of a varying amount of residual strain of the honed workpiece W, and varying temperatures of the workpiece and the head 18. Further, the in-process measuring head 18 is not calibrated so frequently as the post-processing measuring head 20, and the electrical output of the head 18 indicative of the inside diameter inevitably includes a drift. Accordingly, the measuring accuracy of the in-process measuring head 18 is relatively lower than that of the post-process measuring head 20. Generally, the measuring error of the in-process measuring head 18 changes slowly with an increase in the number of the honed workpieces.

To assure the workpiece W to be honed with a minimum of influence by such measuring error, the three groups of fuzzy rules are designed, as a principle, so as to reduce the compensating value U not only with an increase in the error value R represented by the fuzzy labels, but also with an increase in the time derivative T of the error value R.

The above principle is represented in TABLES 2 and 3, for example, as follows: That is, where the derivative T is NS, the compensating value U decreases in the order of PB, PM, PS, ZO, NS and NM as the error value R increases. Further, where the error value R is NM, the compensating value U decreases from PM to PS as the derivative T increases in the order of NS, ZO and PS.

It is also noted that in the event of a certain temporary defect or trouble with the in-process measuring head 18, the actual inside diameter of the honed cylinder bore of the workpiece W considerably deviates from the nominal values, and the compensating value U determined on the basis of the output of the post-process measuring head 20 is not reliable. In other words, the determined compensating value U may cause the dimensional accuracy of the subsequently honed cylinder bores to be outside a tolerance range.

In view of the above possibility, the fuzzy rules are also formulated so as to change the compensating value U toward zero ("0"), when the measured value X represented by the output of the post-process measuring head 20 suddenly decreases or increases to a considerably extent. In other words, the fuzzy rules are designed to ignore such sudden change of the output of the post-process measuring head 20 that may be caused by a sudden change in the output of the in-process measuring head 18 due to a temporary trouble with the head 18 for some reason or other. Accordingly, the subsequent honing operations are performed, without suddenly changing the reference voltage to be used by the automatic sizing device 22. This arrangement minimizes the influence of the trouble of the head 18 on the dimensional accuracy of the honed cylinder bore of the workpieces W.

All of the three fuzzy groups are designed on the same basic concept as described above. However, the three groups are designed differently so as to accommodate a difference in the number Y of the pre-measured workpieces W (dead time value MS), for assuring high stability of the dimensional accuracy of the honed workpieces W irrespective of a change in the number Y (dead time value MS).

Referring to the flow chart of FIG. 2, there will be described the operation of the compensating apparatus for adjusting the reference voltage of the automatic sizing device 22, depending upon the output of the post-process measuring head 20.

The control program illustrated in FIG. 2 is adapted to first calculate the error value Ri on the basis of the measured value Xi represented by the output signals of the head 20 currently received by the control device 28, and then calculate the time derivative Ti of the error value Ri. On the basis of the calculated error value Ri and derivative Ti and the dead time value MS, a provisional compensating value Ui is determined. Finally, a final compensating value Ui* is determined by adjusting the currently determined provisional compensating value Ui on the basis of the previous provisional compensating values Ui.

Described in detail referring to FIG. 2, step S1 is initially implemented to read in predetermined parameters such as a nominal inside diameter Ao (hereinafter referred to as "nominal value" where appropriate) of the cylinder bore to be honed, and constants ω and $n_{max}$ used to obtain a moving average Pi (which will be described). Step S1 is followed by step S2 to read in the measured inside diameter values Xi (i=0, 1, 2, ...) of the cylinder bore represented by the output signal received from the post-process measuring head 20.

Then, step S3 is implemented to read in the previous measured values Xi−1, Xi−2, ... stored in the auxiliary memory 32 (as indicated in FIG. 7).

Then, the control flow goes to step S4 in which a moving average Pi of a plurality of the measured values X which consist of the presently obtained measured value Xi and the previously obtained measured values X preceding the present value Xi. The moving average Pi will not abruptly change even if the currently obtained measured value Xi has changed by an extremely large amount from the last value X. For this reason, the moving average Pi is obtained in step S4. To calculate the moving average Pi, the following equation (1) is used:

$$P_i = \frac{\sum_{n=0}^{n_{max}} (\omega_{i-n} \cdot X_{i-n})}{\sum_{n=0}^{n_{max}} \omega_{i-n}} \qquad (1)$$

where,
  $\omega i$=weighting coefficient for the present value Xi
  $n_{max}$=number of the previous values X.

Step S4 is formulated such that the presently obtained measured value Xi is used as the moving average Pi until the number of the previous obtained values X stored in the auxiliary memory 32 becomes equal to $n_{max}$.

An example of a succession of measured values Xi is indicated in the graph of FIG. 8, while a succession of moving averages Pi obtained from the measured values Xi of FIG. 8 is indicated in the graph of FIG. 9.

Step S4 is followed by step S5 to calculate the error value Ri by subtracting the nominal value Ao from the moving average Pi calculated in step S4. Step S6 is then implemented to calculate a minimum square regression line on the basis of a suitable number of the previous moving averages P stored in the auxiliary memory 32 and the moving average Pi presently calculated in step S4. The number of the previous moving averages P used is equal to m (≧2). The derivative Ti is calculated on the basis of the calculated regression line. More specifically, the derivative Ti is calculated as the value tan θ where the gradient (radian) of the regression line is equal to θ.

Step S6 is formulated such that the derivative Ti is zero until the number of the moving averages P stored in the memory 32 becomes equal to m. That is, the derivative Ti cannot be obtained when the number of the stored moving averages P is smaller than m.

The control flow then goes to step S7 to read in the dead time value MS as represented by the output signal received from the workpiece counter 34. Step S7 is followed by step S8 to determine the provisional compensating value Ui, by fuzzy inference on the basis of the error value Ri, derivative Ti and dead time value MS.

The fuzzy inference implemented in step S8 will be described in detail.

At first, fuzzy inference values (logical sums) are calculated from the error value Ri and derivative Ti, according to the three groups of fuzzy rules discussed above. Namely, logical sums y1, y10 and y20 corresponding to the fuzzy rule groups for MS=1, MS=10 and MS=20 are obtained using the membership functions as indicated in FIGS. 3, 4 and 5, respectively. Then, values Zps, Zpm and Zpb corresponding to the present dead time value are calculated according to the three membership functions of FIG. 6, respectively. Successively, a product of y1 and Zps, a product of y10 and Zpm and a product of y20 and Zpb are calculated by multiplication, and a final fuzzy inference value y is eventually obtained on the basis of the calculated three products. The obtained final fuzzy inference value y is converted into the provisional compensating value Ui according to a suitable rule. The details of this rule are not essential to understand the principle of the present invention.

Step S8 is followed by step S9 to read in the two previous provisional compensating values Ui−1 and Ui−2 stored in the memory 32. Step S10 is then implemented to calculate a minimum square regression line on the basis of the two previous values Ui−1 and Ui−2 and the present value Ui, and obtain the final compensating value Ui* by adjusting the present value Ui on the basis of the calculated regression line. This manner of calculation assures gradual smooth compensation of the reference voltage of the automatic sizing device 22 as the honing operation progresses. That is, the final compensating value Ui* determined in step S10 will not abruptly or suddenly change, but gradually change, since the final value Ui* is obtained by adjusting the last obtained provisional value Ui by the two preceding values Ui−1 and Ui−2.

In step S10, the provisional value Ui obtained in step S9 is used as the final compensating value Ui* until the number of the previous provisional values Ui stored in the auxiliary memory 32 becomes equal to 2.

Then, the control flow goes to steps S11, S12, S13 and S14 to store respectively the values Xi, Pi, Ui and Ui* obtained in the present cycle. Step S15 is then implemented to apply the final compensating value Ui* to the automatic sizing device 22. Step S15 is followed by step S16 to store data indicative of identification numbers of the fuzzy rules applied in step S8 and the values of the appropriate membership functions. One cycle of the control routine is ended with the completion of step S16, and the control flow returns to step S2 for the next cycle of implementation of steps S2 through S16.

The data identifying the fuzzy rules applied for the fuzzy inference in step S8 are stored in the auxiliary memory 32 in step S16, for the purpose of facilitating accurate analysis and necessary modification or tuning of the contents of the fuzzy rules and the characteristics of the membership functions, by referring to the applied fuzzy rules and the frequency of the application, after the completion of a series of honing operations on a predetermined lot of workpieces W, for example.

It will be understood from the above description of the present embodiment that the compensating values U used as an extraneous signal to be applied to the automatic sizing device 22 are determined on the basis of not only the error values R but also the derivatives T which indicate the tendency of a change in the error values R, so as to accurately control the inside diameters of the honed cylinder bores, without influences by disturbances such as the measuring error and operating trouble of the in-process measuring head 18.

The present embodiment has further inherent advantages as described below.

To confirm an advantage of the present compensating apparatus, a simulation was conducted according to provisional compensating values Ui which are determined by fuzzy inference on the basis of the error values Ri and derivatives Ti obtained from the actually measured values Xi of the inside diameter of the honed cylinder bores. For comparison with the present embodiment, a comparative simulation was also conducted on a comparative apparatus adapted to determine the provisional compensating values Ui without using fuzzy inference, namely, determine the provisional compensating values Ui by using a PID (proportional plus integral plus differential or derivative) action control in which a product of the error value Ri, derivative Ti and an integral value (sum of some measured values X) is fed back.

Figure 10:
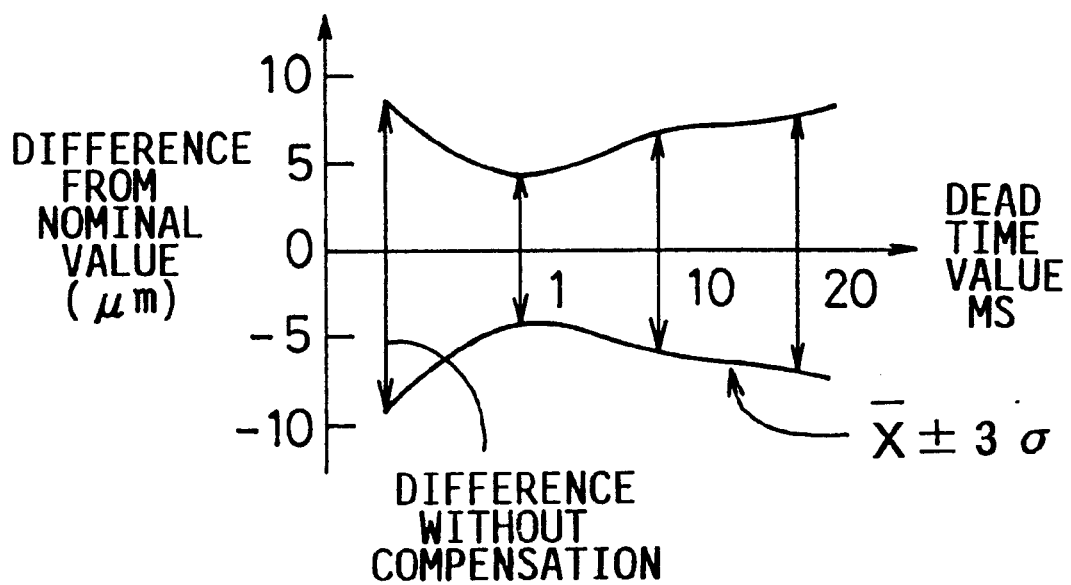
FIG. 10 is a graph indicating an advantage of the feedback compensating apparatus of the above embodiment, which was exhibited by simulation.
Figure 11:
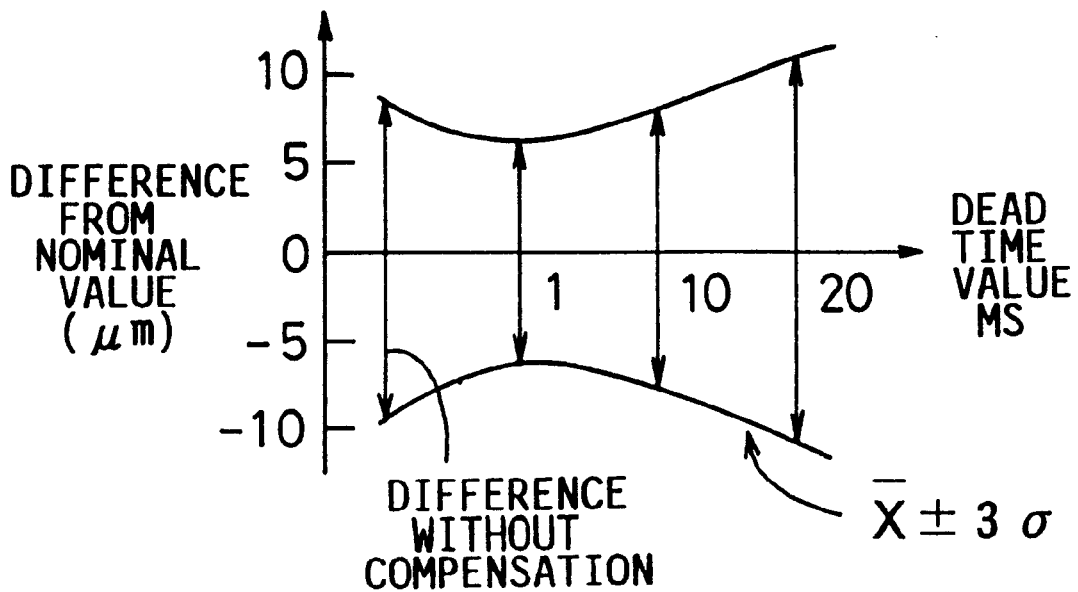
FIG. 11 is a graph indicating the performance of a comparative counterpart apparatus also exhibited by simulation.

The actually measured values X in the simulation of the present embodiment are indicated in the graph of FIG. 10, while those in the simulation test of the comparative apparatus are indicated in the graph of FIG. 11. In the graphs, the range ±3σ of the measured values X is indicated as a difference from the nominal value. It will be apparent from the graphs that the range ±3σ is narrower over the entire range of the dead time value MS, in the present apparatus than in the comparative apparatus. This means better dimensional accuracy of the cylinder bores honed by the present apparatus than the dimensional accuracy in the comparative apparatus.

Further, the present apparatus can be obtained by simply adding the control device 28, auxiliary memory 32 and communication cables, to an existing honing system which includes the honing machine 10, in-processing measuring heads 18, automatic sizing device 22 and post-process measuring device 14. Further, the above components or devices to be added can be comparatively easily connected to the existing honing system, and are relatively inexpensive. The present apparatus assures improved dimensional accuracy of the honed workpieces by utilizing unique software programs, and without modifying the hardware of the honing machine 10 per se. Thus, the present invention can be readily practiced at a comparatively low cost.

Usually, a working system such as the honing system described above adapted to perform a given working operation on a succession of workpieces in a production line to manufacture a certain end product such as a cylinder block is provided with a measuring device adapted to check the honed or otherwise processed workpieces for their dimensional accuracy and prevent the transfer of the inaccurately processed workpieces to the next working system. Such a measuring device can be utilized as the post-process measuring device 14 for measuring the dimension of the honed workpieces W to compensate the reference voltage of the automatic sizing device 22 by feeding back the compensating value Ui*. Although an exclusive post-process measuring device for the automatic sizing device 22 can be provided in addition to the existing measuring device, the function of the existing measuring device can be effectively utilized as the post-process measuring device 14, to provide the feedback compensating apparatus for the sizing device 22 at a relatively reduced cost.

Where the holes such as the cylinder bores to be honed by the honing machine 10 should be finished so as to fit mating components such as pistons, with substantially no clearance. In this case, the dimension of the holes should have a predetermined relationship with the dimension of the mating components. In other words, the inside diameter of a specific hole should be substantially equal to the outside diameter of the mating component.

In the conventional working system, however, it is difficult to reduce the dimensional variation of the holes to within a relatively tight tolerance. Hence, it is required to classify the holes into several groups depending upon the dimension of the holes, and similarly classify the mating components into the corresponding groups also depending upon the dimension of the components, so that the component of a given group is combined with the hole of the corresponding group, to provide a set. To this end, it is necessary to use additional devices such as a device for providing markings near the holes to identify their classification groups, a device for reading the markings, a device for classifying the workpieces according to the classification of the holes, and a device for storing the workpieces as classified.

The present compensating apparatus which assures significantly reduced variation in the dimensional accuracy of the honed cylinder bores eliminates the conventional need for classifying the finished workpieces, or at least reduces the number of the classification groups, and therefore eliminates or at least reduce the cost, labor and space for the classification.

Another simulation was conducted according to final compensating values Ui* which are determined for gradual smooth adjustment of the reference voltage, namely, obtained by adjusting the presently obtained provisional compensating value Ui by the previous provisional compensating values U. The provisional compensating value Ui is determined by fuzzy inference as described above with respect to the simulation whose result is indicated in FIG. 10. For comparison with the present embodiment, a comparative simulation was conducted on a comparative apparatus in which the provisional compensating values Ui are not processed for gradual smooth adjustment of the reference voltage.

Figure 12:
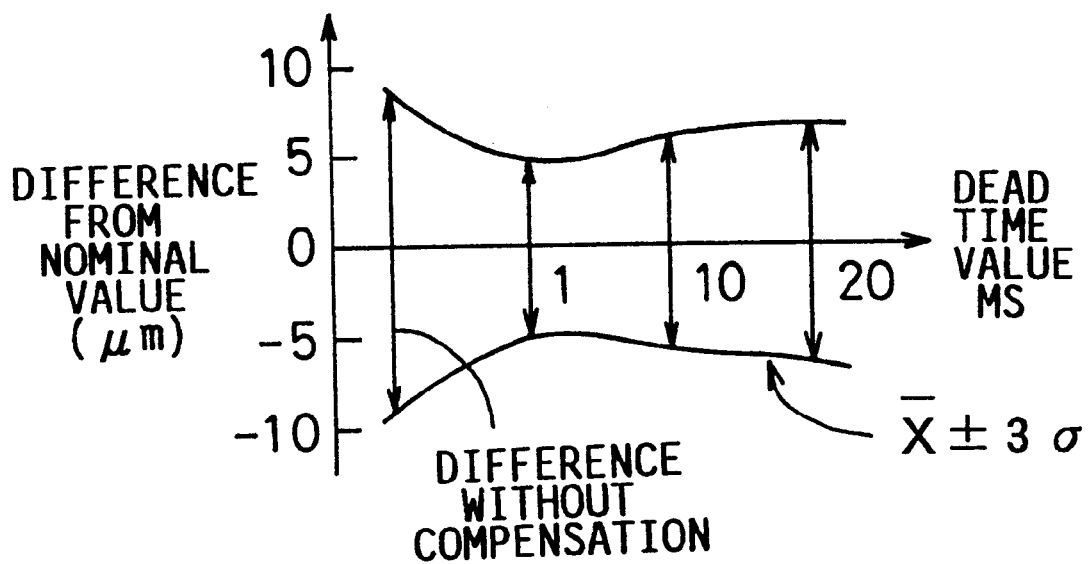
FIG. 12 is a graph indicating another advantage of the apparatus of the same embodiment exhibited by another simulation
Figure 13:
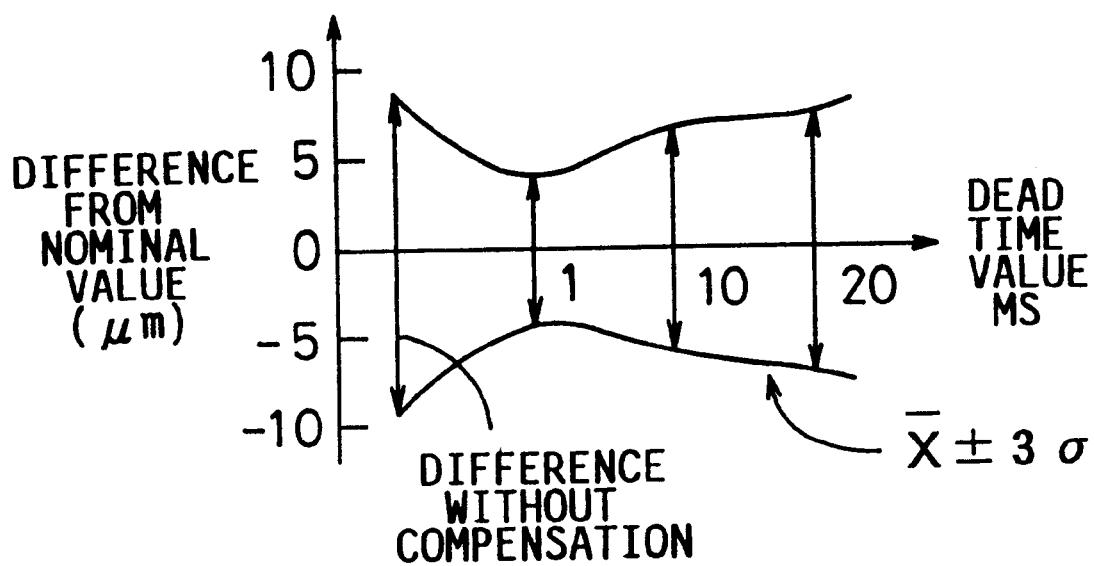
FIG. 13 is a graph indicating the performance of a comparative apparatus counterpart apparatus.

The measured values X in the simulation of the present apparatus are indicated in the graph of FIG. 12, while those in the simulation of the comparative apparatus are indicated in the graph of FIG. 13 (similar to that of FIG. 10). In these graphs, the range ±3σ of the measured values X is expressed as a difference from the nominal value.

It will be noted from the graphs of FIGS. 12 and 13 that the rate of change in the difference from the nominal value as the dead time value MS increases is lower in the present apparatus than in the comparative apparatus. It will also be noted that the difference where the dead time value MS is equal to 20 is smaller in the present apparatus than in the comparative apparatus. Thus, the present apparatus using the final compensating values Ui* which will relatively gradually change assures improved stability in the dimensional accuracy of the honed cylinder bores, independently of an increase in the dead time value MS.

The embodiment which has been described above by reference to FIGS. 1–9 may be modified as needed.

For instance, the control program or routine of FIG. 2 may be modified by adding a step for informing the operator of a possibility of a defect or trouble with the in-process measuring head 18 if the absolute value of the calculated derivative T exceeds a given threshold value once or a predetermined number of times or more in successive cycles of implementation of the control routine of FIG. 2. This arrangement frees the operator from an inspecting job for diagnosing the in-process measuring head 18, and permits easy and early detection of any trouble with the head 18, and early remedy for the detected trouble.

The above step to be added may be modified, for example, such that a trouble with the head 18 is detected by calculating a difference between the presently measured value Xi and the preceding measured value Xi−1 stored in the auxiliary memory 32, and compare the difference with a predetermined threshold.

In the embodiment of FIGS. 1–9, the relationships or so-called "rules of thumbs" empirically recognized as existing among the error value R, derivative T and compensating value U are represented by fuzzy rules on which the reference voltage used as a honing condition by the automatic sizing device 22 is adjusted or compensated, regardless of whether the relationships or rules of thumbs are linear or non-linear. Thus, the automatic sizing device 22 can be optimally controlled in relation to various factors involved in the honing operation. However, the compensating value U may be determined by any suitable method other than the fuzzy inference, for instance, by a PID (proportional, integral and derivative or differential) control method or other modern control methods.

Further, the illustrated embodiment uses only three groups of fuzzy rules corresponding to the dead time value MS of 1, 10 and 20, and is therefore available at accordingly reduced cost and time for formulating and storing the fuzzy rules.

In the illustrated embodiment, the fuzzy rules of TABLES 1, 2 and 3 are formulated to determine the compensating value U regardless of the actually detected dead time value MS (number Y of the pre-measured workpieces W), and independently of the membership functions of FIG. 6 associated with the dead time value MS. This arrangement facilitates the designing of the programs for the fuzzy inference, contrary to an arrangement in which the fuzzy rules are formulated to determine the compensating value U on the basis of the three detected variables which include the dead time value MS.

As suggested above, the fuzzy rules are used to determine the compensating value U as one output on the basis of the error value R and derivative T as two inputs. However, the compensating value U may be determined by fuzzy inference on the basis of three inputs consisting of the variables R, T and MS.

While the illustrated embodiment is applied to the honing system with one honing machine 10 and one post-process measuring device 14 disposed along a single working or honing line for honing the workpieces W of the same kind, the present compensating apparatus may be modified so as to be used for other types of working system.

Figure 14:
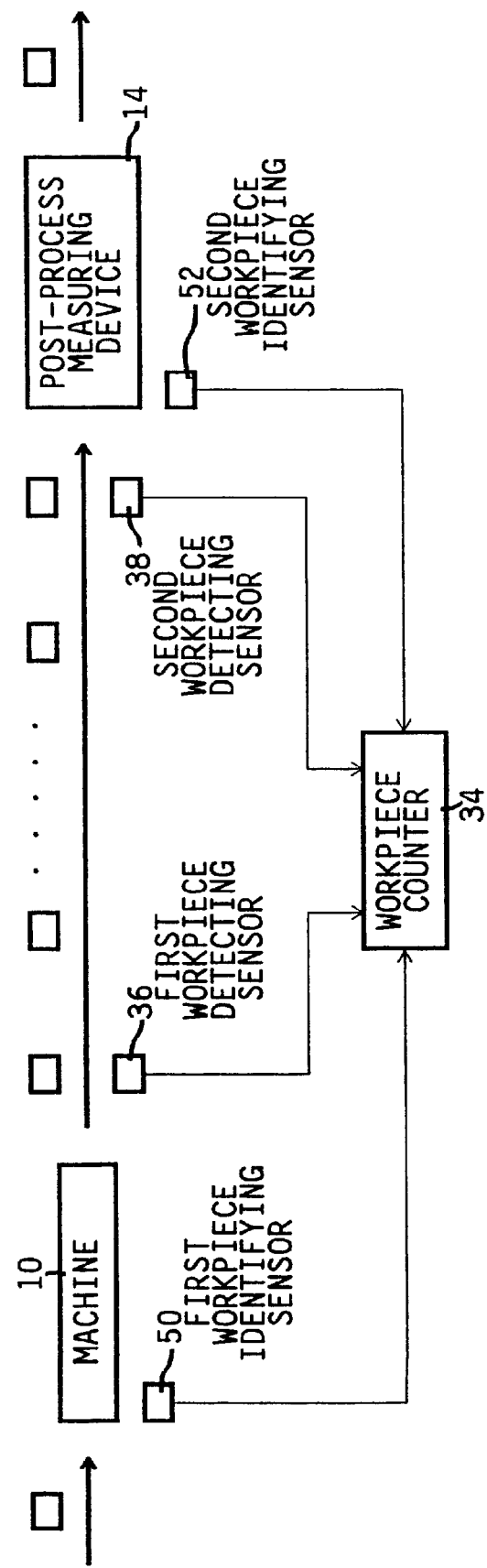
FIG. 14 is a schematic view depicting a modified form of the feedback compensating apparatus of the above embodiment, for explaining the principle of obtaining the number of the workpieces between the honing station and the post-process measuring device.

For instance, the present invention may be embodied as a compensating apparatus for a single-line working system capable of dealing with different kinds of workpieces. In this case, the compensating apparatus of FIG. 1 is modified as shown in FIG. 14, for instance. Described more specifically, the apparatus includes two workpiece identifying sensors 50 and 52 in addition to the workpiece counter 34 and the first and second workpiece detecting sensors 36, 38. The first workpiece identifying sensor 50 is disposed at the upstream end of the honing machine 10 and identifies the kind of the workpiece loaded onto the machine 10. The output signal of the sensor 50 is fed to the workpiece counter 34, and also to the automatic sizing device 22 so that the device 22 selects the reference voltage corresponding to the nominal dimension of the workpiece whose kind is represented by the output signal. The second workpiece identifying sensor 52 is disposed at the upstream end of the post-process measuring device 14 and identifies the kind of the workpiece to be measured by the measuring device 14. The output signal of this sensor 52 is fed to the workpiece counter 34, and also to the measuring device 14 so that the device 14 selects the appropriate measuring head 20. Further, the workpiece counter 34 is adapted to count the number Y of the pre-measured workpieces of each kind. If the transfer of the workpiece of a given kind from the machine 10 is detected by the first workpiece detecting sensor 36, the count corresponding to the kind of the workpiece identified by the sensor 50 is incremented. The same count is decremented if the transfer of the workpiece of the same kind into the measuring device 14 is detected by the second workpiece detecting sensor 38 and the second workpiece identifying sensor 52. Thus, the numbers Y of the pre-measured workpieces of all kinds are counted by the counter 34.

Since the generation of the output signal of the second identifying sensor 52 indicates the transfer of the workpiece into the measuring device 14, the second workpiece detecting sensor 38 may be omitted.

Figure 15:
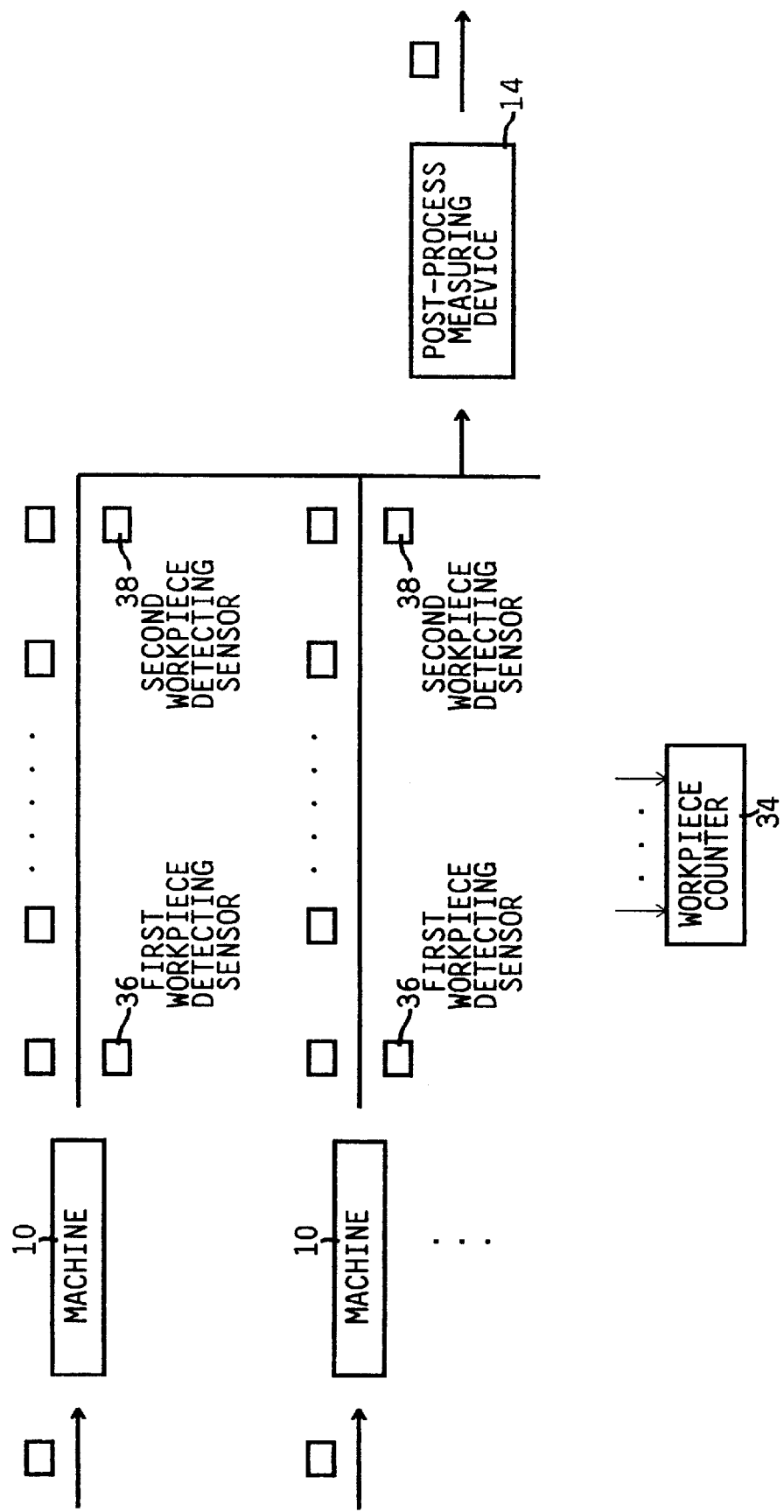
FIG. 15 is a schematic view similar to that of FIG. 14, depicting a further modified form of the apparatus.

Referring to FIG. 15, there is shown another modified working system which includes a plurality of working machines 10 adapted to deal with the workpieces of the same kind, and one post-process measuring device 14. In the specific example of FIG. 15, the working system has two machines 10 disposed at the upstream ends of the respective working lines which lead at the downstream ends to the measuring device 14. In this case, the compensating apparatus should adjust the working conditions of the two machines 10 independently of each other since the operating characteristics of the two machines 10 are generally different, even though the workpieces of the same kind are dealt with by the two machines 10. Accordingly, the compensating apparatus is preferably arranged as described below, for example.

The compensating apparatus has the first and second workpiece detecting sensors 36, 38 for each of the two machines 10, and the workpiece counter 34 commonly used for the two machines 10. The second workpiece detecting sensors 38 are disposed at the downstream ends of the parallel two working lines downstream of the respective machines 10. The workpiece counter 34 is adapted to count the numbers Y of the pre-measured workpieces transferred from the respective machines 10. If the transfer of the workpieces from the machines 10 is detected by the first sensors 36, 36, the respective counts corresponding to the two machines 10 are incremented. If the transfer of the workpieces into the measuring device 14 is detected by the second workpiece detecting sensors 38, 38, the respective counts are decremented. This arrangement is preferable for the reason indicated above. Since the working lines are arranged to transfer the workpieces from the ends of the lines directly to the measuring device 14, the two second workpiece detecting sensors 38 are able to detect the transfer of the workpieces from these two lines into the measuring device 14.

The compensating apparatus is also applicable to a working system including a plurality of machines as in the example of FIG. 15, each of which is however adapted to deal with different kinds of workpieces. In this case, the compensating apparatus should adjust the working conditions of the different machines, depending on the kinds of the workpieces. Therefore, the compensating apparatus is preferably arranged as shown in FIG. 16, for example.

Figure 16:
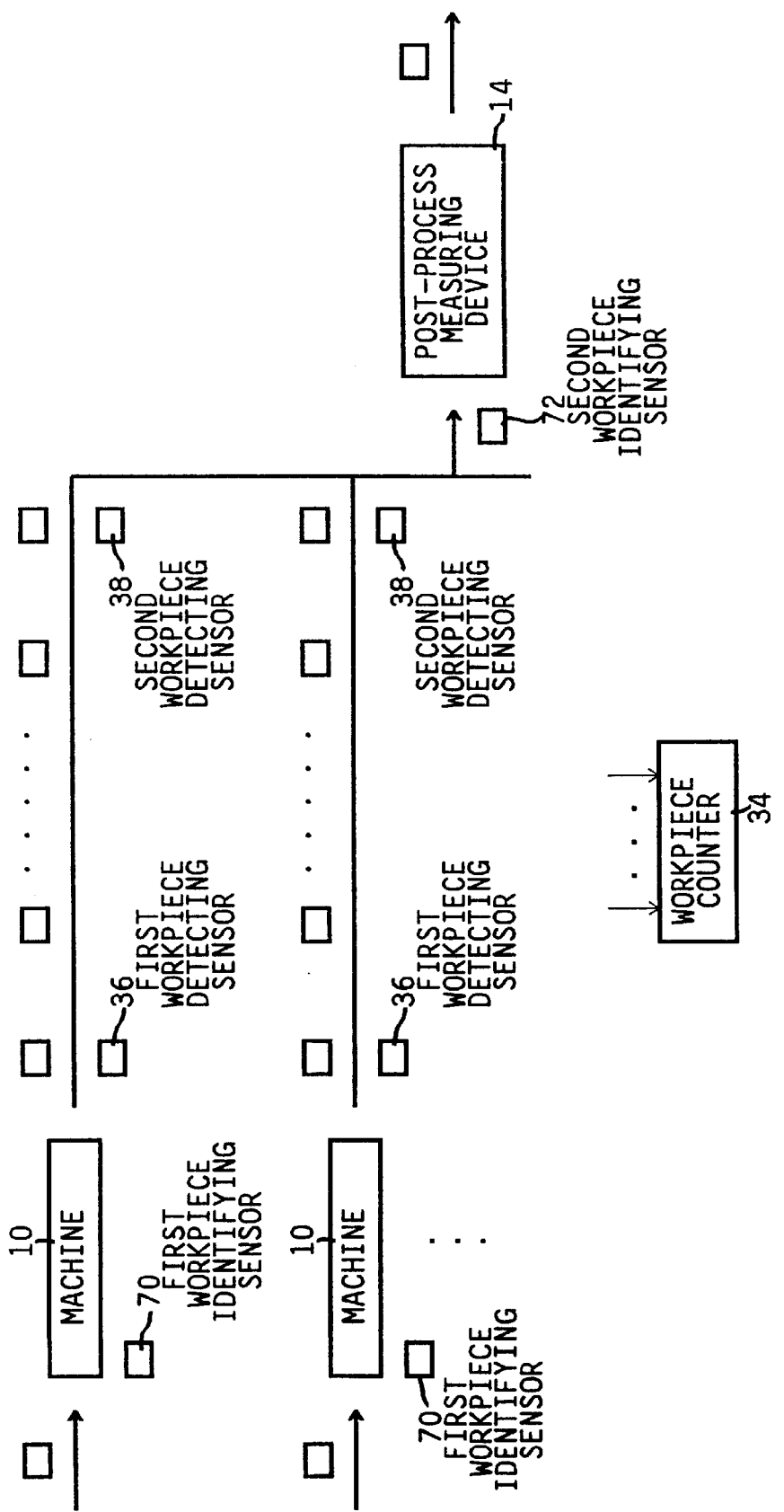
FIG. 16 is a schematic view also similar to that of FIG. 14, depicting a still further modification of the apparatus.

In the example of FIG. 16 wherein two machines 10 are provided, the compensating apparatus includes two workpiece identifying sensors 70, 70, and one second workpiece identifying sensor 72, in addition to one workpiece counter 34, two first workpiece detecting sensors 36 and two second workpiece detecting sensors 38 as provided in the example of FIG. 15. Each first workpiece identifying sensor 70 is disposed at the upstream end of the appropriate machine 10, and identifies the kind of the workpieces loaded onto the machine. The second workpiece identifying sensor 72 is disposed at the upstream end of the measuring device 14, and also identifies the kind of the workpieces transferred into the measuring device 14. The workpiece counter is adapted to count the numbers Y of the pre-measured workpieces of each kind transferred from each of the two machines 10. Accordingly, the number of the counts is equal to the number of combinations of the machine and the workpiece kind. If the transfer of the workpiece of a given kind from one of the two machines 10 is detected by the appropriate first workpiece detecting sensor 36, the count corresponding to the combination of that one machine (recognized by the position of the sensor 36) and that given workpiece kind (identified by the sensor 70) is incremented. If the transfer of the workpiece of that kind into the measuring device 14 is detected by the sensors 38, 72, the same count is decremented. For the reason indicated above, the present arrangement for counting the numbers Y of the pre-measured workpieces is preferable.

The second workpiece detecting sensors 38 may be omitted in the example of FIG. 16, if the second workpiece identifying sensor 72 is modified to identify the machines 10 from which the workpieces are transferred, as well as the kinds of the workpieces. For instance, suitable markings indicating the identification numbers of the machines 10 by which the workpieces are processed are provided directly or indirectly on the workpieces, and the sensor 72 reads the markings.

In the embodiment of FIGS. 1–9, workpieces are successively processed one after another, and each workpiece has a plurality of working portions or cylinder bores which are honed concurrently by respective tools. Further, dimensional data are obtained for each of the working portions or honed cylinder bores, to determine the compensating values for adjusting the working conditions of the individual working portions of the workpiece. However, it is possible to obtain the dimensional data for a selected one of the working portions of each workpiece, and determine the compensating value for the selected working portion. In this case, the obtained compensating value is utilized to adjust the working conditions of the other working portions. This arrangement eliminates the need of obtaining the dimensional data on the other working portions and determining the compensating values on the basis of those dimensional data.

In the illustrated embodiment, each working portion (cylinder bore) of the workpiece has only one diameter (inside diameter), the principle of the invention is applicable to a cylindrical working portion having a plurality of different diameters at respective axial positions of the working portion. In the former case, there is only one dimension (diameter) to be measured by the post-process measuring device. In the latter case, each of the dimensions (diameters) at the different axial positions of the cylindrical working portion is measured, and the principle of the invention is applicable to each or any one of those dimensions.

Referring next to FIGS. 17–23, there will be described a second embodiment of the feedback compensating apparatus of the present invention. Unlike the first embodiment of FIG. 1, this second embodiment does not include the workpiece counter 34, and the workpiece detecting sensors 36, 38. Further, the control program or routine stored in the read-only memory of the control device 28 of the second embodiment is different from that of the first embodiment illustrated in FIG. 2.

Figure 17:
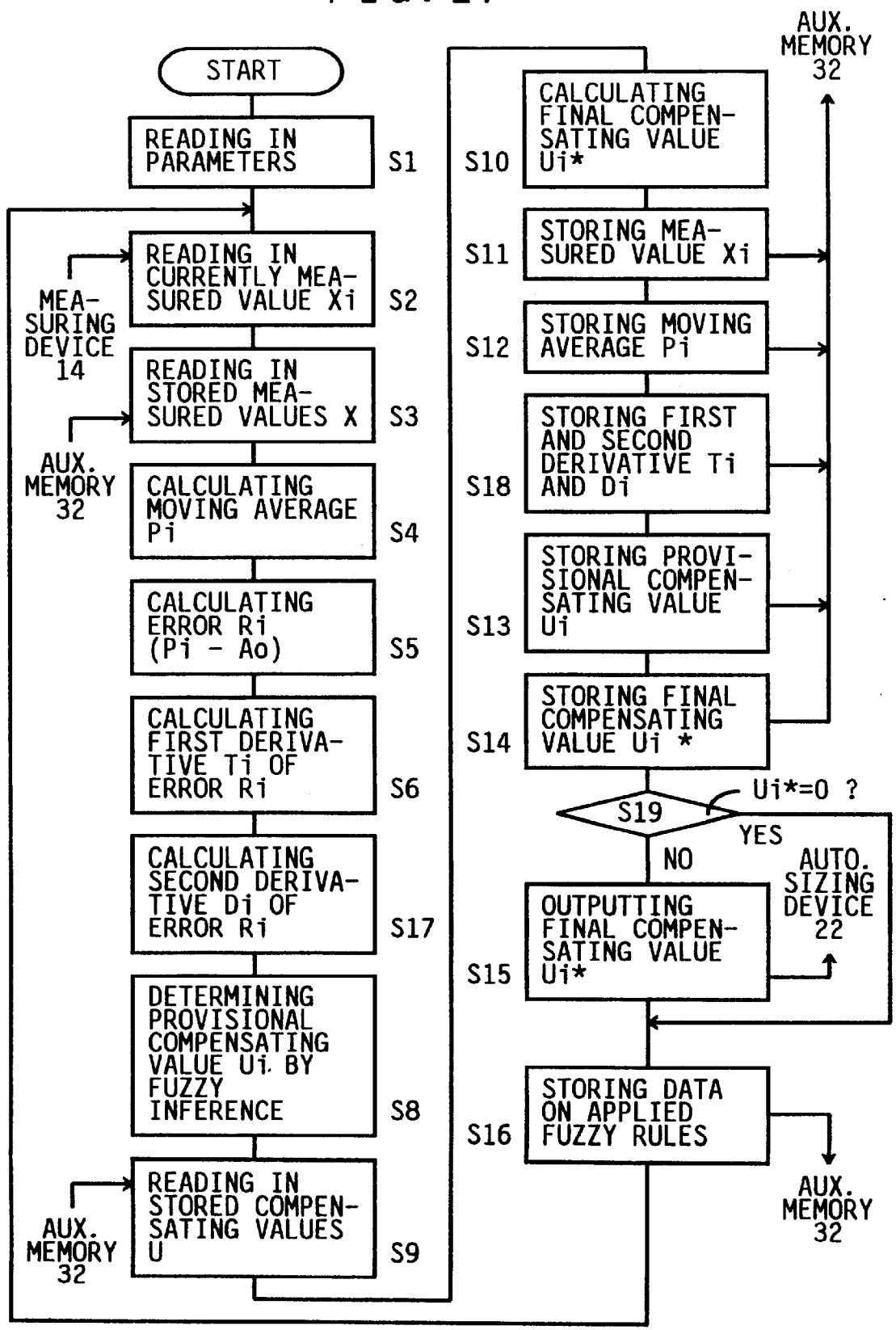
FIG. 17 is a flow chart illustrating a control program stored in a read-only memory of a computer of a control device used in another embodiment of the present invention.
Figure 19:
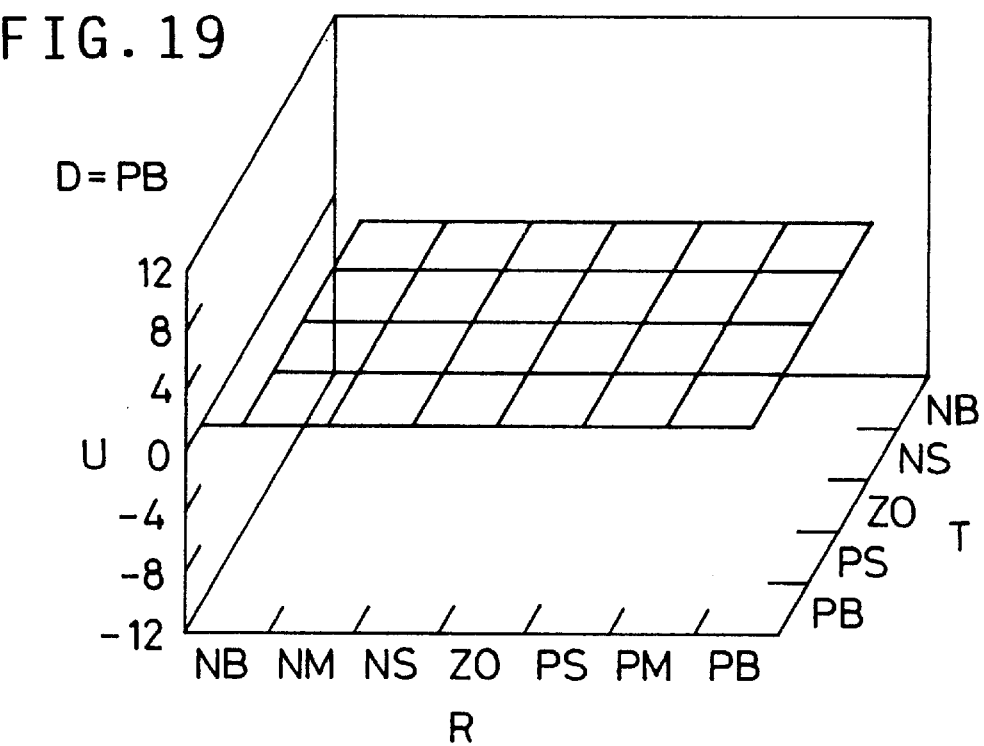
FIG. 19 is a view illustrating a group of fuzzy rules indicated in Table 1, which is used in the second embodiment of FIG. 17.
Figure 20:
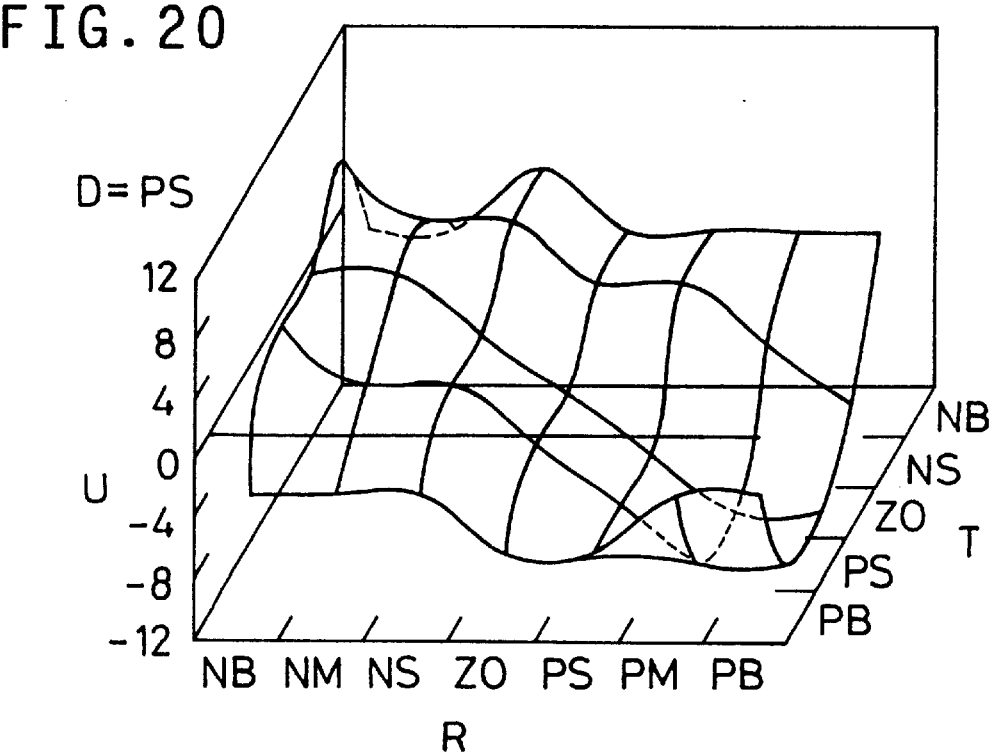
FIGS. 20, 21, 22 and 23 are views similar to that of FIG. 19, illustrating respective groups of fuzzy rules indicated in Tables 2, 3, 4 and 5.
Figure 21:
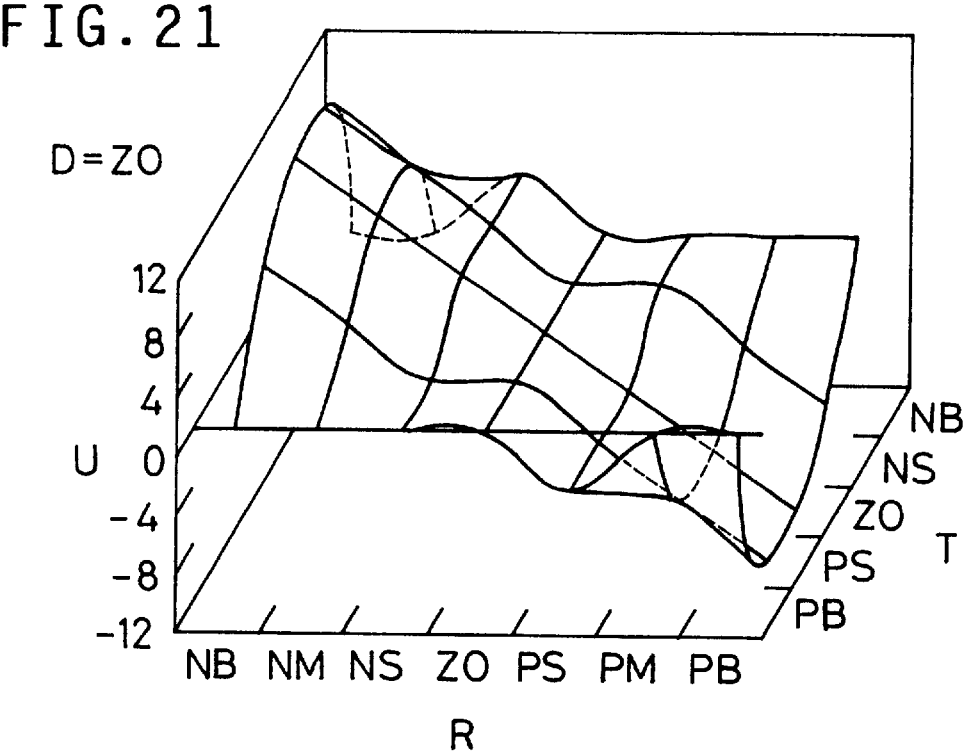
Figure 22:
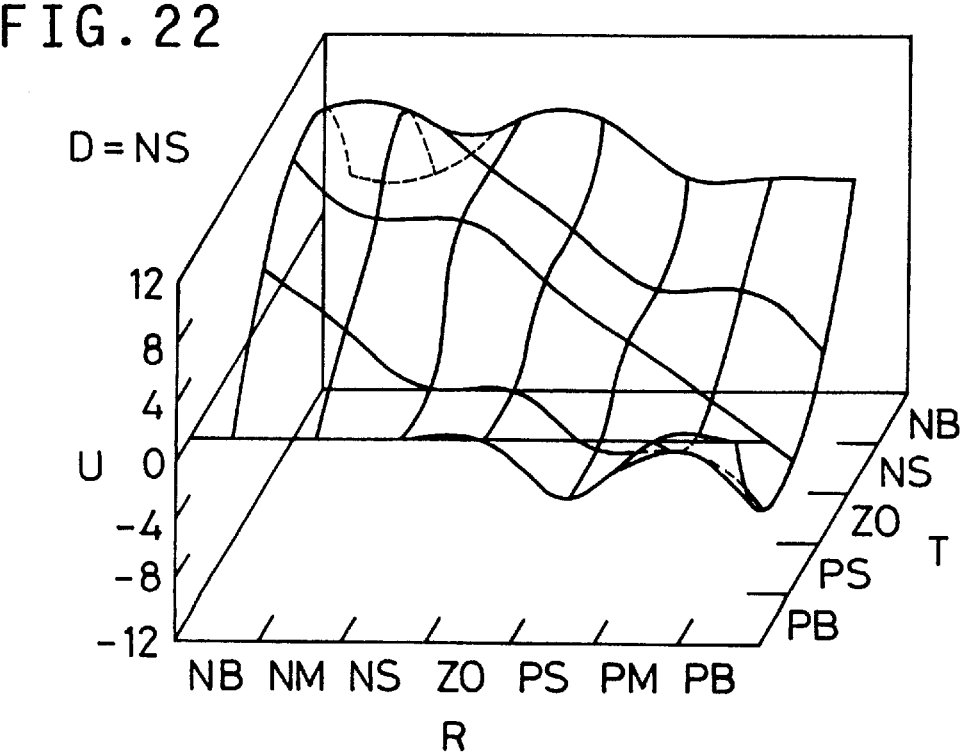
Figure 23:
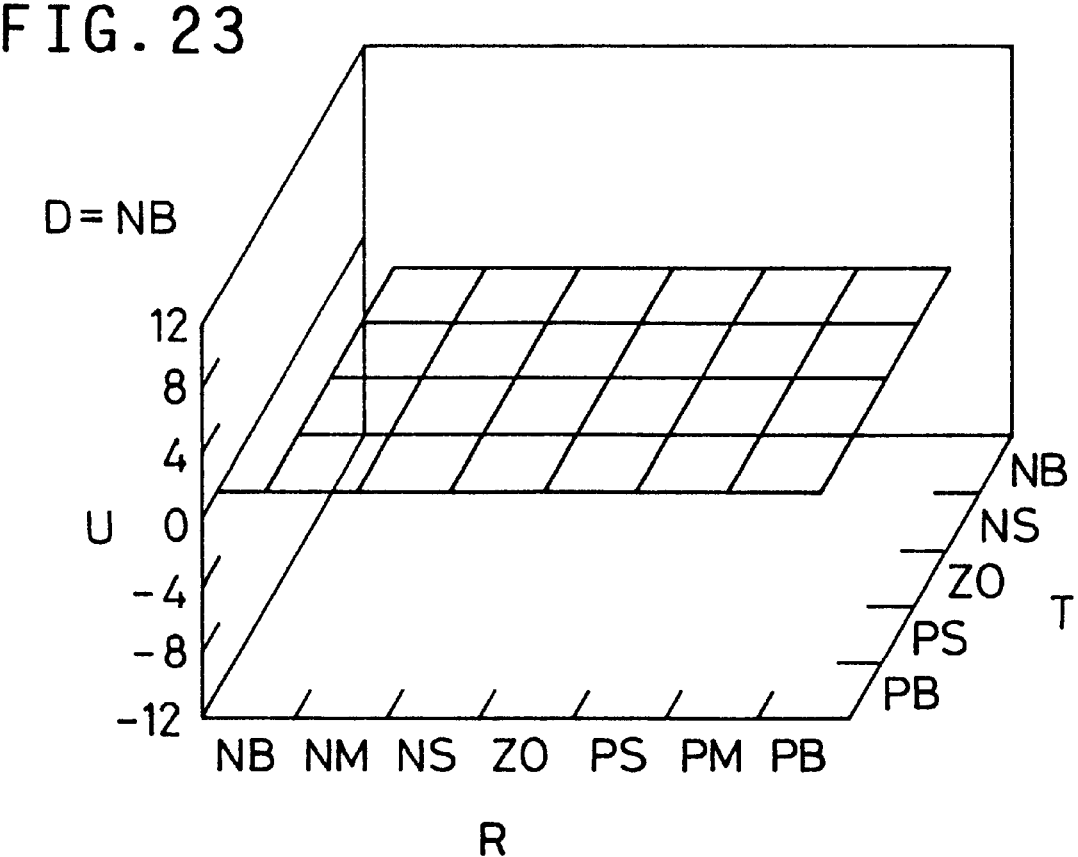

Described more specifically, the read-only memory of the control device 28 used in the second embodiment stores the control program as illustrated in the flow chart of FIG. 17, which is implemented to determine the final compensating value $Ui^*$ and adjust the reference voltage of the automatic sizing device 22 according to the compensating value $Ui^*$.

The read-only memory of the control device 28 also stores fuzzy inference data used for determining the compensating value $Ui$ by fuzzy inference. The fuzzy inference data include: (a) fuzzy inference programs; (b) membership functions associated with the error value R; (c) membership functions associated with the derivative T of the error value R; (d) membership functions associated with a derivative D of the derivative T, i.e., a second derivative of the error value R; (e) membership functions associated with the compensating value Ui (provisional compensating value); and (f) five groups of fuzzy rules for defining relationships among the error value R, first derivative T, second derivative D and compensating value Ui.

For the error value R, the control device 28 uses seven fuzzy labels NB (negative big), NM (negative medium), NS (negative small), ZO(zero), PS (positive small), PM (positive medium) and PB (positive big), as used in the first embodiment. The membership functions of these fuzzy labels are indicated in the graph of FIG. 3.

For the first derivative T and the second derivative D, the control device 28 uses five fuzzy labels NB, NS, ZO, PS and PB, whose values increase in the order of description from a negative value to a positive value. The membership functions of these fuzzy labels for the derivative T are indicated in the graph of FIG. 4, while those for the derivative D are indicated in the graph of FIG. 18.

For the compensating value U, the control device 28 uses the seven fuzzy labels NB, NM, NS, ZO, PS, PM and PB, as used in the first embodiment. The membership functions of these seven fuzzy labels are indicated in FIG. 5. As described above with respect to the first embodiment, the reference voltage of the automatic sizing device 22 is increased and the inside diameter of the honed cylinder bore is accordingly increased as the compensating value U is increased. The reference voltage and the inside diameter are decreased as the compensating value U is decreased.

The control device 28 uses the five groups of fuzzy rules, which are optically used for fuzzy inference to determine the compensating value U when the fuzzy label of the second derivative D is NB, NS, ZO, PS and PB, respectively. These groups of fuzzy rules are indicated in the following TABLES 4–8, respectively:

For easier understanding, the five groups of fuzzy rules indicated in TABLES 4–8 are illustrated in three-dimensional graphs of FIGS. 19–23, respectively.

TABLE 4

| | | | | R (μm) | | | |
|---|---|---|---|---|---|---|---|
| D = PB | NB | NM | NS | ZO | PS | PM | PB |
| T NB | ZO | ZO | ZO | ZO | ZO | ZO | ZO |
| NS | ZO | ZO | ZO | ZO | ZO | ZO | ZO |
| ZO | ZO | ZO | ZO | ZO | ZO | ZO | ZO |
| PS | ZO | ZO | ZO | ZO | ZO | ZO | ZO |
| PB | ZO | ZO | ZO | ZO | ZO | ZO | ZO |

TABLE 5

| | | | | R (μm) | | | |
|---|---|---|---|---|---|---|---|
| D = PS | NB | NM | NS | ZO | PS | PM | PB |
| T NB | ZO | ZO | PS | ZO | ZO | ZO | ZO |
| NS | PM | PS | PS | ZO | ZO | NS | NM |
| ZO | PS | PS | ZO | NS | NM | NB | NB |
| PS | PS | ZO | ZO | NS | NM | NB | NB |
| PB | NS | NS | NS | NM | NM | NS | NS |

TABLE 6

| | | | | R (μm) | | | |
|---|---|---|---|---|---|---|---|
| D = ZO | NB | NM | NS | ZO | PS | PM | PB |
| T NB | ZO | ZO | PS | ZO | ZO | ZO | ZO |
| NS | PB | PM | PS | ZO | ZO | NS | NM |
| ZO | PB | PM | PS | ZO | NS | NM | NB |
| PS | PM | PS | ZO | ZO | NS | NM | NB |
| PB | ZO | ZO | ZO | ZO | NS | ZO | ZO |

TABLE 7

| | | | | R (μm) | | | |
|---|---|---|---|---|---|---|---|
| D = NS | NB | NM | NS | ZO | PS | PM | PB |
| T NB | PS | PS | PM | PM | PS | PS | PS |
| NS | PB | PB | PM | PS | ZO | ZO | NS |
| ZO | PB | PM | PM | PS | ZO | NS | NS |
| PS | PM | PS | ZO | ZO | NS | NS | NM |
| PB | ZO | ZO | ZO | ZO | NS | ZO | ZO |

TABLE 8

| | | | | R (μm) | | | |
|---|---|---|---|---|---|---|---|
| D = NB | NB | NM | NS | ZO | PS | PM | PB |
| T NB | ZO | ZO | ZO | ZO | ZO | ZO | ZO |
| NS | ZO | ZO | ZO | ZO | ZO | ZO | ZO |
| ZO | ZO | ZO | ZO | ZO | ZO | ZO | ZO |
| PS | ZO | ZO | ZO | ZO | ZO | ZO | ZO |
| PB | ZO | ZO | ZO | ZO | ZO | ZO | ZO |

An example of a fuzzy rule is expressed as follows:
IF R=NS and T=PS, THEN U=ZO

Each of the five groups of fuzzy rules is designed, as a principle, so as to reduce the compensating value U not only with an increase in the error value R represented by the fuzzy labels, but also with an increase in the first derivative T. The five groups of fuzzy rules are differently formulated so as to reduce the compensating value U with an increase in the second derivative D.

The above concepts are represented in TABLE 6, for example, as follows: That is, where the derivative T is NS, the compensating value U decreases in the order of PB, PM, PS, ZO, NS and NM as the error value R increases. Further, where the error value R is NM, the compensating value U decreases in the order of PM, PM and PS as the derivative T increases in the order of NS, ZO and PS.

As in the first embodiment, the fuzzy rules are also formulated so as to change the compensating value U toward zero ("0"), when the measured value X represented by the output of the post-process measuring head 20 suddenly decreases or increases to a considerably extent. Thus, the control device 28 ignores such sudden change of the output of the post-process measuring head 20 that may be caused by a sudden change in the output of the in-process measuring head 18 due to a temporary trouble with the head 18. Accordingly, the subsequent honing operations are performed, without suddenly changing the reference voltage to be used by the automatic sizing device 22, so as to minimize the influence of the trouble of the head 18 on the dimensional accuracy of the honed cylinder bore of the workpieces W.

The above concept is represented in TABLE 6, for example, such that the compensating value U is ZO where the error value R is NB or NM while the first derivative T is NB, or where the error value is PM or PB while the first derivative T is PB.

Further, the relationship between the second derivative D and the compensating value U is determined such that the compensating value U is generally smaller when the second derivative D is PS than when the second derivative D is ZO, and such that the compensating value U is generally larger when the second derivative is NS than when the second derivative D is ZO. However, the compensating values U when the second derivative D is PS and those when the second derivative D is NS are not completely symmetrical with respect to the compensating values U when the second derivative D is ZO. This asymmetrical relationship permits improved stability of the dimensional accuracy of the honed cylinder bores.

It is also noted that the compensating value U is generally ZO when the second derivative D is PB or NB, for the same reason as when the absolute values of the error value R and first derivative T are relatively large.

Referring to the flow chart of FIG. 17, there will be described the operation of the feedback compensating apparatus for adjusting the reference voltage of the automatic sizing device 22, depending upon the output of the post-process measuring head 20. In FIG. 17, the same step numbers as used in FIG. 2 are used to identify the corresponding steps.

Like the control program illustrated in FIG. 2 of the first embodiment, the control program of FIG. 17 is adapted to first calculate the error value Ri on the basis of the measured value Xi represented by the output signals of the head 20 currently received by the control device 28. Then, the first and second derivatives Ti and Di of the error value Ri are calculated. On the basis of the calculated error value Ri and derivatives Ti and Di, the provisional compensating value Ui is determined. Finally, the final compensating value Ui* is determined by adjusting the currently determined provisional compensating value Ui on the basis of the previous provisional compensating values Ui.

Steps S1–S6 are implemented as in the first embodiment. The calculation of the moving average Pi in step S4 is conducted according to the above equation (1). In this connection, it is noted that the weighting coefficient $\omega i$ and the number $n_{max}$ used in the equation (1), as well as the fuzzy rules and membership functions are determined on the assumption that the number Y of the pre-measured workpieces W is "19" and the dead time value MS is therefore "20".

Step S6 is followed by step S17 to calculate a minimum square regression line on the basis of the presently obtained first derivative Ti calculated in step S6 and a suitable number of the previous first derivative values T stored in the auxiliary memory 32. The number of the previous first derivative values T is equal to r ($\geq 2$). The second derivative Di is calculated on the basis of the calculated regression line.

Like the first derivative Ti, the second derivative Di in step S17 is zeroed until the number of the previous first derivative values T stored in the memory 32 becomes equal to r.

It is noted that the first derivative Ti obtained in step S6 represents the tendency of change in the error value Ri (moving average Pi), and the second derivative Di obtained in step S17 represents the tendency of change in the first derivative Ti.

After the error value Ri and the first and second derivatives Ti and Di are obtained, the control flow goes to step S8 to determine the provisional compensating value Ui by fuzzy inference. The fuzzy inference implemented in this step S8 will be described in detail.

Initially, fuzzy inference values (logical sums) are calculated from the error value Ri and first derivative Ti, according to the five groups of fuzzy rules of TABLES 4–8 discussed above. Namely, logical sums Ynb, Yns, Yzo, Yps and Ypb corresponding to the fuzzy rule groups for D=NB, D=NS, D=ZO, D=PS and D=PB are obtained using the membership functions as indicated in FIGS. 3, 4 and 5, respectively. Then, values Znb, Zns, Zzo, Zps and Zpb corresponding to the present second derivative Di are calculated according to the five membership functions of FIG. 18, respectively. Successively, a product of Ynb and Znb, a product of Yns and Zns, a product of Yzo and Zzo, a product of Yps and Zps and a product of Ypb and Zpb are calculated by multiplication, and a final fuzzy inference value y is eventually obtained on the basis of the calculated five products. The obtained final fuzzy inference value y is converted into the provisional compensating value Ui according to a suitable rule. The details of this rule are not essential to understand the principle of the present invention.

Step S8 is followed by steps S9–S12 as described above with respect to the first embodiment. In step S10, the final compensating value Ui* is obtained by adjusting the present value Ui on the basis of the regression line calculated from the present provisional compensating value Ui and the two previous provisional compensating values Ui–1 and Ui–2. The thus obtained final compensating value Ui* assures gradual smooth compensation of the reference voltage of the automatic sizing device 22 as the honing operation progresses. The provisional value Ui obtained in step S9 is used in step S10 as the final compensating value Ui* until the number of the previous provisional values Ui stored in the auxiliary memory 32 becomes equal to 2.

Step S12 is followed by step S18 to store the first and second derivatives Ti and Di in the auxiliary memory 32. Step S18 is followed by steps S13 and S14 to store the provisional and final compensating values Ui and Ui* in the auxiliary memory 32, as in the first embodiment.

Then, the control flow goes to step S19 to determine whether the final compensating value Ui* is zero or not. If the value Ui* is not zero (if a negative decision "NO" is obtained in step S19), step S15 is implemented to apply the final compensating value Ui* to the automatic sizing device 22, and the control flow goes to step S16 described above. If the value Ui* is zero (if an affirmative decision "YES" is obtained in step S19), the control flow goes from step S19 directly to step S16, skipping step S15. One cycle of the control routine of FIG. 17 is ended with the completion of step S16, and the control flow returns to step S2 for the next cycle of implementation of steps S2 through S16.

It will be understood from the above description of the second embodiment that the final compensating values Ui* are determined on the basis of not only the error values R and the first derivative T of the error value R but also the second derivatives D of the error values R, so as to accurately control the inside diameters of the honed cylinder bores, without influences by disturbances such as the measuring error and operating trouble of the in-process measuring head 18.

The use of the second derivative D in addition to the first derivative T to determine the compensating value Ui* assures the same or higher dimensional accuracy of the honed cylinder bores, as in the first embodiment of FIG. 2 in which the dead time value MS or the number Y of the pre-measured workpieces W is taken into account to determine the compensating value Ui*. The provision of the workpiece counter 34 and the workpiece detecting sensors 36, 38 will increase the cost of the compensating apparatus, and requires additional time and labor to modify an existing honing system to provide a honing system equipped with the compensating apparatus. In this respect, the present second embodiment using no workpiece counter 34 is advantageous over the first embodiment.

However, the second embodiment may be provided with the workpiece counter 34 and the related components as in the first embodiment, to further improve the dimensional accuracy of the honed workpieces by adjustment of the honing condition (reference voltage of the sizing device 22) by the compensating apparatus.

In the present second embodiment, step S15 is skipped, namely, the output of the control device 28 is not fed back to the automatic sizing device 22, as long as the final compensating value Ui* is zero. Usually, it is difficult to match the operating cycle of the post-process measuring device 14 with that of the honing machine 10, because a considerably long processing time is required to effect data transmission from the control device 28 to the sizing device 22 via RS232C or other suitable transmitting means. In most cases, these operating cycles are not matched, unless a high-grade program language is used to assure a match in the cycling operation between the machine 10 and the measuring device 14, or a suitable hardware means is employed to assure the match. This problem may be avoided by reducing the frequency of the data transmission from the control device 28 to the sizing device 22. Where 300 workpieces are honed by the machine 10, the final compensating value Ui* becomes other than zero "0" ten times or so. According to the second embodiment, the data transmission to apply the final compensating value Ui* to the sizing device 22 is effected only in such instances, and the processing time for the data transmission is accordingly reduced. Hence, the present embodiment does not require a high-grade program language for matching the operations of the machine 10 and the measuring device 14.

To confirm an advantage of the compensating apparatus according to the present second embodiment, a simulation was conducted according to the final compensating value Ui* which is obtained by adjusting the present provisional compensating values Ui by the previous provisional compensating values U. The provisional compensating value Ui is determined by fuzzy inference on the basis of the error values Ri and first and second derivatives Ti and Di obtained from the actually measured values Xi. The final compensating value Ui* is supplied to the automatic sizing device 22 only when the value Ui* is not zero. For comparison with the present embodiment, a comparative simulation was also conducted on a comparative apparatus adapted to supply the final compensating value Ui* to the automatic sizing device 22, irrespective of whether the value Ui* is zero or not.

Figure 24:
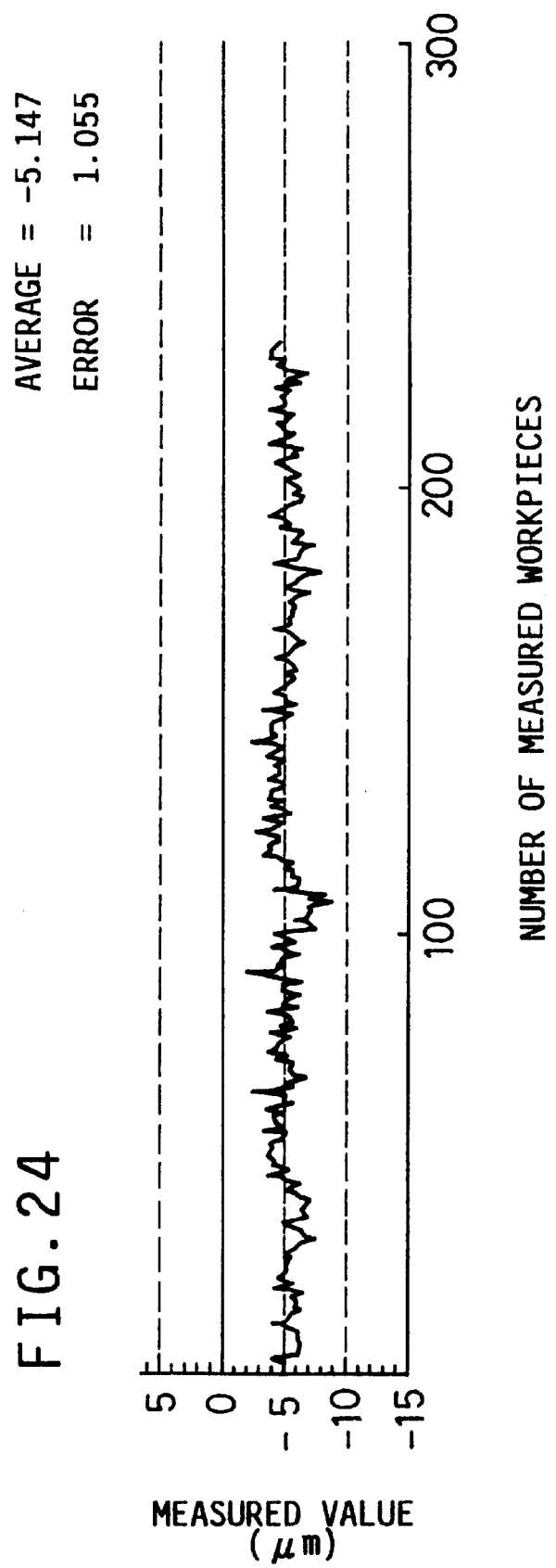
FIG. 24 is a graph indicating an advantage of the feedback compensating apparatus of the second embodiment of FIG. 17, which was exhibited by simulation.
Figure 25:
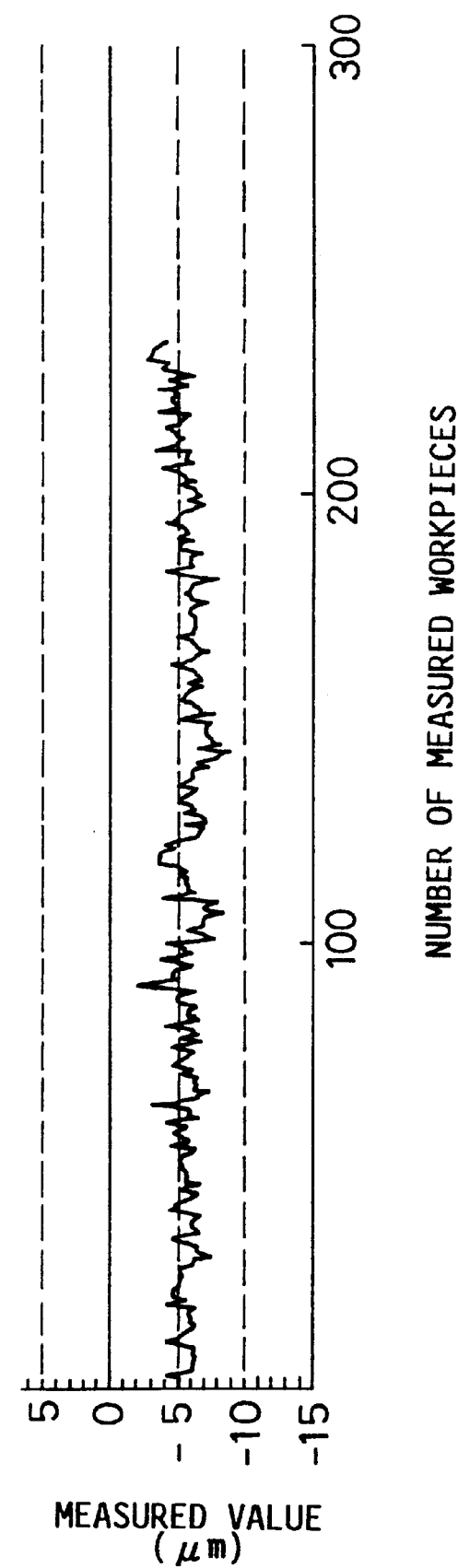
FIG. 25 is a graph indicating the performance of a comparative counterpart apparatus also exhibited by simulation.

A result of the simulation of the present embodiment is indicated in the graph of FIG. 24, while a result of the comparative simulation is indicated in the graph of FIG. 25. The corresponding result obtained without compensation of the reference voltage of the sizing device 22 is indicated in the graph of FIG. 26.

Figure 26:
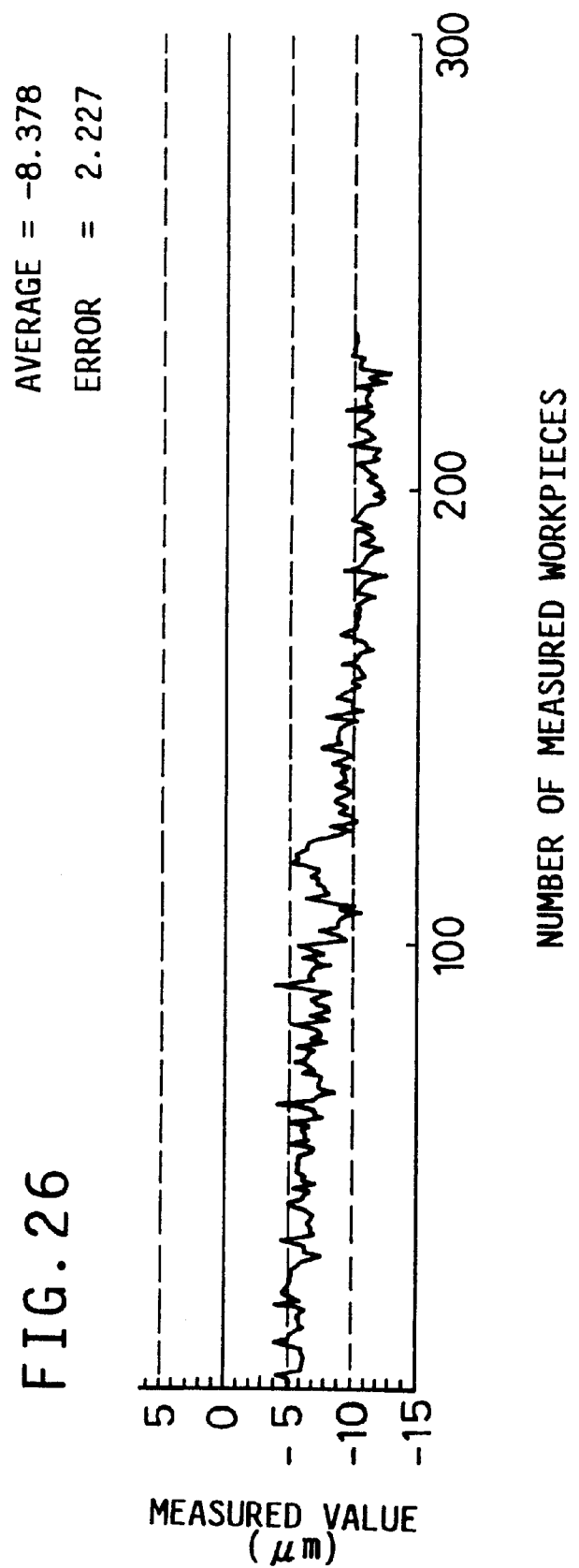
FIG. 26 is a graph indicating an another advantage of the apparatus of the second embodiment exhibited by simulation.

It will be understood from the graphs of FIGS. 24 and 26 that the dimensional accuracy of the honed workpieces is significantly improved in the simulation of the present second embodiment of FIG. 24, over that in the simulation without any compensation of FIG. 26. It will also be understood that the present embodiment of FIG. 24 adapted to supply the final compensating value Ui* to the sizing device 22 only when the value Ui* is not zero permits almost the same dimensional accuracy as the comparative apparatus of FIG. 25.

While the program used in the second embodiment illustrated in FIG. 17 includes step S19, this step may be omitted so that the final compensating value Ui* is applied to the automatic sizing device 22 even when the value Ui* is zero.

Referring next to FIGS. 27–54, there will be described a third embodiment of the feedback compensating apparatus of this invention.

Figure 28:
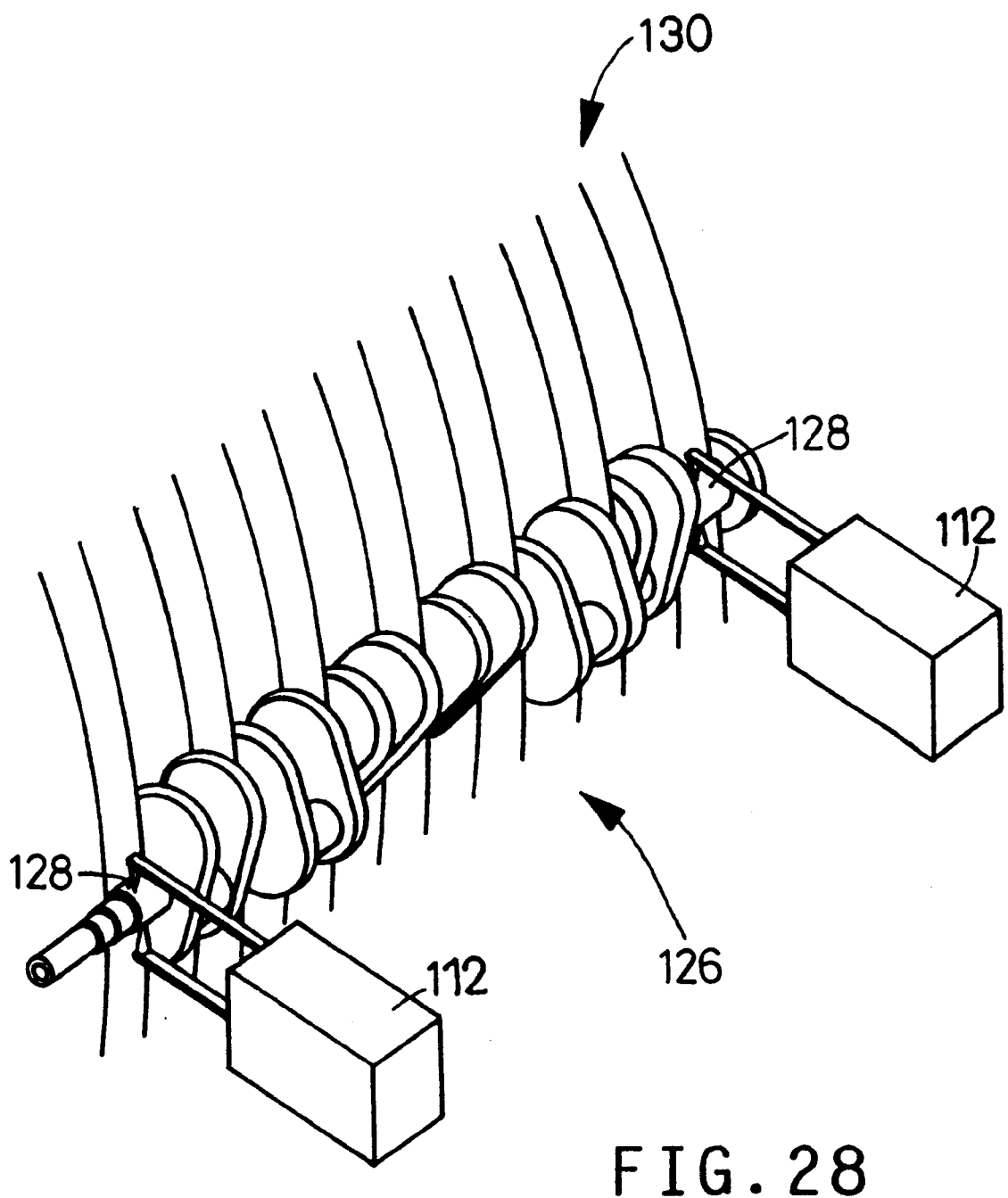
FIG. 28 is a perspective view showing the workpiece in the form of a crankshaft to be ground by an array of grinding wheels of the grinding system of FIG. 27.

The present third embodiment is applied to a working system in the form of a grinding system adapted to grind a workpiece in the form of a crankshaft of an engine of a motor vehicle, more specifically to grind cylindrical working portions of the crankshaft, namely, cylindrical surfaces of seven journals coaxially formed on the crankshaft. In FIG. 28, the crankshaft is indicated at 126, and the journals are indicated at 128.

Figure 27:
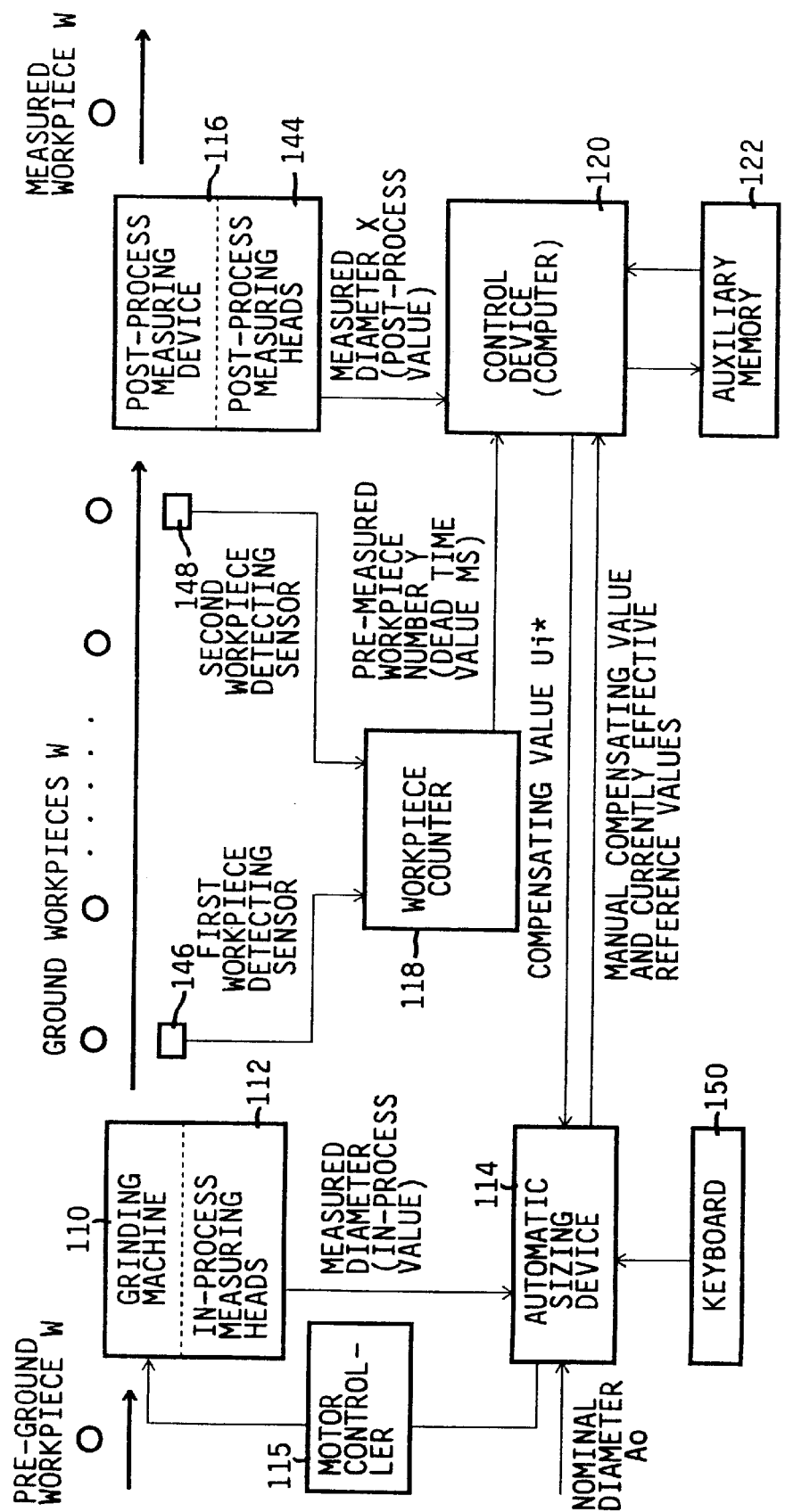
FIG. 27 is a schematic view showing a working system in the form of a grinding system incorporating a feedback compensating apparatus constructed according to a third embodiment of this invention.

As shown in FIG. 27, the grinding system includes a cylindrical grinding machine 110, two in-process measuring heads 112 (only one of which is shown in the figure), an automatic sizing device 114, a motor controller 115, a post-processing measuring device 116, a workpiece counter 118, a control device 120, and an auxiliary memory 122. The components of the grinding system will be described.

As indicated by thick solid lines with arrows in FIG. 27, a working line extends through the grinding system. A succession of workpieces in the form of crankshafts 126 (one of which is shown in FIG. 28) are transferred along the working line from the upstream side toward the downstream side (from left to right as seen in FIG. 27).

The grinding machine 110 employs an array of coaxial cylindrical grinding wheels 130 as shown in FIGS. 28 and 29, for performing a cylindrical grinding operation on the seven journals 128 of each crankshaft 126. In operation, the grinding wheels 130 and the crankshaft 126 are rotated in contact with each other, to simultaneously grind all of the seven journals 128.

As shown in FIG. 29, the grinding machine 110 has a work table 132 on which the crankshaft 126 as the workpiece is mounted for grinding. The work table 132 is attached to a main frame of the machine 110, and includes a holder (not shown) for rotatably supporting the crankshaft 126, and a drive motor 34 for rotating the crankshaft 126.

The grinding machine 110 also has an infeed table 136 for advancing and retracting the array of grinding wheels 130 toward and away from the work table 132, and a swing table 138 mounted on the infeed table 136. The infeed table 136 is attached to the main frame of the machine 110, and is reciprocable in the direction perpendicular to the axis of the crankshaft 126 on the work table 132. The swing table 138 is rotatable or pivotable (both clockwise and counterclockwise) in a plane parallel to the plane of FIG. 29, about a pivot axis perpendicular to those planes and also perpendicular to an axis of the grinding wheels 130 indicated by one-dot chain line in FIG. 29. The pivot axis is located near one of opposite ends of the shaft on which the wheels 130 are mounted. The infeed table 136 is reciprocated by a infeed motor 140 fixed to the main frame, and the swing table 138 is pivoted by a swing motor 142 fixed to the infeed table 136.

Thus, the angle (hereinafter referred to as "grinding angle" where appropriate) formed by the axes of rotation of the grinding wheels 130 and the crankshaft 126 can be changed by the swing motor 142.

The two in-process measuring heads 112 are attached to the grinding machine 110, to measure the diameters of the first and seventh journals 128 (hereinafter referred to as "end journals" where appropriate) which are nearest to the respective opposite ends of the crankshaft 126, as shown in FIG.

28. Each measuring head 112 is of an electrical micrometer type, having a pair of measuring probes for contact with diametrically opposite portions of the cylindrical surface of the appropriate end journal 128, to measure the diameter of the end journal 128.

The automatic sizing device 114 is electrically connected to the in-process measuring heads 112, as shown in FIGS. 27 and 29, and is principally constituted by a computer which includes a central processing unit (CPU), a read-only memory (ROM), a random-access memory (RAM) and a bus interconnecting these elements. The sizing device 114 is adapted to monitor the diameters of the end journals 128 under grinding by the machine 110, by means of the respective in-process measuring heads 112, and apply output signals to the motor controller 115, depending upon the outputs of the measuring heads 112. More particularly, the sizing device 114 monitors the outputs of the measuring heads 112 to determine whether the residual amounts of infeed of the wheels 130 required to grind the end journals 128 to respective nominal diameter values Ao thereof have been reduced to respective preset values (e.g., for rough grinding) or not, or whether the residual amounts of infeed have been reduced to zero or not, namely, whether the two end journals 128 have been ground to the nominal diameter values Ao (to be established by precision or finish grinding). In other words, the sizing device 114 determines whether the output levels of the measuring heads 112 have reached reference values preset in the sizing device 114 for the end journals 128, respectively. The reference values may correspond to the final or nominal outside diameter values of the journals 128, or any desired diameter values larger than the nominal values, which desired diameter values are established by a rough grinding operation, for example. Accordingly, the signals applied from the sizing device 114 to the motor controller 115 indicate that the end journals 128 have been ground to the nominal diameter values Ao, or the residual amounts of infeed of the wheels 130 have reached the preset values which correspond to outside diameters larger than the nominal values Ao.

The reference values preset in the automatic sizing device 114 for the end journals 128 according to the nominal diameters Ao thereof can be adjusted according to respective compensating values U received from the control device 120 of the compensating apparatus. This adjustment is made to assure that the actual diameters of the ground end journals 128 are exactly equal to the nominal diameter values Ao. The reference values are adjusted with the compensating values U added thereto, or remain unchanged if no compensating values U are received by the sizing device 114. Thus, the sizing device 114 is capable of automatically adjusting the presently effective reference values according to the compensating values U received from the control device 120.

As shown in FIG. 27, a keyboard 150 is connected to the automatic sizing device 114, so that the presently effective reference values of the sizing device 114 can be adjusted manually by the operator, by desired amounts entered through the keyboard 150. The sizing device 114 stores in its RAM the presently effective manually entered compensating amounts and reference values, and transmit these data to the control device 120, when the control device 120 is ready to receive such data.

As shown in FIG. 29, the motor controller 115 is electrically connected to the automatic sizing device 114 and the infeed and swing motors 140, 142. The motor controller 115 controls the infeed and swing motors 140, 142 in response to commands manually entered through the keyboard 150 and signals received from the sizing device 114.

Usually, one cycle of grinding job performed by the grinding machine 110 consists of two or more grinding steps such as a rough grinding, a precision or finish grinding, and a final spark-out operation without an infeeding action of the grinding wheels 130. The rough grinding continues until the residual amounts of infeed of the wheels 130 have been reduced to the preset values, and the precision or finish grinding continues until the diameters of the end journals 128 have become equal to the nominal values Ao, that is, until the reference values set in the sizing device 114 have been reached. Commonly, the preset residual amounts of infeed have been reached at different times for the two end journals 128, and therefore the signals indicative of the completion of the rough grinding for the two end journals 128 are generated from the sizing device 114 at different times. In the rough grinding, therefore, the swing motor 142 as well as the infeed motor 140 is controlled by the motor controller 115 to adjust the grinding angle between the axes of the wheels 130 and crankshaft 126, in order to assure substantially simultaneous completion of the rough grinding for the two end journals 128. On the other hand, the finish grinding is effected with only the infeed motor 140 operated by the motor controller 150 to infeed the wheels 130, but with the swing motor 142 held off, since the grinding angle is considered to have been properly adjusted during the rough grinding. The finish grinding is terminated with the infeed motor 140 turned off by the sizing device 114 in response to the first received signal indicating that the reference value has been reached for one of the two end journals 128. The finish grinding is followed by the spark-out operation, and the infeed motor 140 is operated in the reverse direction to retract the array of wheels 130 from the crankshaft 126. The grinding angle may be controlled even in the finish grinding.

The post-process measuring device 116 is located on the downstream side of the working line, remote from the grinding machine 110, as shown in FIG. 27. The measuring device 116 has seven post-process measuring heads 144 corresponding to the seven journals 128 of the crankshaft 126. These measuring heads 144, which are of the same type as the in-process measuring heads 112, are adapted to measure the outside diameters of the ground journals 128 transferred from the grinding machine 110. The measuring device 116 is electrically connected to an input portion of the control device 120.

The workpiece counter 118 is adapted to count the number Y of the pre-measured workpieces, i.e., ground crankshafts 126 which exist in a portion of the working line between the grinding machine 110 and the post-process measuring device 116. The workpiece counter 118 receives the output signal of a first workpiece detecting sensor 146 (e.g. limit switch) for detecting the transfer of each ground crankshaft 126 from the machine 110, and the output signal of a second workpiece detecting sensor 148 (e.g., limit switch) for detecting the transfer of each ground crankshaft 126 into the post-process measuring device 116. The number Y of the pre-measured workpieces is incremented when each ground workpiece is detected by the first sensor 146, and decremented when each pre-measured workpiece is detected by the second sensor 148. As described before with respect to the first embodiment, the number Y represents the value MS of the so-called "dead time".

The control device 120 is principally constituted by a computer incorporating a central processing unit (CPU), a read-only memory (ROM), a random-access memory (RAM), and a data bus interconnecting these elements. The ROM stores programs to execute a compensating control routine. The control device 120 is also connected to the auxiliary memory 122, which is used to store measured diameter values X represented by the signals from the post-process measuring device 116, compensating values U determined on the basis of the diameter values X, and various other data. The data stored in the auxiliary memory 122 can be used by the operator, after a series of grinding operation, to analyze or diagnose the grinding conditions.

A major portion of the above compensating control routine is illustrated in the flow charts of FIGS. 30–35. Before describing in detail the routine executed by the control device 120 by reference to these flow charts, the function of the present feedback compensating apparatus whose major portion is constituted by the control device 120 will be briefly described.

The control device 120 is adapted to perform a hybrid control of feeding back the compensating values U to the automatic sizing device 114, for adjusting or changing the respective reference values with which the outputs of the two in-process measuring heads 112 are compared by the automatic sizing device 114, to compensate the reference values for dimensional errors of the ground workpieces in the form of the crankshafts 126. The compensating values U are determined on the basis of the diameter values X measured by the post-process measuring heads 144 whose measuring accuracy is stable at a relatively high level. The thus determined compensating values U are used to adjust the reference values of the sizing device 114, so that the comparison of the outputs of the in-process measuring heads 112 with the adjusted reference values makes it possible to assure high dimensional accuracy of the ground workpieces, even if the measuring accuracy of the in-process measuring heads 112 is unstable due to various disturbances such as a variation in the operating temperature. This hybrid feedback control can be considered to be applied to a control system which receives as an input signal the compensating values U, and produces as an output signal the dimensional data representative of the measured diameter values X, and which has the dead time (dead time value MS represented by the number Y of the pre-measured workpieces) between the moments of generation of the input and output signals. It is noted that the reference values to be adjusted according to the compensating values U represent the final or nominal dimensions of the working portions (journals 128) of the workpiece (crankshaft 126) at which the working operations on the working portions are terminated, or represent any intermediate or in-process dimensions of the working portions at which the working operations are interrupted or temporarily stopped. Thus, the reference values are considered to be a working condition of the workpiece, more specifically, a desired or nominal amount or amounts of infeed of the grinding wheels 130 with respect to the journals 128 of the crankshaft 126.

Figure 35A:
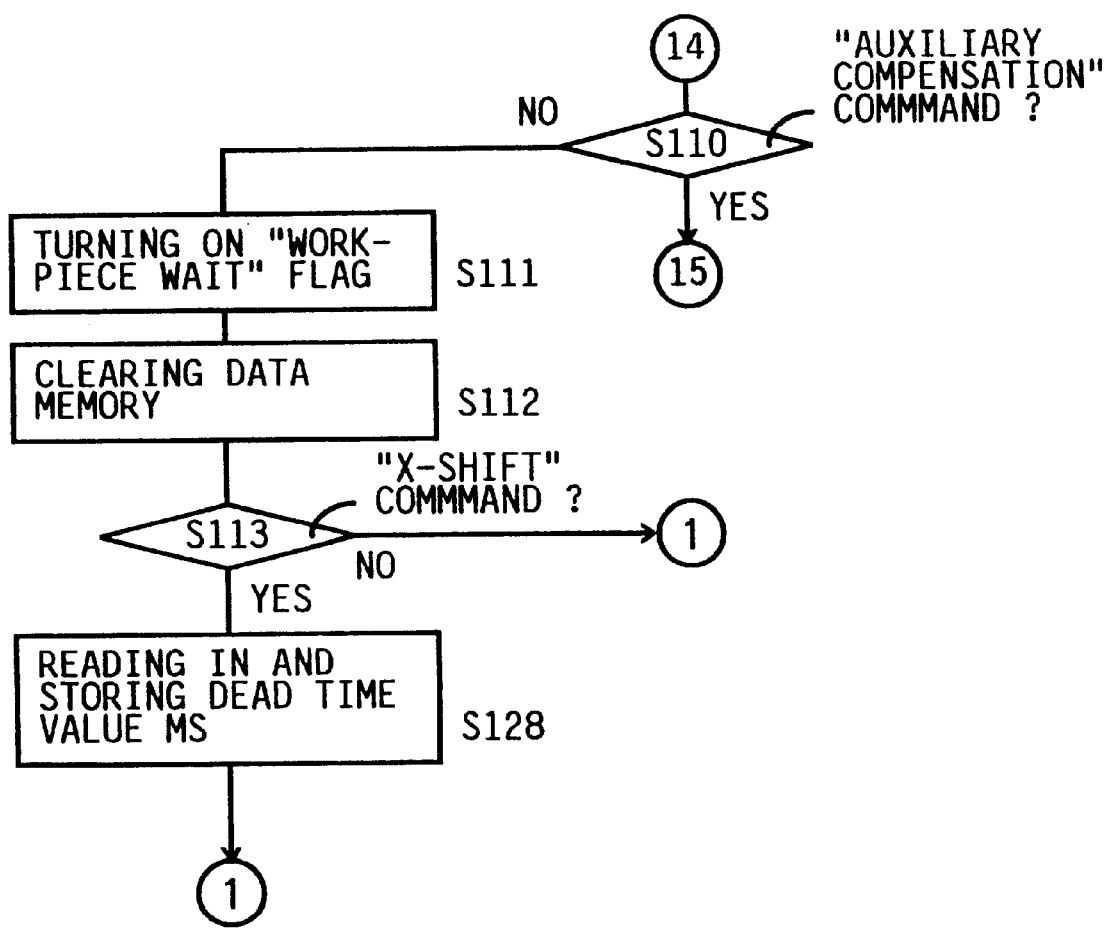
Figure 35B:
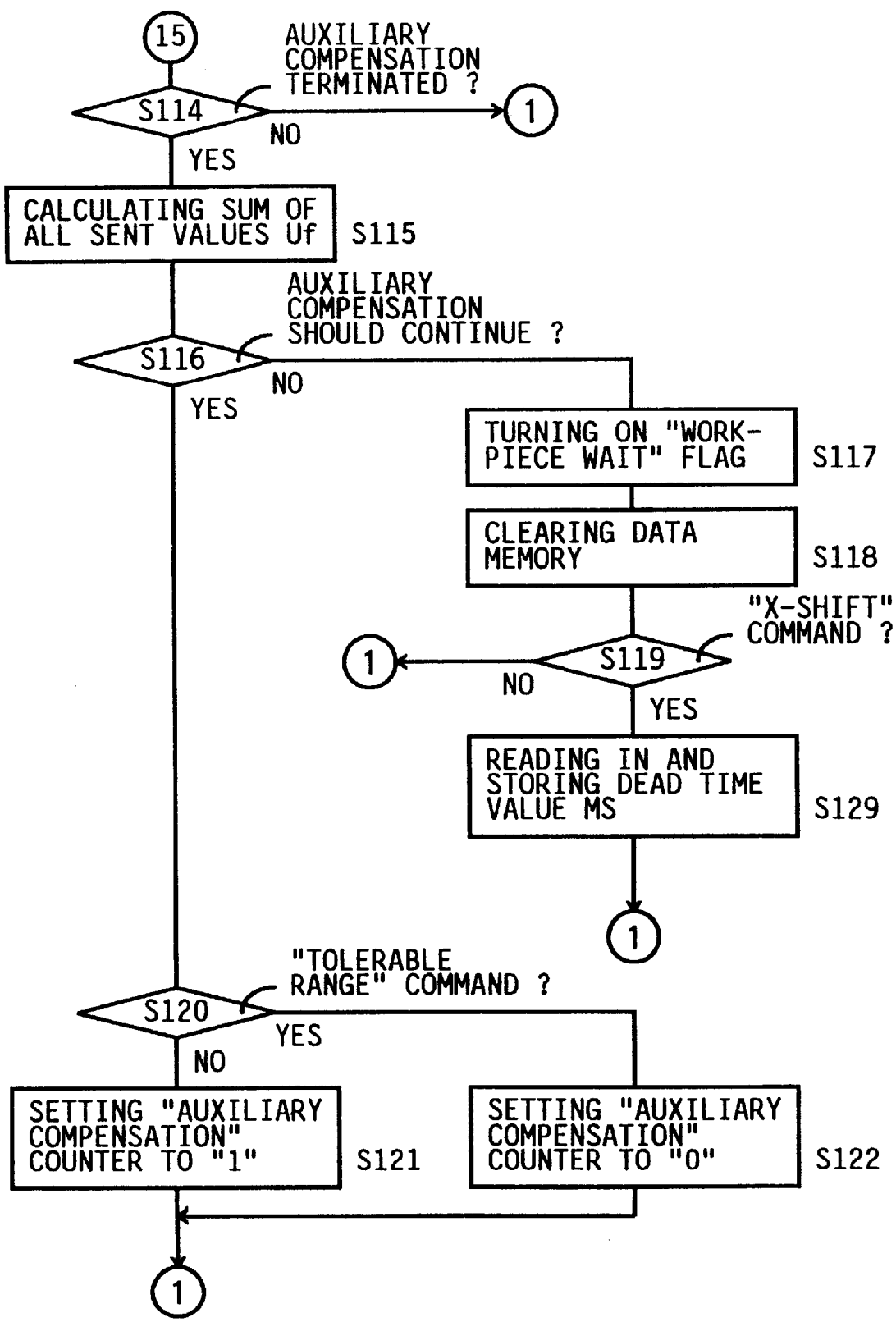
Figure 36:
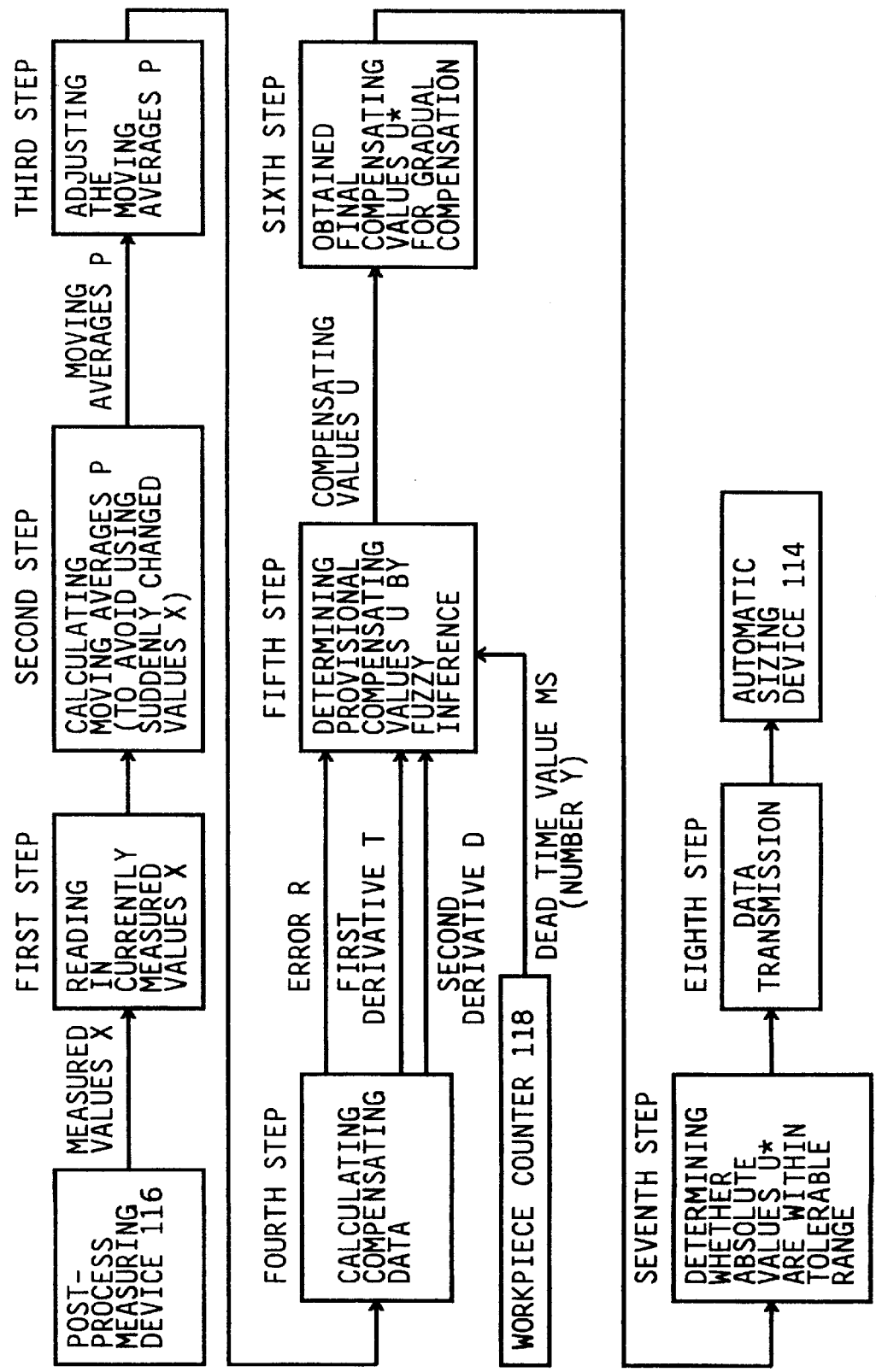
FIG. 36 is a block diagram schematically showing the flows of the compensating routine of FIGS. 30–35.

The concept underlying the compensating control routine illustrated in FIGS. 30–35 will be first described referring to the flow chart of FIG. 36. It is noted that the step numbers used in the flow chart of FIG. 36 do not correspond to the step numbers used in the flow charts of FIGS. 30–35 which will be specifically discussed later in detail.

In the first step indicated in the flow chart of FIG. 36, the control device 120 reads in the diameter values X of the two end journals 128 currently measured by the post-process measuring device 116. Then, the second step is implemented to calculate a moving average P of the measured diameter values X for each end journal 128 which have been measured and which include the currently measured one. This second step is provided to avoid using a suddenly changed value X. That is, even if the currently obtained diameter value X is considerably different from the last two or more values X, the moving average P obtained in the second step will not be considerably changed from the last obtained moving average values P. The moving averages P for the two end journals 128 are calculated on the basis of the diameter values X stored in a data memory of the RAM of the control device 120 and the currently measured diameter values X received in the first step.

The control flow then goes to the third step to adjust the moving averages P calculated in the second step, as described below. The fourth step is then implemented to calculate, as compensating data, error values R and first and second derivatives T and D of the error values R on the basis of the adjusted moving averages P (stored in the data memory of the RAM). The error value R for each end journal 128 is a difference between the moving average P and the nominal diameter value Ao. The control flow then goes to the fifth step to determine by fuzzy inference the provisional compensating values U for the two end journals 128, on the basis of the compensating data (R, T and D) and the number Y of the pre-measured workpieces (dead time value MS). The sixth step is then implemented to adjust the provisional compensating values U to obtain the final compensating values U* which assures gradual or smooth compensation or adjustment of the reference values of the automatic sizing device 112. Then, the seventh step is implemented to determine whether the absolute value of the final compensating values U* is smaller than a threshold or not, and the eight step is executed to transmit the compensating values U* to the sizing device 114 if the absolute values U* are not smaller than the threshold.

The control device 120 does not determine the compensating values U* each time the diameters X of the end journals 128 are measured by the post-process measuring device 116. In other words, the control device 120 operates to determine or update the compensating values U* from time to time on an intermittent basis according to a predetermined rule, and the data memory of the RAM of the device 120 is accordingly updated.

Although the control device 120 receives the measured diameter values X of all the seven journals 128 of the crankshaft 126, the values X of only the two end journals 128 (first and seventh journals) are used as a principle to determine the compensating values U or U*.

While the flow of the control routine executed by the control device 120 has been briefly described, the features of the individual steps as shown in FIG. 36 will be discussed in detail.

First, the calculation of the moving averages P in the second step will be explained.

The diameter values X (of each end journal 128) measured from time to time by the measuring device 116 may have a considerable variation between successively measured values. Since it is desirable to avoid using a suddenly changed value X, a weighted moving average P is obtained from the present value X received in the first step and at least one previous value X stored in the RAM. Generally, this moving average P is considered to more accurately represent the actual diameter X of the ground journal 128.

The moving average Pi is calculated in the following manner, as a rule. That is, a predetermined number K ($\geq 2$) of the successively measured values X (including the value X obtained in the present cycle) are used to calculate the moving average Pi according to the following equation (2), for example:

$$P_i = \frac{b_{i-4}X_{i-4} + b_{i-3}X_{i-3} + b_{i-2}X_{i-2} + b_{i-1}X_{i-1} + b_iX_i}{b_{i-4} + b_{i-3} + b_{i-2} + b_{i-1} + b_i} \quad (2)$$

where, i=number of the workpieces measured by the measuring device 16 (=number K)

In the present example, the above equation (2) is formulated to calculate the moving average Pi of the five successive values X. That is, the number K is equal to "5", and the number i is also equal to "5".

The values $b_{i-4}$ through $b_i$ are weighting coefficients corresponding to the five values X.

The weighting coefficients b are suitably determined in relation to the frequency of noisy component waves that should be removed from the measured values X by using the moving average (i.e., component waves which cause a relatively large variation of the values X). In the case where the number Y of the pre-measured workpieces existing between the machine 110 and the measuring device 116 is zero "0" or almost constant, the frequency of the noisy component wave is not substantially changed. In this case, the weighting coefficients b can be determined in the following manner:

To begin with, the following equation (3) is prepared such that $\omega_1, \omega_2, \ldots \omega_j, \ldots, \omega_s$ represent angular frequencies of the noisy component waves to be removed from the values X. The number of the noisy component waves is equal to s.

$$(z^2-2z \cos \omega_1+1)(z^2-2z \cos \omega_2+1) \ldots (z^2-2z \cos \omega_s+1) = z^{2s}+a_{s-1}z^{2s-1}+ \ldots +a_0z^s+ \ldots +a_{s-1}z+1=0 \quad (3)$$

Then, the values "1" through "$a_0$" selected from the values "1", "$a_{s-1}$", . . . "$a_0$", . . . "$a_{s-1}$", and "1" are determined as the weighting coefficients $b_{i-1}, b_{i-(s-1)}, \ldots, b_i$.

Figure 37:
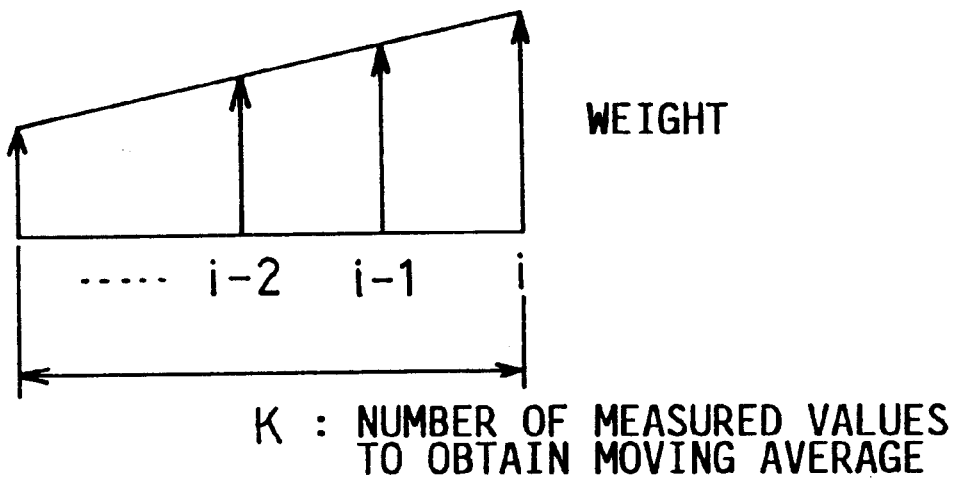
FIG. 37 is a graph indicating weighting coefficients "b" used in second step of FIG. 36.

In the case where the number Y of the pre-measured workpieces is not always substantially constant, it is unavoidable that the frequency of the noisy component waves to be removed from the measured values X by using the moving average is likely to change more or less. In this case, therefore, it is desirable to determine the weighting coefficients in the following manner. That is, the weighting coefficients b increase substantially linearly in the order in which the corresponding measured values X are measured, as indicated in FIG. 37. According to this method, the weighting coefficient bi for the presently measured value X is the largest. This method makes it possible to eliminate low-frequency noisy component waves over a relatively wide range, from the measured values X, and the calculated moving average P is less likely to be influenced by the noisy component waves.

In the above case, the gradient of the linear increase of the weighting coefficient b is determined so as to best suit a standard condition in which the number Y of the pre-measured workpieces changes. For instance, the coefficients $b_{i-4}, b_{i-3}, b_{i-2}$ and $b_i$ are determined to be 1, 2, 3, 4 and 5, respectively. However, this manner of determination of the weighting coefficient b causes the obtained moving average P to vibrate with the measured values X, if the vibration level of the measured values X is relatively high. The vibration level is interpreted to mean a magnitude of periodic variation of the measured values X as the number i of the measured workpieces increases. In this case, the obtained moving average P does not accurately represent the actual tendency of change in the diameter values of the journals 128. If the vibration level of the measured values X is relatively low, the moving average P is likely to be less responsive to the change in the measured values X.

In the light of the above background, the present third embodiment is arranged to automatically change the gradient of increase of the weighting coefficients b as needed, for automatic adaptation to the vibration level of the measured values X.

Figure 38:
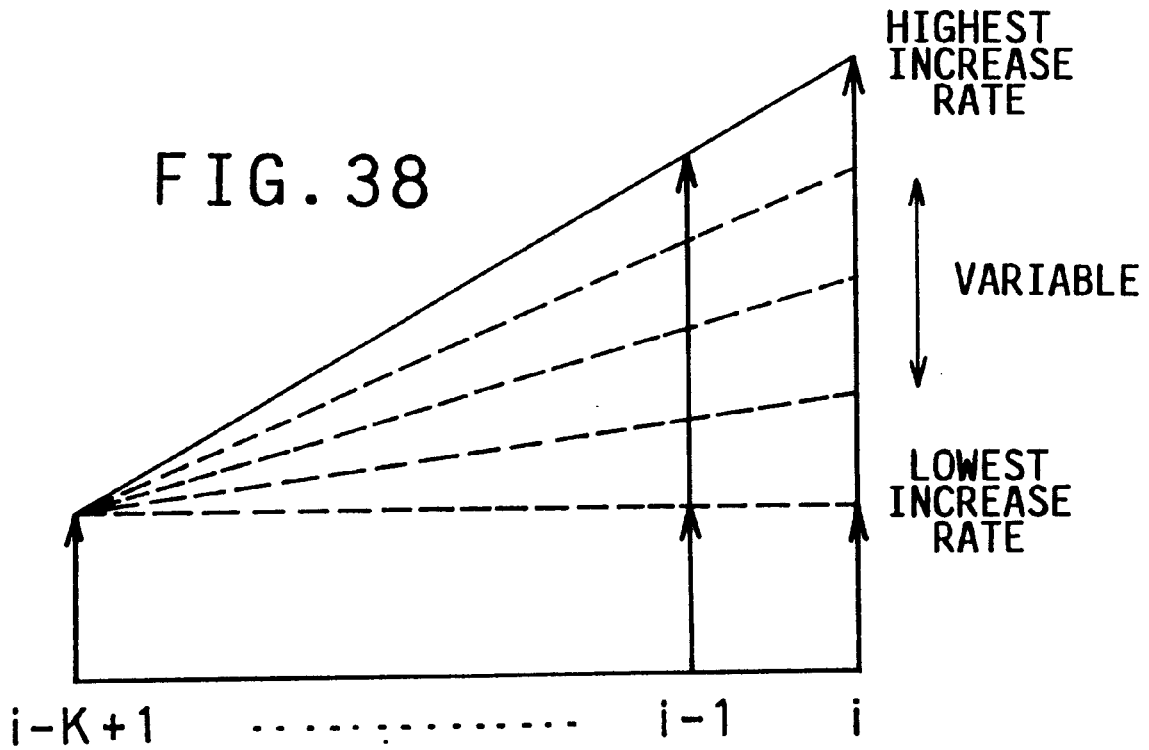
FIG. 38 is a graph schematically indicating a range in which the weighting rate of the weighting coefficients "b" is variable.

Described more specifically, a provisional value of the moving average P is calculated using the last used weighting coefficients b, and differences between the presently calculated provisional value of the moving average P and the individual measured values X used to obtain the provisional value are summed to determine the vibration level (with respect to the last used coefficients b) of the measured values X in question. If the determined vibration level is equal to or lower than an upper limit A, the provisional value of the moving average P is determined as the final or effective value. If the vibration level is higher than the upper limit A, the weighting coefficients b are incremented or decremented between the highest and lowest increase rates, as schematically shown in FIG. 38, until the vibration level is reduced below the upper limit A. The weighting coefficients b at this time are used as the effective coefficients for calculating the final value of the moving average P. Consequently, when the vibration level of the measured values X is relatively high, the gradient of linear increase of the coefficients b is accordingly small, and the influence of the currently measured value X on the moving average P is reduced, whereby the moving average P becomes less responsive to the currently measured value X. When the vibration level is relatively low, on the other hand, the gradient of linear increase of the coefficients b is accordingly large, and the influence of the currently measured value X on the moving average P is increased, whereby the moving average P becomes more responsive to the currently measured value X.

However, the vibration level of the measured values X may not be reduced below the upper limit A even if the weighting coefficients b are changed between the highest and lowest increase rates as indicated in FIG. 38. In this case, the weighting coefficients b which caused the lowest vibration level during changing of the coefficients b are used as the effective coefficients for calculating the final moving average P.

Figure 39:
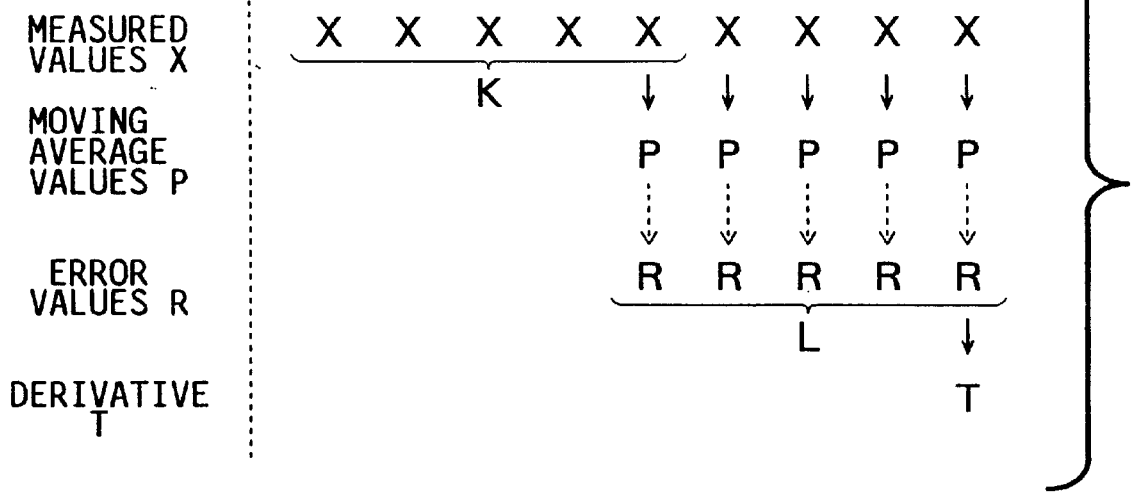
FIG. 39 is a view explaining the number K of measured values X necessary to obtain a moving average P according to a standard method in the third embodiment.

While the method of calculating the moving averages P has been described, the method if practiced as described above would not capable of calculating the moving averages P until the number of the values X which have been measured (the presently measured value and the values stored in the data memory of the RAM of the control device 120) has become equal to "K". In this period, neither the error values R and derivative values T nor the compensating values U can be calculated, and a relatively long time is required to calculate the compensating values U. In FIG. 39 as well as in FIGS. 40 and 41 referred to below, the values indicated in relatively left portions of the figures are obtained prior to the values indicated in relatively right portions of the figures. That is, the number i of the measured workpieces increases in the direction from left to right as seen in FIG. 39.

In the present embodiment, however, the moving averages P are calculated according to a special averaging method different from the normally used method, until the number of the values X which have been measured has become equal to "KK" ("5" in the case of FIG. 39).

As the special averaging method, there are available two methods, namely, a substitution method and a sub-averaging method, which will be described.

Figure 40:
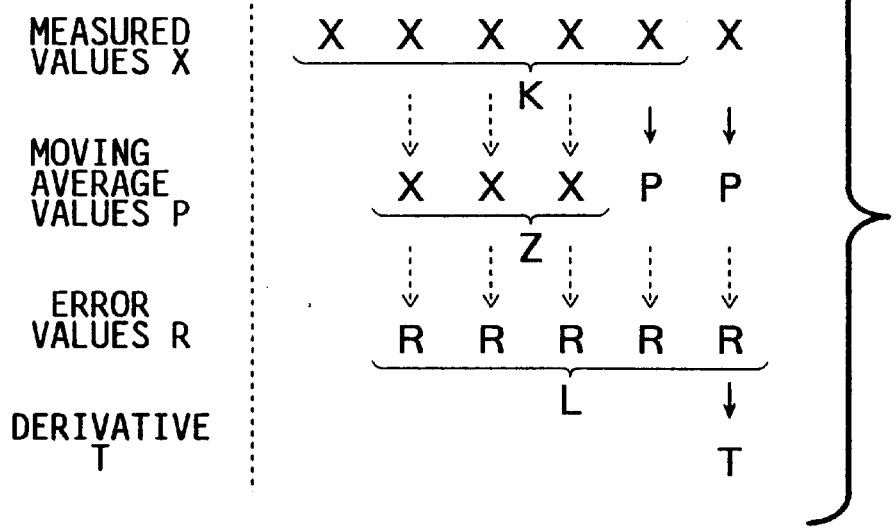
FIG. 40 is a view explaining the number K according to a first special method (substitution averaging method) for the moving average in the third embodiment.

The substitution method is to substitute the currently measured value X for the moving average P to be obtained in the present cycle, as indicated in FIG. 40, if the calculation of the moving average P is impossible, that is, until the number of the measured values X has become equal to "K". This substitution method is based on the fact that the currently measured value X is by nature close to the moving average P to be obtained according to the normally used method. The calculation of the moving average P according to the substitution method will be referred to as "substitution averaging mode".

The substitution averaging mode for the moving average P is available for all the measured values X, from the first value X to the subsequent values X until the total number of the measured values X has become equal to "K". For instance, where the number K is equal to "5", the first four measured values X may be used as the moving averages P. However, this is not desirable for the following reason. Namely, the accuracy of a derivative T calculated on the basis of a certain number of the moving averages P is lowered with an increase in the ratio of the measured values X substituted for the moving averages P, and the accuracy of the compensating value U is accordingly lowered. For instance, if the first four measured values X were used as the first four moving averages P where the number K is equal to "5", the accuracy of the derivative T determined from the first five moving averages P would not be sufficiently reliable.

To solve the above problem, it is preferable to limit the maximum number Z of the measured values X which can be used as the moving averages P. In the specific example of FIG. 40 where the number K is "5", the maximum number Z is equal to "3", and so up to three measured values X can be used to calculate the derivative T. In this example, however, the first measured value X cannot be used as the moving average P, and the derivative T cannot be calculated even when the number of the measured values X available has become equal to "5".

On the other hand, the sub-averaging method uses auxiliary equations to calculate a weighted moving average from the currently usable measured values X whose number is smaller than "K". For instance, equations to calculate a moving average from three and four measured values X are selectively used depending upon the number of the values X currently available (currently measured value X and value or values X stored in the data memory). The calculation according to this sub-averaging method will be referred to as "sub-averaging mode". An example of this sub-averaging method where K=5 is illustrated in FIG. 41, in which the following four equations (4-1) through (4-4) corresponding to four numbers of the measured values X available are used:

| Number of Values X | | (4-4) |
|---|---|---|
| 1 | $P_i = X_i$ | |
| 2 | $P_i = \dfrac{c_{i-1} X_{i-1} + c_i X_i}{c_{i-1} + c_i}$ | |
| 3 | $P_i = \dfrac{d_{i-2} X_{i-2} + d_{i-1} X_{i-1} + d_i X_i}{d_{i-2} + d_{i-1} + d_i}$ | |
| 4 | $P_i = \dfrac{e_{i-3} X_{i-3} + e_{i-2} X_{i-2} + e_{i-1} X_{i-1} + e_i X_i}{e_{i-3} + e_{i-2} + e_{i-1} + e_i}$ | |

Figure 41:
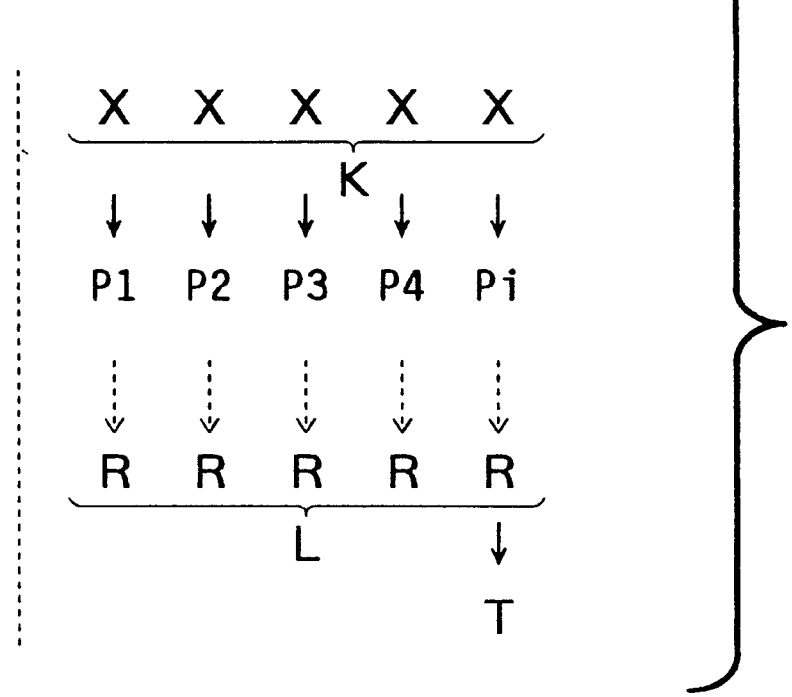
FIG. 41 is a view explaining the number K according to a second special method (sub-averaging method) for the moving average in the third embodiment.

In the above example of FIG. 41, the moving average P when only one value X is available can be obtained according to the equation (4-1). Thus, the derivative T can be calculated when the number of the measured values X available has become equal to "K".

In the present embodiment, the function of calculating the moving average P according to the special averaging method (herein referred to as "special averaging function") is enabled or disabled by a SPECIAL AVERAGING command entered by the operator. If this SPECIAL AVERAGING command is present, either the substitution averaging mode or the sub-averaging mode is selected by the operator. Therefore, either a SUBSTITUTION AVERAGING command selecting the substitution averaging mode, or a SUB-AVERAGING command selecting the sub-averaging mode is necessarily present while the SPECIAL AVERAGING command is present.

Then, the adjustment of the moving averages P in the third step of FIG. 36 will be explained.

In the grinding system to which the control device 120 is connected, the array of grinding wheels 130 is controlled on the basis of the diameters of only the two end journals 128 of the already ground crankshafts 126. If the compensating values U to adjust the reference values set in the automatic sizing device 114 are determined on the basis of the measured diameters X of only the two end journals 128, the dimensional accuracy of the ground crankshaft 126 would not be sufficiently uniform or even for all the seven journals 128.

Figure 42:
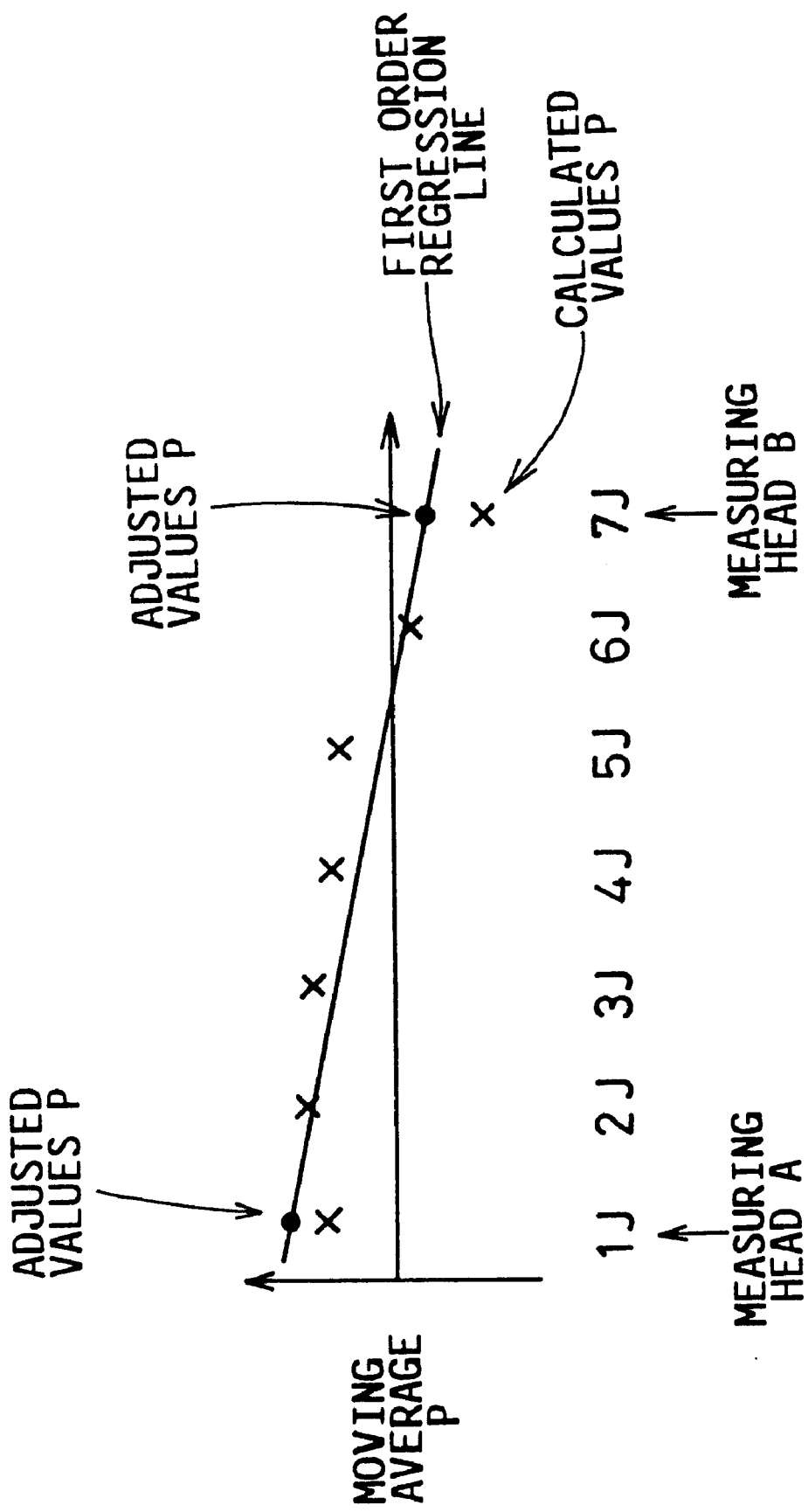
FIG. 42 is a graph schematically showing an operation performed in third step of FIG. 36.

In view of the above drawback, the present third embodiment employs a technique of adjusting the calculated moving averages P of the two end journals 128, on the assumption that the diameters (i.e., moving average values P) of the seven journals 128 at different axial positions 1J through 7J of the crankshaft 126 linearly change as a function of the axial distance of the journals 128 as measured from one of the end journals 128 (first or seventh journal), as schematically indicated in the graph of FIG. 42.

For the above adjustment of the moving averages P of the two end journals 128, the following equation (5) is used, for example:

$$y = \frac{\sum (x - x')(P - P')}{\sum (x - x')^2} \cdot (x - x') + P' \quad (5)$$

where, x=values (1 through 7) identifying the seven journals 128 x'=average of the seven values x of the seven journals 128 y=adjusted moving average P for each value x

P=calculated moving average P (before the adjustment) for each value x

P'=average of the seven calculated moving averages P

For instance, the adjusted moving average y1 of the first journal 128 is obtained by inserting "1" as the value x in the above equation (5), and the adjusted moving average y7 of the seventh journal 128 is obtained by inserting "7" as the value x.

In the present embodiment, the function of adjusting the calculated moving averages P is enabled or disabled by the operator.

While the present embodiment is adapted to adjust the calculated moving averages P of the end journals 128, the two measured values X used to calculate the moving averages P may be similarly adjusted.

Then, the manner of obtaining the compensating data in the fourth step of FIG. 36 will be explained.

As described above, the compensating data include not only the error values R but also the first and second derivatives T and D. The error value R is one form of the dimensional error of the ground workpiece (crankshaft 126), while the first derivative T is one form of a variable or parameter indicative of the tendency of change in the dimensional error. Further, the second derivative D is one form of a variable or parameter indicative of the tendency of change in the tendency of change in the dimensional error.

The parameters T and D are used in addition to the error values R to determine the compensating values U, since the use of the first and second derivatives T and D permits more accurate or exact estimation of the actual grinding condition of the machine 110 and assures accordingly improved accuracy of adjustment of the reference values used by the automatic sizing device 114, as compared with the use of only the error values R.

There will be explained the calculation of the first derivative T.

Figure 43:
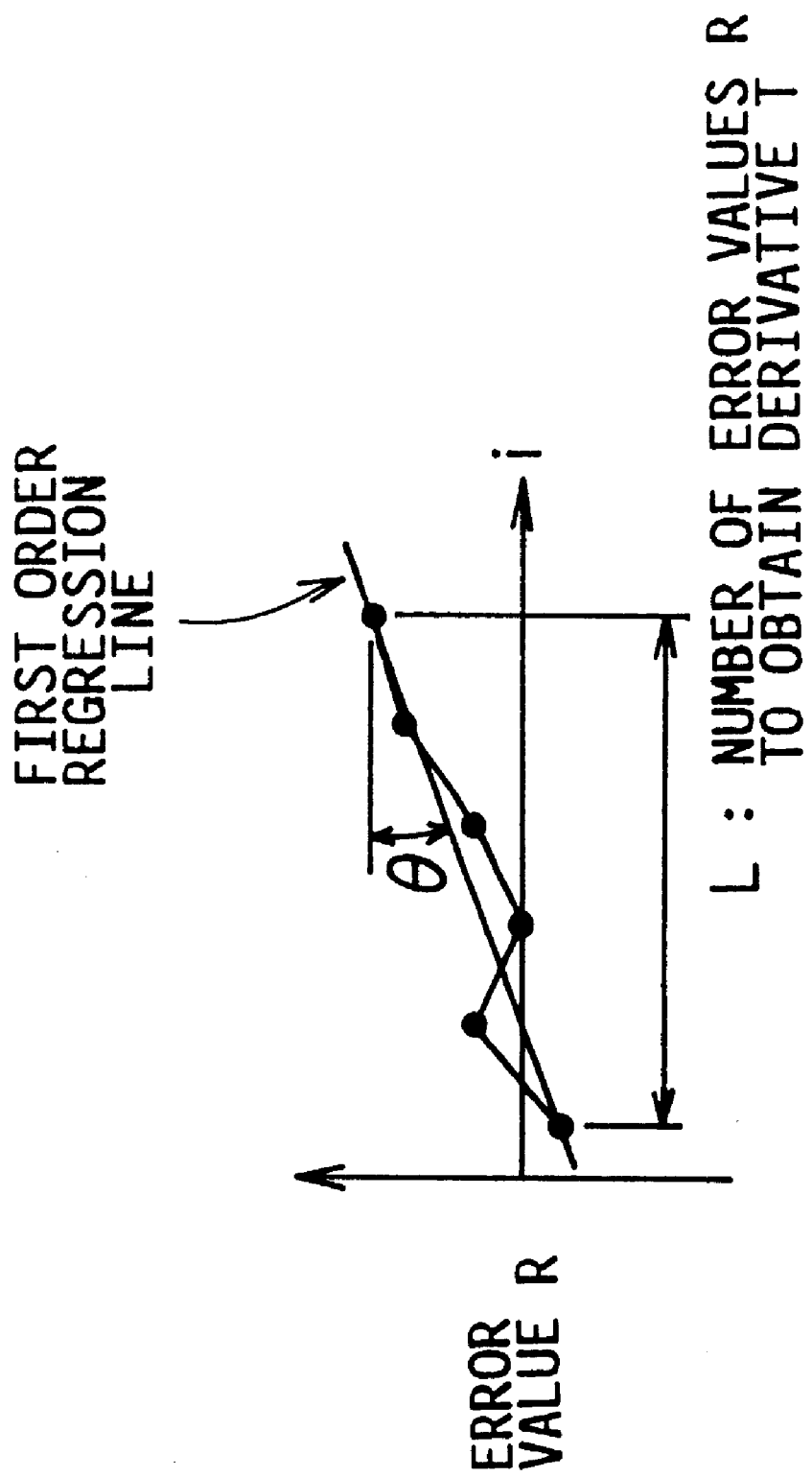
FIG. 43 is a graph schematically showing an operation performed in fourth step of FIG. 36.

As a rule, the first derivative T of the error value R is determined on the basis of a first order regression line with respect to a predetermined number L($\geqq 2$) of the error values R which consist of the presently calculated error value R and at least one previously calculated error value R stored in the data memory. This determination is based on the assumption that the error values R change almost linearly along the regression line, with an increase in the number i of the measured workpieces. As schematically indicated in the graph of FIG. 43, the first derivative T is obtained as the gradient of the regression line, more specifically, as tan θ where the gradient (radian) of the regression line is θ. For example, the first order regression line is obtained according to the following equation (6):

$$y = \frac{\sum (x - x')(R - R')}{\sum (x - x')^2} \cdot (x - x') + R' \quad (6)$$

where, x=number (i) of the measured workpieces
x'=average of values x (whose number is equal to L)
y=adjusted error value R for each value x
R=calculated error value (before the adjustment) for each value x
R'=average of the calculated error values R (whose number is equal to L)

Then, the first derivative T is calculated according to the following formula (7):

$$\frac{\sum (x - x')(R - R')}{\sum (x - x')^2} \quad (7)$$

As in the calculation of the moving averages P, however, the above method if practiced as described above would not be capable of calculating the derivative T until the number of the error values R available has become equal to "L".

In view of the above, the present embodiment uses auxiliary equations (as used in the calculation of the moving average P) to calculate first order regression lines for the currently available error values R whose number is smaller than "L". For instance, where the number L is equal to "5", equations to determine regression lines where the number L is "1", "2", "3" and "4", respectively, are selectively used depending upon the number of the error values R currently available (currently calculated error value R and error value or values R stored in the data memory). This method of calculating the first derivative T will be referred to as "special differentiation mode".

The above function of the special differentiation mode to obtain the first derivative T is also enabled or disabled by the operator. The function is enabled by a SPECIAL DIFFERENTIATION command entered by the operator.

There will next be described the method of calculating the second derivative D of the error value R.

The calculation of the second derivative D is similar to that of the first derivative T. That is, the second derivative D of the error value R is determined on the basis of a first order regression line with respect to a predetermined number Q ($\geqq 2$) of the first derivative values T which consist of the presently calculated value T and at least one previously calculated value T stored in the data memory. This determination is based on the assumption that the first derivatives T change almost linearly along the regression line, with an increase in the number i of the measured workpieces. The second derivative T is obtained as the gradient of the regression line, more specifically, as tan θ where the gradient (radian) of the regression line is θ.

However, the use of the second derivative D is not essential, and the mode to use the second derivative D is established by a SECOND DERIVATIVE USE command entered by the operator.

In the present embodiment, a special differentiation mode as is available with respect to the first derivative T as described above is not available with respect to the second derivative D. However, it is possible to provide the special differentiation mode for the second derivative D.

There will be explained the calculation of the compensating value U by fuzzy inference in the fifth step of FIG. 36. In particular, the concept of adjusting the compensating value U depending upon the dead time value MS or number Y of the pre-measured workpieces, and the concept of the fuzzy inference will be discussed in detail.

When the number Y of the pre-measured workpieces (crankshafts 126) existing between the grinding machine 110 and the post-process measuring device 116 changes, it is desirable to change the fuzzy rules used to determine the compensating value U, depending upon the number Y which represents the dead time value MS as discussed above. In the present embodiment, therefore, the fuzzy rules used to obtain the compensating value U may be changed with the dead time value MS taken into consideration, as described later.

However, the function of changing the fuzzy rules indicated above is enabled and disabled by the operator.

Then, the fuzzy inference implemented to calculate the compensating value U will be explained.

In the present embodiment, the following three fuzzy inference modes are available: (1) first mode in which only the error value R and the first derivative T are used as input variables for the fuzzy inference; (2) second mode in which the second derivative D as well as the error value R and the first derivative T is used as a third input variable for the fuzzy inference; and (3) third mode in which the error value R, first derivative T and dead time value MS are used as input variables for the fuzzy inference.

The second mode is established by the SECOND DERIVATIVE USE command as indicated above, and the third mode is established by a DEAD TIME COMPENSATION command. The first mode is established when none of these commands are present.

While the above three fuzzy inference modes will be discussed, only the first mode will be explained in detail by way of example, since the three modes are based on a common fundamental concept. In the first mode, the compensating value U is calculated by fuzzy inference on the basis of only the error value R and first derivative T.

For the control device 120 to effect the fuzzy inference, the read-only memory (ROM) provided therein also stores fuzzy inference data used for determining the compensating value U by fuzzy inference. The fuzzy inference data include: (a) fuzzy inference programs; (b) three groups of membership functions associated with the error value R, first derivative T and compensating value U, respectively; and (c) two groups of fuzzy rules for defining relationships among the error value R, derivative T and compensating value U.

For the error value R, the control device 120 uses seven fuzzy labels NB (negative big), NM (negative medium), NS (negative small), ZO(zero), PS (positive small), PM (positive medium) and PB (positive big), whose values increase in the order of description from a negative value to a positive value. The membership functions of these fuzzy labels are indicated in the graph of FIG. 3.

For the first derivative T of the error value R, the control device 120 uses five fuzzy labels NB, NS, ZO, PS and PB, whose values increase in the order of description from a negative value to a positive value. The membership functions of these fuzzy labels are indicated in the graph of FIG. 4.

For the compensating value U, the control device 120 uses the seven fuzzy labels NB, NM, NS, ZO, PS, PM and PB, as described above with respect to the error value R, The membership functions of these seven fuzzy labels are indicated in FIG. 5. An increase in the compensating value U results in an increase in the reference value set in the automatic sizing device 114, which in turn results in an increase in the outside diameter of the journals 128 of the crankshaft 126. On the other hand, a decrease in the compensating value U results in a decrease in the reference value, which in turn results in a decrease in the outside diameter of the journals 128.

While only one group of fuzzy rules is sufficient to effect fuzzy inference which permits the compensating value U to be determined in some way, the present third embodiment uses the two groups of fuzzy rules, for the reason stated below.

While the measured diameter values X of the ground journals 128 are relatively stable and the vibration level of the measured values X is relatively low, it is desirable to determine the compensating value U so that the determined compensating value U is highly responsive to the changes in the error value R and first derivative T, in order to improve the dimensional accuracy of the ground journals 128. When the measured values X are unstable due to the vibration of the grinding machine 110, for example, with a result of an increase in the vibration level of the measured values X, the compensating value U if determined according to the fuzzy rules adapted for use when the vibration level is low may further deteriorate the vibration level of the measured values X, as a result of the adjustment of the reference value of the automatic sizing device 114 according to the thus determined compensating value U. In the light of this observation, the two groups of fuzzy rules are selectively used depending upon the vibration level of the measured values X. Namely, the first group consists of positive fuzzy rules used when the vibration level is relatively low, so that the compensating value U determined by the positive fuzzy rules is highly responsive to the changes in the error value R and derivative T, while on the other hand the second group consist of negative fuzzy rules used when the vibration level is relatively high, so that the compensating value U determined by the negative fuzzy rules is less responsive to the error value R and derivative T.

The positive fuzzy rules are indicated in TABLE 9, while the negative fuzzy rules are indicated in TABLE 10.

TABLE 9

POSITIVE FUZZY RULES
R

|   |    | NB | NM | NS | ZO | PS | PM | PB |
|---|----|----|----|----|----|----|----|----|
| T | NB | ZO | ZO | PS | ZO | ZO | ZO | ZO |
|   | NS | PB | PM | PS | ZO | ZO | NS | NM |
|   | ZO | PB | PM | PS | ZO | NS | NM | NB |
|   | PS | PM | PS | ZO | ZO | NS | NM | NB |
|   | PB | ZO | ZO | ZO | ZO | NS | ZO | ZO |

TABLE 10

NEGATIVE FUZZY RULES
R

|   |    | NB | NM | NS | ZO | PS | PM | PB |
|---|----|----|----|----|----|----|----|----|
| T | NB | ZO | ZO | ZO | ZO | ZO | ZO | ZO |
|   | NS | PS | PS | PS | ZO | ZO | NS | NM |
|   | ZO | PB | PM | PS | ZO | NS | NM | NB |
|   | PS | PM | PS | ZO | ZO | NS | NS | NS |
|   | PB | ZO | ZO | ZO | ZO | ZO | ZO | ZO |

An example of the positive fuzzy rules of TABLE 9 is as follows:

IF R=NB and T=NS, THEN U=PB.

An example of the negative fuzzy rules of TABLE 10 is as follows:

IF R=NB and T=NS, THEN U=PS

As is apparent from these examples, the positive and negative fuzzy rules are formulated such that the compensating values U determined according to the positive fuzzy rules are generally larger than those determined according to the negative fuzzy rules, even when the input variables R and T are constant.

The present embodiment is designed such that when the control device 120 is initially turned on, the group of positive fuzzy rules is effective.

The present embodiment is also designed such that the positive fuzzy rules are used after the vibration level of the measured values X has been lowered as a result of the use of the negative fuzzy rules which were used because the vibration level had been high. The use of the positive fuzzy rules following the use of the negative fuzzy rules may increase the vibration level of the measured values X shortly after the use of the positive fuzzy rules. On the other hand, however, the use of the negative fuzzy rules for a long time will lower the response speed of the compensating value U with respect to the actual change in the measured values X, leading to deterioration of the dimensional accuracy of the ground journals 128. In this sense, the positive fuzzy rules are used immediately after the vibration level has been reduced below a given limit, to minimize the period of time during which the negative fuzzy rules are used, for the purpose of improving the dimensional accuracy of the ground journals 128.

In the present embodiment, the determination as to whether or not the vibration level of the measured values X is higher than a given threshold, that is, the determination as to whether the positive fuzzy rules or the negative fuzzy rules should be used is effected on the basis of the frequency of application of NB/PB fuzzy rules, which are the positive and negative fuzzy rules which are used when the calculated derivative T is "NB" or "PB". To effect this determination, the RAM of the control device 120 includes a CYCLE counter and an NB/PB counter. The CYCLE counter is used to count the number of cycles of execution of the routine of FIG. 36 (control routine of FIGS. 30–35 which will be described), more precisely, the number of times of the fuzzy inference operations in the fifth step of FIG. 36. The NB/PB counter is used to count the number of application or use of the NB/PB fuzzy rules. The CYCLE counter is incremented each time the fifth step of FIG. 36 is implemented. When the count of the CYCLE counter exceeds a predetermined threshold value B ($\geq 2$), the control device 120 determines whether the count of the NB/PB counter exceeds a predetermined threshold value C (smaller than B). If the count of the NB/PB counter is larger than the value C, the vibration level of the measured values X is determined to be higher than the threshold. The CYCLE counter is reset to "0" when the count exceeds the threshold value B, and the NB/PB counter is reset to "0" when the CYCLE counter is reset.

While the rationale for using the two groups of fuzzy rules and the difference between these two groups of fuzzy rules have been explained, the common design concept of the fuzzy rules will be explained.

The two groups of fuzzy rules are formulated so that the compensating value U decreases with not only an increase in the value of the appropriate fuzzy label for the error value R, but also an increase in the value of the appropriate fuzzy label for the derivative T. That is, the value U decreases as the error value R and derivative T increase.

The above concept is represented in the positive fuzzy rules of TABLE 9, for example, such that when the derivative T is "NS", the compensating value U decreases in the order of "PB", "PM", "PS", "ZO", "ZO", "NS" and "NM" as the error value R increases, and when the error value R is "NM", the value U decreases in the order of "PM", "PM" and "PS" as the derivative T increases in the order of "NS", "ZO" and "PS".

Further, the fuzzy rules are formulated such that the compensating value U changes toward "0" when the diameter value X measured by the post-process measuring device 116 suddenly or abruptly decreases or increases. This arrangement is effective to maintain high dimensional accuracy of the processed workpieces, when the measured value X is abnormally reduced or increased due to a temporary trouble or defect of the in-process measuring device 112. The instant arrangement maintains the currently established reference values of the automatic sizing device 114, with the compensating value U being zeroed, in the event of such temporary trouble with the in-process measuring device 112.

The above arrangement is embodied in the fuzzy rules of TABLE 9, for example, such that the compensating value U is "ZO", when the error value R is "NB" or "NM" and when the derivative T is "NB", or when the error value R is "PM" or "PB" and when the derivative T is "PB".

Next, there will be explained the operation in the sixth step of FIG. 36 to obtain the final compensating values U* for gradual adjustment of the reference values set in the automatic sizing device 114.

As mentioned above, it is generally recognized that the error in the dimension of the ground journals 128 of the crankshafts 126 substantially linearly changes with an increase in the number i of the measured workpieces (crankshafts 126). In this respect, it is desirable to slowly or gradually change the compensating value U for gradually or smoothly adjusting the reference values of the sizing device 112.

Figure 44:
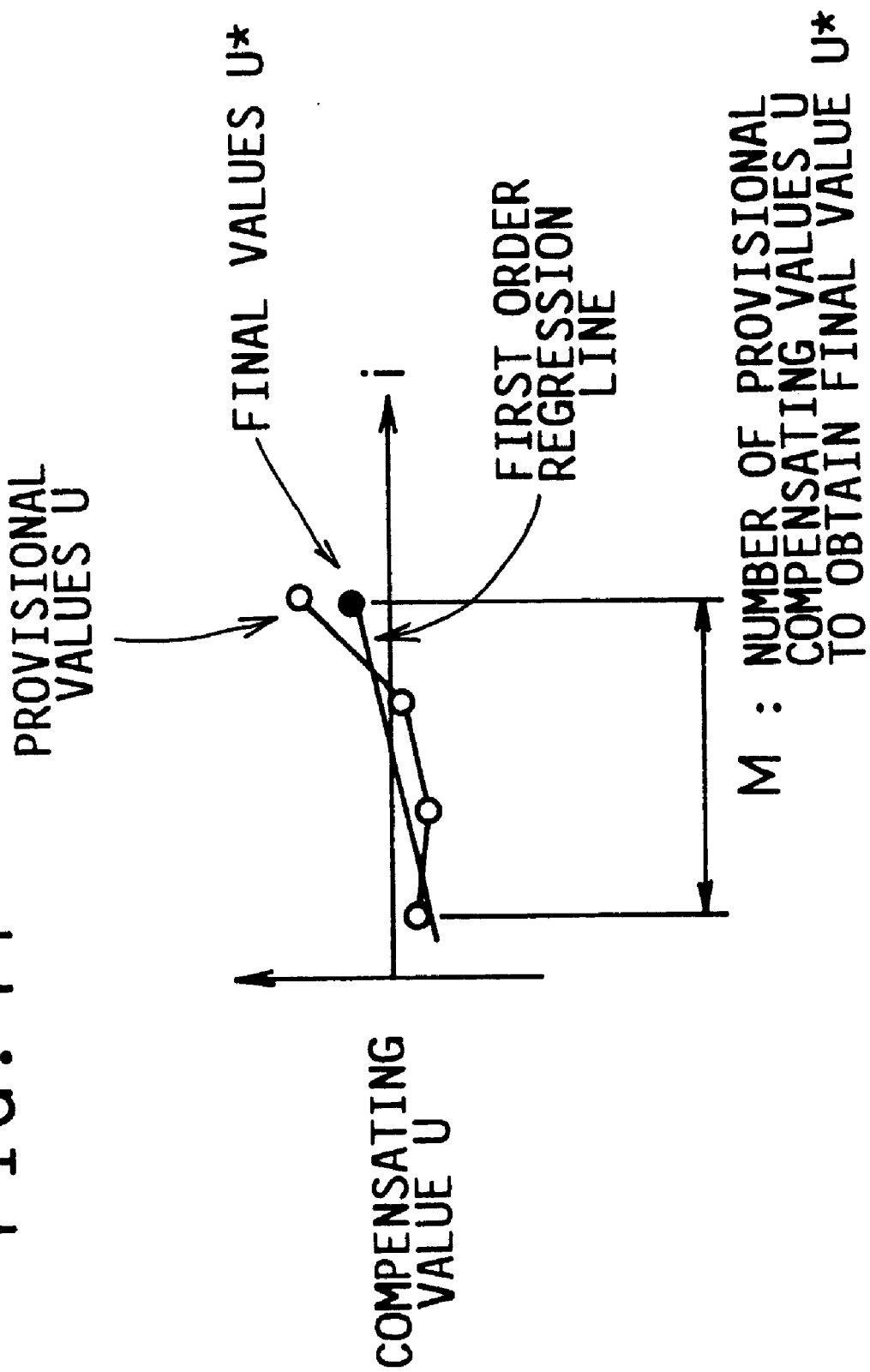
FIG. 44 is a graph schematically showing sixth step of FIG. 36.

In view of the above, the present embodiment is adapted such that the provisional compensating values U are first calculated as indicated in the graph of FIG. 44, and then the final compensating value U* is calculated on the basis of a first order regression line of a predetermined number M ($\geq 2$) of the calculated provisional compensating values. The regression line is determined on the assumption that the provisional compensating values U (whose number is equal to "M") increase substantially linearly with an increase in the number i of the measured workpieces. The thus obtained final compensating value U* is fed to the automatic sizing device 112.

For the final compensating value U* is calculated according to the following equation (8), for example:

$$y = \frac{\sum (x-x')(U-U')}{\sum (x-x')^2} \cdot (x-x') + U' \quad (8)$$

where, x=number i of measured workpieces x'=average of the values x (whose number is equal to "M")

y=final compensating value U* for each value x

U=provisional compensating value U for each value X

U'=average of the provisional compensating values U (whose number is equal to "M")

For instance, the final compensating value U* is obtained by inserting "i" as the value x in the above equation (8).

The above function of adjusting the provisional compensating value U to obtain the final compensating value U* is enabled by a GRADUAL COMPENSATION command entered by the operator.

Figure 45:
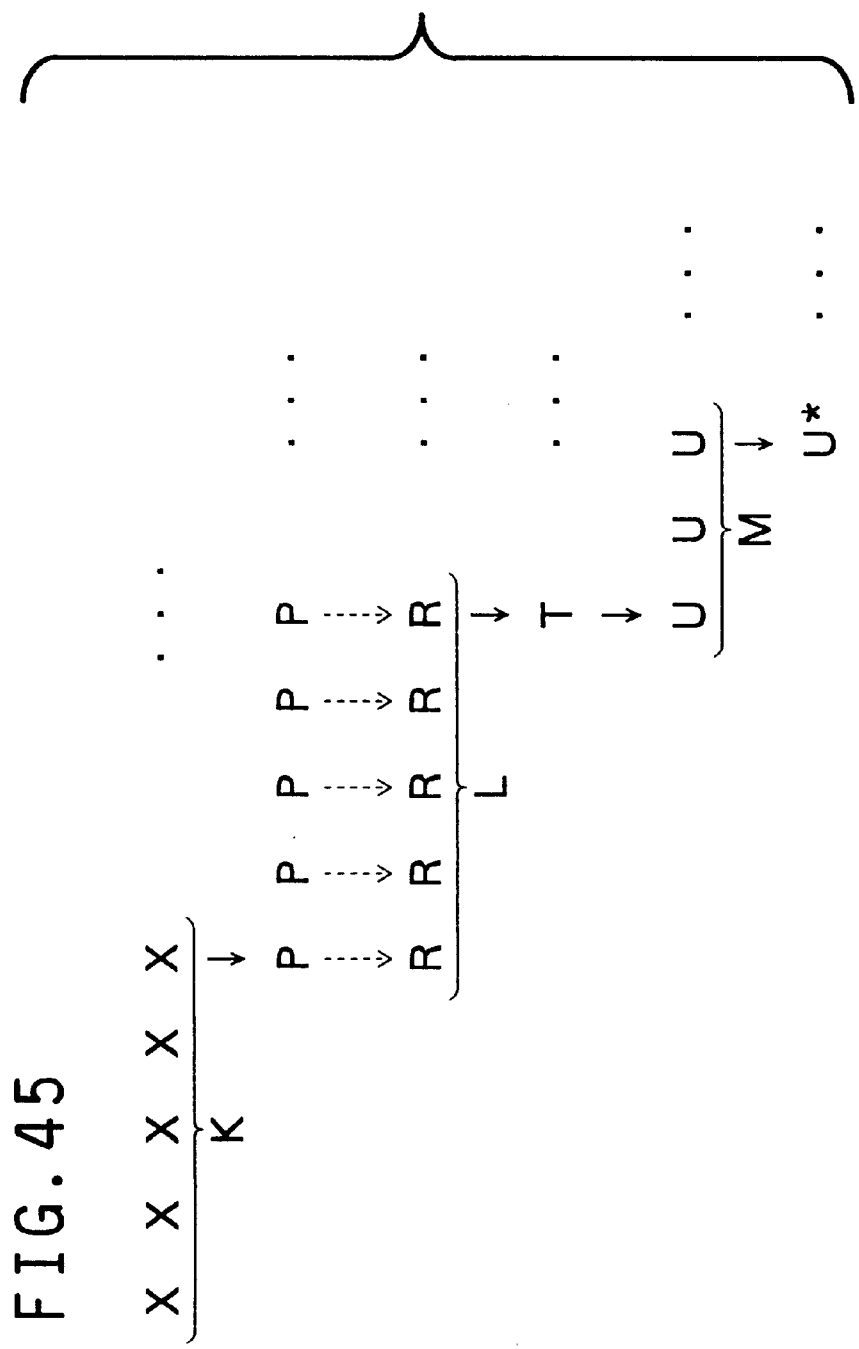
FIG. 45 is a graph explaining an example of a process implemented by the compensating routine of FIGS. 30–35 to obtain final compensating value U* from measured values X.

An example of a series of operations until the final compensating value U* is obtained in the presence of the GRADUAL COMPENSATION command is schematically illustrated in FIG. 45, In this figure, the values indicated in relatively left portions of the figure are obtained prior to the values indicated in relatively right portions of the figures. That is, the number i of the measured workpieces increases in the direction from left to right as seen in FIG. 39. It will be apparent from the figure that a first final compensating value U* is obtained when the number of measured values X stored in the data memory has become equal to (K+L+M–2), provided the routine of FIG. 36 is initiated without any measured values X stored in the data memory. Thus, a predetermined number of measured values X is required to obtain the first final compensating value U*.

The feature of the seventh step of FIG. 36 will then be described.

The thus obtained final compensating value U* for gradual adjustment of the reference values of the sizing device 114 is transmitted to the sizing device 114 in the eighth step of FIG. 36. However, the transmission in this eighth step is omitted if the absolute value of the final compensating values U* is smaller than a threshold. That is, the eighth step is preceded by the seventh step to determine whether the final compensating value U* falls within a tolerable range indicated by N in the graph of FIG. 46.

There will next be explained the intermittent determination of the compensating value U briefly mentioned above.

The reference values used in the automatic sizing device 114 for controlling the grinding condition of the machine 110 for the end journals 128 of the crankshaft 126 can be continuously adjusted by the compensating value U which is updated each time the diameter values X of the end journals X are measured by the post-process measuring device 116. However, this continuous adjustment of the reference values or the continuous updating of the compensating value U gives rise to a problem that the compensating value U should be determined for each and every one of the workpieces measured by the measuring device 116. This leads to a considerable increase in the work load on the control device 120.

To solve the above problem, the present third embodiment is adapted to effect so-called "intermittent compensation" as described below.

Figure 47:
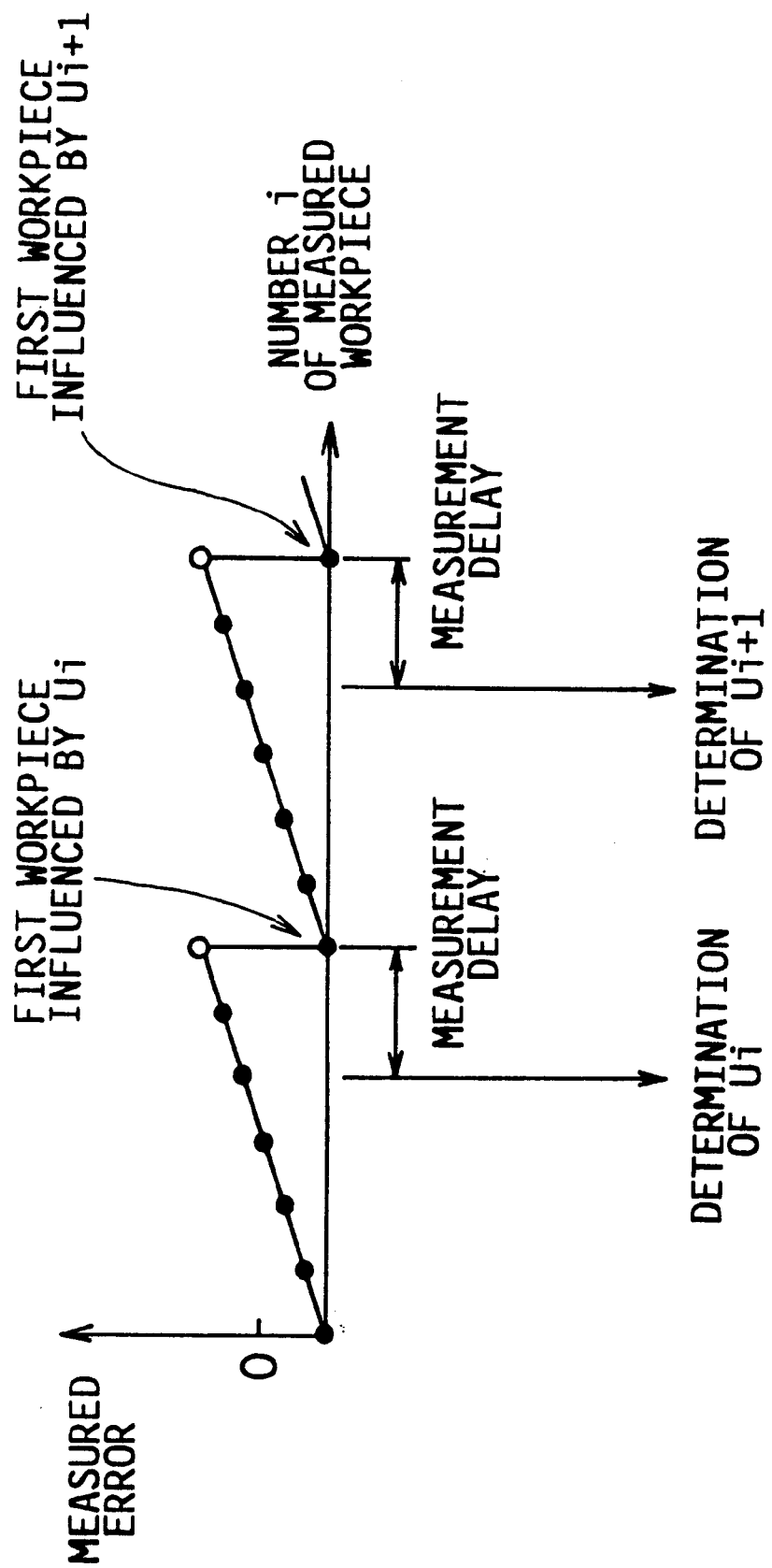
FIG. 47 is a graph schematically indicating "intermittent" compensation implemented in the third embodiment.

The concept of the intermittent compensation is schematically illustrated in the graph of FIG. 47, which shows a variation in the measured error (dimensional error R) of the outside diameter of the journal 128 when a plurality of workpieces (crankshafts 126) are present as "pre-measured workpieces" between the grinding machine 110 and the measuring device 116. In the graph, the number Y of the pre-measured workpieces (corresponding to the dead time value MS explained above) is indicated as "measurement delay", and Ui and Ui+1 represent the present and next compensating values U. It will be understood that an influence of the present compensating value Ui appears on the dimensional error R which is measured when a time corresponding to the measurement delay has passed after the moment of determination of the present compensating value Ui. Similarly, an influence of the next compensating value Ui+1 appears on the dimensional error measured when the measurement delay time has passed after the determination of the value Ui+1. The graph of FIG. 47 is obtained on the assumption that the dimensional error of the workpieces increases substantially linearly with an increase in the number i of the measured workpieces, where the workpieces are ground successively while the reference values used by the sizing device 114 for the two end journals 128 are held constant. This assumption also applies to the graphs of FIGS. 48–51 referred to later.

For the intermittent compensation, there are available the following two modes as described below.

I. First Intermittent Compensation Mode

As described above, the automatic sizing device 114 is connected to the grinding system in which a given number Y of pre-measured workpieces are present between the grinding machine 110 and the post-process measuring device 116. Hence, a workpiece ground with the reference values adjusted by the preceding compensating value U is not necessarily measured by the measuring device 116 immediately after the completion of the grinding operation on that workpiece. In other words, the workpiece in question may be measured after some number of the previously ground workpieces have been measured by the device 116. Accordingly, to reflect the preceding compensating value U on the present compensating value Ui, it is desirable that the present compensating value Ui be determined only after at least one workpiece ground according to the preceding compensating value U has been measured.

Figure 48:
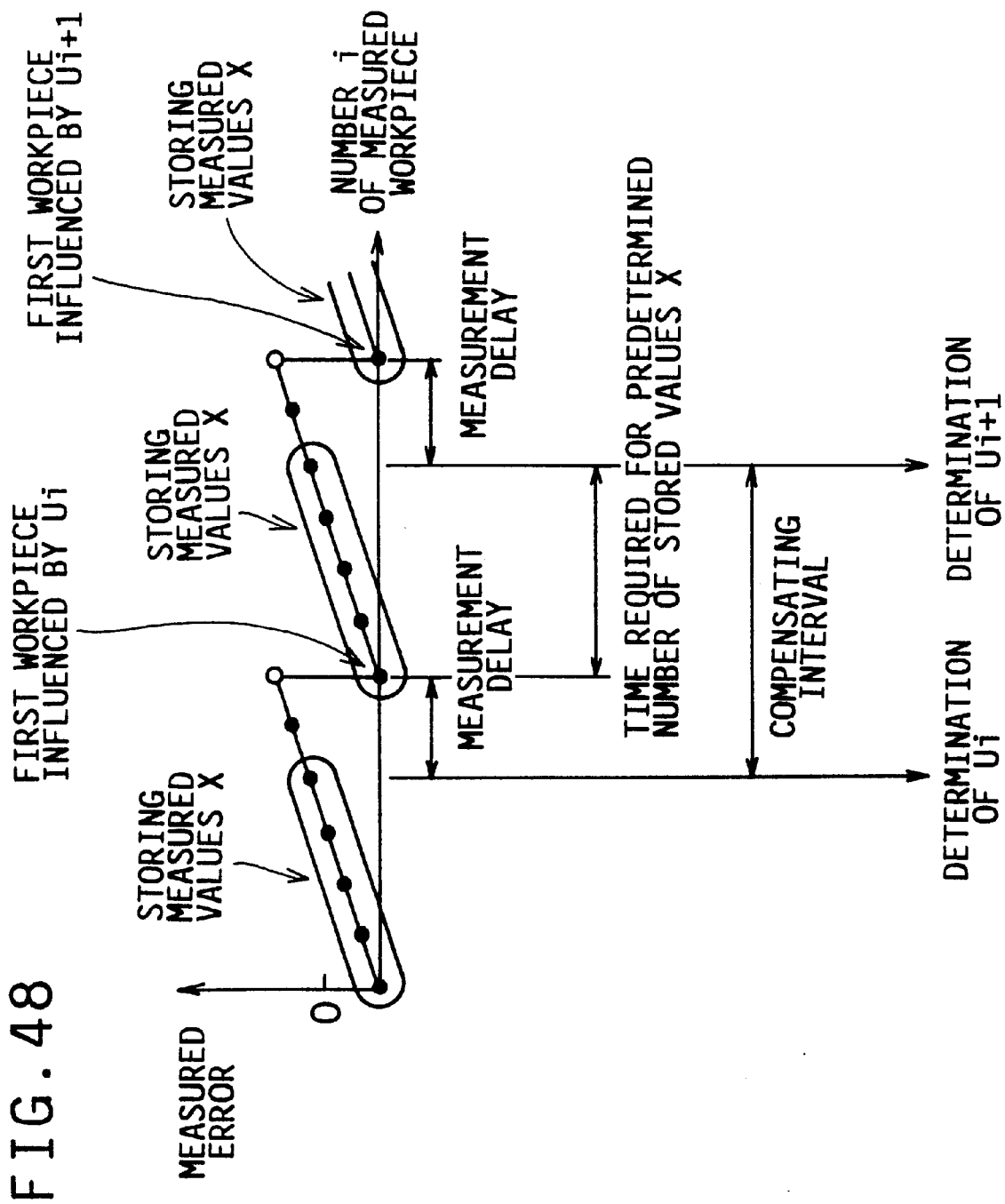
FIG. 48 is a graph schematically showing a first method for the "intermittent" compensation of FIG. 47.

With the above aspect taken into account, the first intermittent compensating mode is adapted, as schematically illustrated in the graph of FIG. 48, so as to store diameter values X successively measured by the device 116, and determine the present compensating value Ui when the number of the stored measured values X has reached a predetermined number ($\geq 2$). The value Ui is determined on the basis of the predetermined number of the stored values X. When or after the first workpiece subjected to the thus determined compensating value Ui has been measured by the device 116, the data memory to store measured values X is cleared, and the values X measured thereafter (which may include the value X of the first workpiece indicated above) are successively stored to determine the next compensating value Ui+1.

In one form of the first intermittent compensation mode, there exists a compensating interval between the moments of determination and transmission of the present and next compensating values Ui and Ui+1. During this compensating interval, the compensating value U is not updated, and the corresponding reference value used in the sizing device 114 remains unchanged. This form of compensation is based on the concept that there exists a proportional relationship between the number i of the measured workpiece and the dimensional error R of the workpieces. According to this concept, the present compensating value Ui is determined, or the compensating value U is updated so that the dimensional errors R of the workpieces influenced by the present or updated compensating value Ui are eventually zeroed as a whole.

However, the above form of the first intermittent compensating mode suffers from a drawback that the moment of determination of the compensating value Ui is determined solely by the number of the stored measured values X, irrespective of an actual change in the measured values X. This may lead to inadequate timing of adjustment of the reference value of the sizing device 114.

To solve the above drawback, a second form of the first intermittent compensating mode is adapted such that if the determined compensating value Ui is substantially zero or falls within a tolerable range as described above by reference to FIG. 46, the compensating value Ui is not sent to the sizing device 114, and the determination is deferred until some additional measured values X have been stored. This form assures timely adjustment of the reference value of the sizing device 114 when the compensating value Ui is outside the tolerable range, that is, when the dimensional error R has considerably changed.

However, the above second form of the first intermittent compensating mode is not capable of adjusting the reference value of the sizing device 114 with high response to a change in the measured values X which takes place shortly after the determination and transmission of the compensating value Ui, namely, during an initial portion of the compensating interval indicated above. Such a change is reflected on the measured values X subsequently stored in the data memory, and therefore reflected on the next compensating value Ui+1. Thus, a change in the dimensional error R shortly after the determination of the compensating value Ui cannot be dealt with until the next compensating value Ui+1 is determined and transmitted to the sizing device 114. Therefore, the dimensional error R cannot be reduced toward zero with sufficiently high response.

Figure 49:
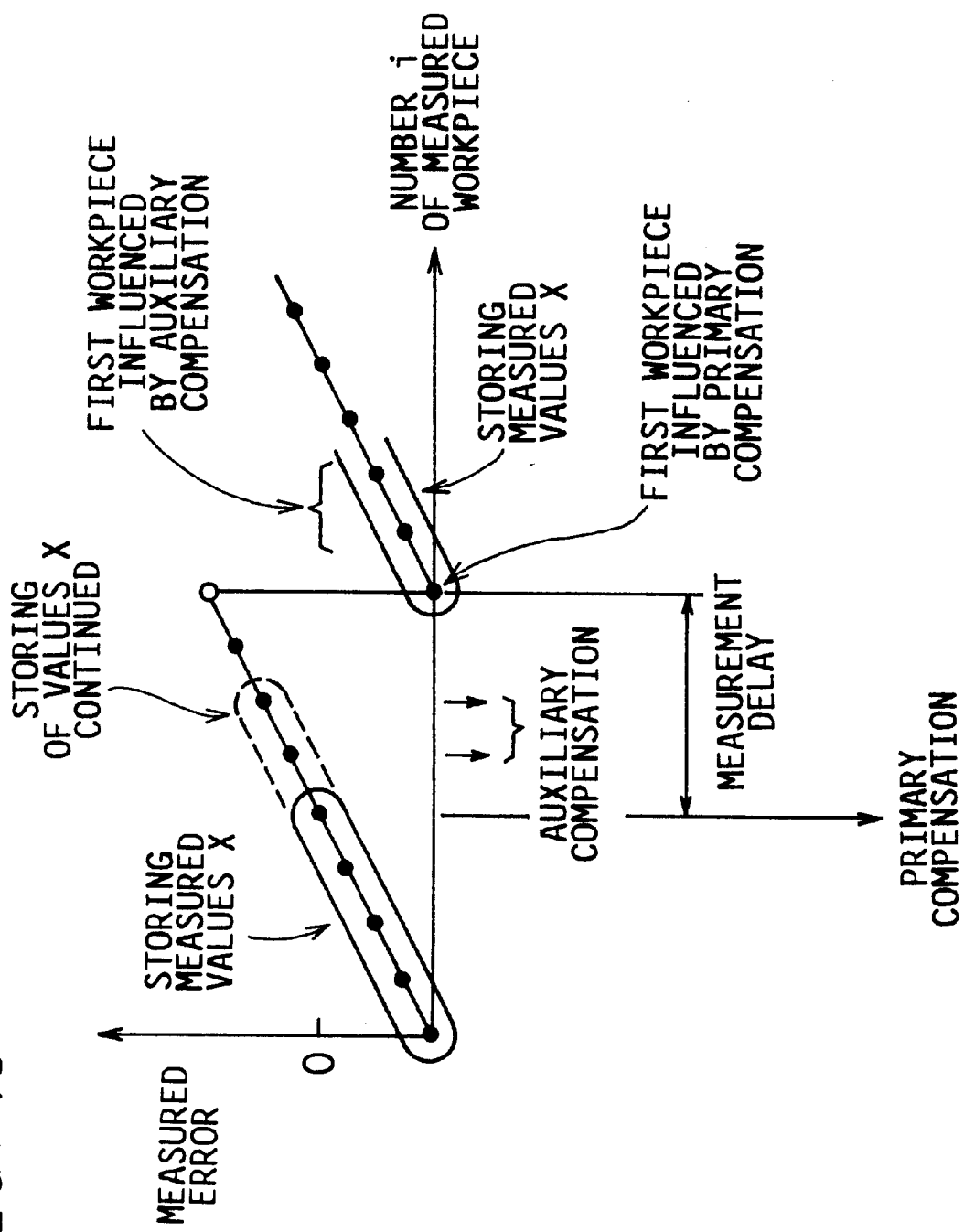
FIG. 49 is a graph schematically showing one form of the first method of FIG. 48.

The above drawback may be removed according to a third form of the first intermittent compensating mode, in which primary compensation (i.e., determination of Ui as indicated in FIG. 48) according to the above second form is followed by auxiliary compensation, as schematically illustrated in the graph of FIG. 49. The auxiliary compensation is effective to deal with a change in the measured values X which occurs shortly after the completion of the primary compensation. The auxiliary compensation is highly responsive to such change.

To achieve the primary compensation, the diameter values X measured by the measuring device 116 are successively stored in the data memory, and a provisional compensating value Up is determined when the number of the stored measured values X has become equal to a predetermined value. The provisional value Up determined on the basis of the predetermined number of the stored values X is used as a final compensating value Uf.

The auxiliary compensation following the primary compensation is adapted to continue storing the measured values X, and determine a provisional compensating value Up as in the primary compensation, on the basis of a predetermined number ($\geq 2$) of the measured values X when each ground workpiece is measured by the measuring device 116, during a period between a moment after the primary compensation is completed (e.g., immediately after the primary compensation is completed) and a moment before or when the measurement of the workpiece which immediately precedes the first workpiece subjected to or influenced by the primary compensation is completed. For example, the auxiliary compensation is commenced immediately after the primary compensation is completed, and is continued until the workpiece immediately preceding the first workpiece influenced by the primary compensation has been measured. The determined provisional compensating value Up of the auxiliary compensation is subtracted from the final compensating value Uf of the primary compensation, and the thus obtained difference is used as a final compensating value Uf of the auxiliary compensation.

In the auxiliary compensation, therefore, the provisional compensating value Up as determined in the same manner as in the primary compensation is not sent to the automatic sizing device 114. Instead, the difference of the provisional values Up of the primary and auxiliary compensations is applied to the sizing device 114, for the reason described below.

As explained above, the provisional value Up of the auxiliary compensation is based on the values X measured before the first workpiece influenced by the primary compensation is measured by the measuring device 116. Hence, if the provisional value Up of the auxiliary compensation were applied, this would be added to the final compensating value Uf of the primary compensation, and the reference values for the workpieces already influenced by the primary compensation would be again influenced or adjusted by the provisional compensating value Up of the auxiliary compensation, without considering an influence of the primary compensation. Accordingly, only the difference of the provisional compensation value Up of the auxiliary compensation from the final compensation Uf of the primary compensation is used as the final compensating value Uf of each auxiliary compensation, which is applied to the sizing device 114 before the first workpiece influenced by the primary compensation has been measured. While two or more auxiliary compensation cycles may follow the primary compensation in each one of intermittent compensating cycles, the provisional value Up obtained in each auxiliary compensating cycle is compared with the final compensating value Uf of the primary compensation to determine the final compensating value Uf of each auxiliary compensation cycle.

In the third form of the first intermittent compensating mode in which the auxiliary compensation follows the primary compensation, the auxiliary compensation cycle following the primary compensation in each intermittent compensating cycle may be repeated up to a moment immediately before the commencement of the next primary compensation. This arrangement gives a considerable work load to the control device 120.

The above problem may be solved by providing a suitable maximum number S to which the number of the auxiliary compensation cycles to be repeated following each primary limited. That is, the series of auxiliary compensation is terminated when the counted number of the auxiliary compensation cycles repeated or the counted number of the final compensating values Uf determined has reached a predetermined value. In this arrangement, the moment of termination of the auxiliary compensation is fixed with respect to the moment of termination of the corresponding primary compensation, and an unexpected change in the measured values X may occur after the termination of the auxiliary compensation and before the commencement of the next intermittent compensation cycle (next primary compensation). Therefore, the arrangement is not necessarily satisfactory to adequately deal with such change in the measured values X.

The above drawback may be solved by an arrangement in which the final compensating value Uf obtained in the first auxiliary compensation cycle is not applied to the automatic sizing device 114 if the value Uf falls within a tolerable range, as described above by reference to FIG. 46 with respect to the standard or normal compensation (equivalent to the primary compensation). Namely, the final compensating value Uf determined in a subsequent auxiliary compensation cycle is sent to the sizing device 114 to effect the auxiliary compensation, if the value Uf in question is a considerably large value outside the tolerable range.

The above arrangement is still unsatisfactory in some situations, in terms of the timing of the primary and auxiliary compensations relative to the time of a change in the measured values X. In this respect, the arrangement in question may be improved if modified as follows. In the modified form, the number of the final compensating values Uf obtained in a series of auxiliary compensation cycles executed following each primary compensation is counted, and the final compensating values Uf of the primary compensation and the series of auxiliary compensation cycles are summed up when the counted number has become equal to a predetermined value. If the sum is not substantially zero or not sufficiently close to zero, the auxiliary compensation is terminated. If the sum is sufficiently close to zero, this indicates that the series of auxiliary compensation cycles so far would not be considered adequate in terms of the timing of implementation. In this event, the counter to count the number of the values Uf of the auxiliary compensation cycles is reset, and further auxiliary compensation cycles are implemented.

When the first intermittent compensating mode is selected in the present embodiment, the control device 120 is placed in one of two operating states, namely, a first state in which only the primary compensation is effected as indicated in FIG. 48, and a second state in which both the primary compensation and the auxiliary compensation are effected as indicated in FIG. 49. The first and second states are selectively established by a command entered by the operator. Namely, the second state is established by an AUXILIARY COMPENSATION command, and the first state is established when the AUXILIARY COMPENSATION command is not present.

Further, the auxiliary compensation cycle is either executed once or repeated two or more times following each primary compensation, depending upon a command also entered by the operator.

When the auxiliary compensation cycle is repeated, the tolerable range as described above may or may not be provided to determine whether the final compensating value Uf obtained in the first auxiliary compensation cycle should be sent to the sizing device 114 or not. The tolerable range is provided when a TOLERABLE RANGE command entered by the operator is present, and not provided when an AUXILIARY COMPENSATION CYCLING command also entered by the operator is present. In the latter case, the auxiliary compensation cycle is repeated a predetermined number of times, and the compensating value Uf determined in each cycle is sent to the sizing device 114, irrespective of whether the value Uf is within the tolerable range or not.

II. Second Intermittent Compensating Mode

In the first intermittent compensation mode, the values X used for the compensation (primary compensation) are not measured and stored immediately after the determination of the compensating value Ui, until the first workpiece influenced by the compensating value Ui has been measured by the measuring device 116, if there is a measurement delay corresponding to the number Y of the pre-measured workpieces between the grinding machine 110 and the measuring device 116. Consequently, the compensating interval between the moments of determination of the present and next compensating values Ui and Ui+1 is a sum of the measurement delay time (dead time value MS) and the time required to obtain a predetermined number of measured values X. Therefore, the compensating interval tends to be relatively long, particularly where the grinding system is adapted to have a relatively large number of pre-measured workpieces between the machine 110 and the measuring device 116.

Figure 50:
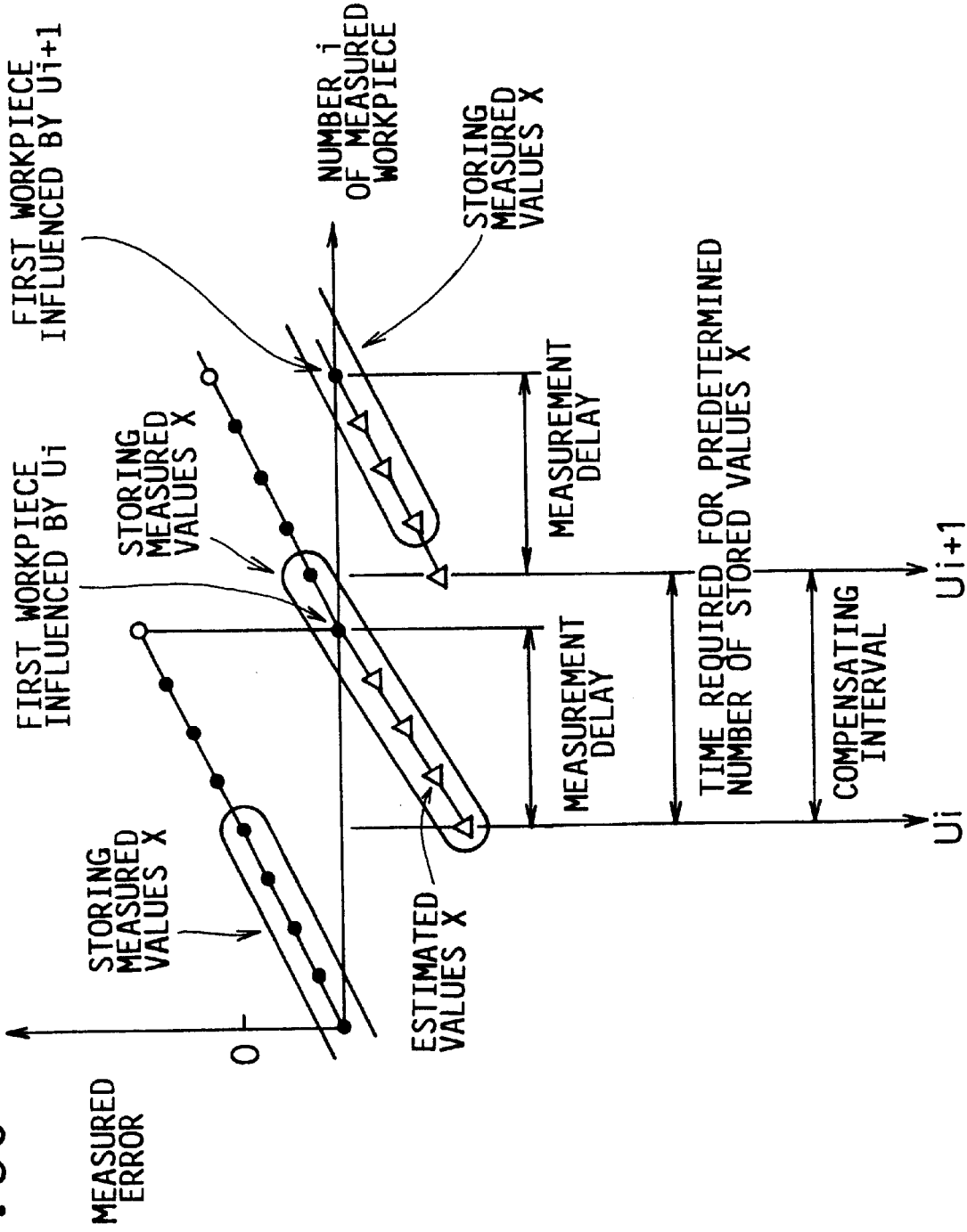
FIG. 50 is a graph schematically showing a second method for the "intermittent" compensation of FIG. 47.

The second intermittent compensating mode is provided to solve the above drawback of the first intermittent compensating mode. In the present second mode, as schematically illustrated in the graph of FIG. 50, the compensating value Ui is first determined in the same manner as in the first intermittent compensating mode, namely, on the basis of a predetermined number of values X measured by the measuring device 116. Then, the next compensating value Ui+1 is determined on the basis of estimated values X which are obtained in an intermediate period after the determination of the first compensating value U, for example, immediately following the moment of determination of the first compensating value U. This intermediate period ends around the moment at which the measurement of the workpiece immediately preceding the first workpiece influenced by the first compensating value Ui is completed, that is, ends at a time when or shortly before or after the measurement in question is completed. In the specific example of FIG. 50, the intermediate period ends at the moment when the measurement in question is completed. During this intermediate period, the values X of the workpieces involved are measured by the measuring device 116, and stored and counted. Each time the workpiece is measured, a value X of that workpiece which would be measured if the workpiece were ground under the influence of the first compensating value Ui is estimated on the basis of the first compensating value Ui and the actually measured value X. Each estimated value X obtained during the intermediate period is stored as if it were a measured value X obtained without a measurement delay. The next compensating value Ui+1 is determined based on a predetermined number of the estimated values X obtained during the intermediate period. In one form of estimation of the values X during the intermediate period, the first compensating value Ui is added to each actually measured value X to obtain each estimated value X. In other words, the values X measured during the intermediate period for determining the next compensating value Ui+1 are changed by the amount equal to the first determined compensating value Ui.

Figure 51:
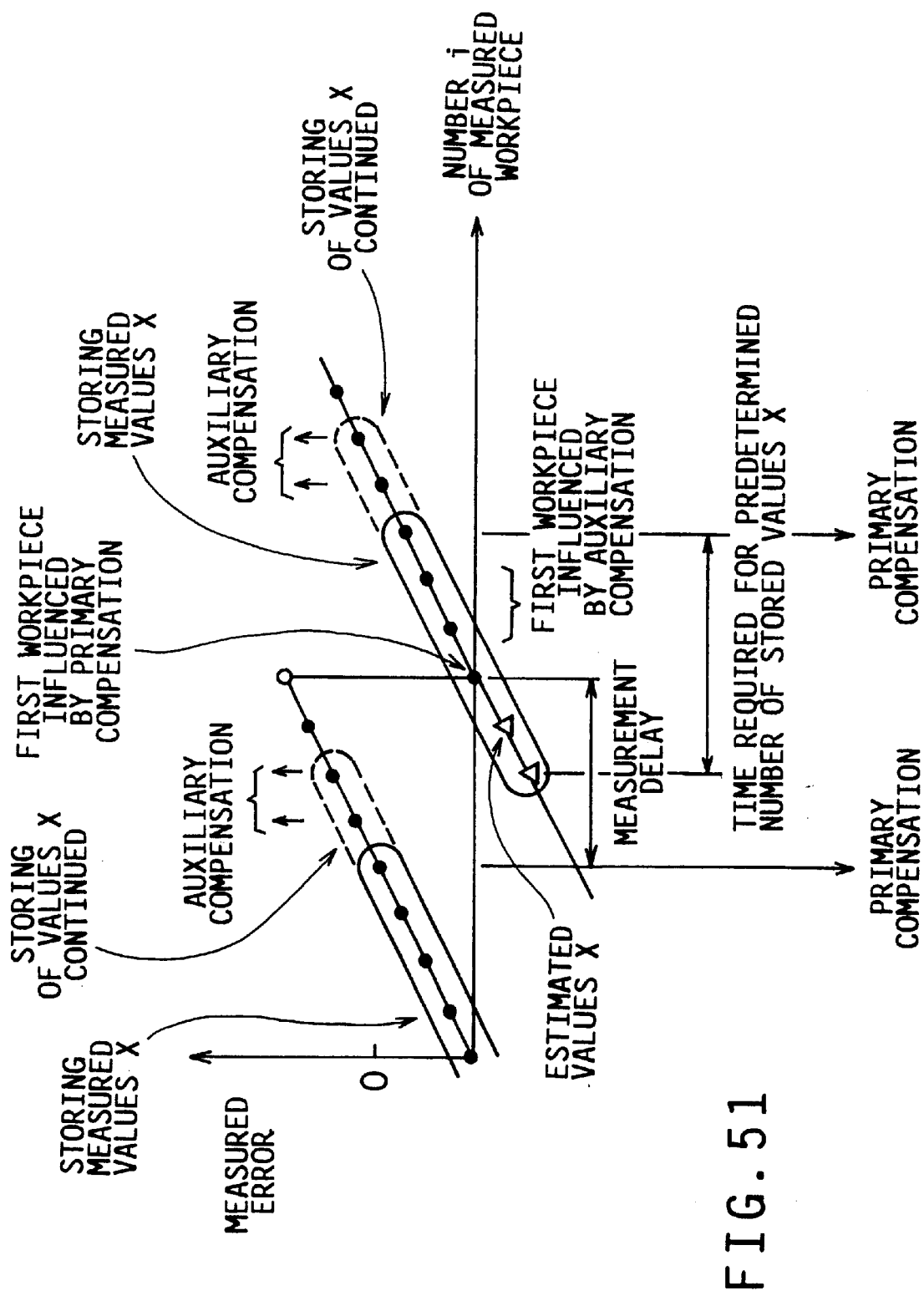
FIG. 51 is a graph schematically showing one form of the second method of FIG. 50.

In this second intermittent compensating mode, too, auxiliary compensation as described with respect to the first intermittent compensation mode is available following each primary compensation, as indicated in the graph of FIG. 51. The number of the auxiliary compensation cycles may be suitably limited. Further, the tolerable range may or may not be used for the primary and auxiliary compensation cycles.

The first and second intermittent compensating modes are selectively established. Namely, the second mode is selected when an X-SHIFT command entered by the operator is present. When this X-SHIFT command is not present, the first mode is selected.

In connection with the technique of estimating the measured values X in the second intermittent compensating mode, it is noted that most of the values X measured during the intermittent period following the determination of the last compensating value Ui in the second intermittent compensating mode are influenced by the preceding compensating value Ui−1, but not influenced by the last compensating value Ui. The estimated values X are obtained on the measured values X and the present compensating value Ui, as if these estimated values X were influenced by the last compensating value Ui. However, this technique may be applied to the standard compensation in which compensating values U are continuously determined, namely, a compensating value U is obtained when the value X of each workpiece is measured.

When there are any pre-measured workpieces between the machine 110 and the measuring device 116, the standard compensation and the intermittent compensation are similar in that the workpieces influenced by the last determined compensating value Ui cannot be actually measured immediately following the determination of the last compensating value Ui. To obtain the next compensating value Ui+1 which reflects an influence of the last compensating value Ui, therefore, some statistical technique based on experiments or simulation tests may be utilized. The estimation technique described above may be used in place of or in addition to this statistical technique.

There will next be described a relationship between the automatic adjustment or compensation of the reference values of the automatic sizing device 114 by the control device 120, and the manual adjustment or compensation through the keyboard 150 by the operator.

The control device 120 controls the automatic sizing device 114 such that the manual adjustment of the sizing device 114 is predominant over the automatic adjustment. Further, the control device 120 is adapted to assure high accuracy of the automatic adjustment which immediately follows the manual adjustment. Described more specifically, the control device 120 monitors whether the manual adjustment of the references values (for the two end journals 128) of the sizing device 114 is effected by an MANUAL COMPENSATION command. If this command is not present, the automatic adjustment is implemented as described above by reference to the flow chart of FIG. 36. If the command is present, the automatic adjustment is interrupted, and the values X of the workpieces are measured and stored in the calculation data memory to resume the automatic adjustment, starting after (e.g., immediately after) the first workpiece influenced by the manual adjustment of the sizing device 114 has been measured. On the basis of the thus measured values X, the compensating value U is determined by the control device 120. In other words, the automatic adjustment is resumed on the basis of the values X of the workpieces influenced by the manual adjustment. This arrangement is desirable when the grinding system is adapted to have some pre-measured workpieces between the machine 110 and the measuring device 116. If the automatic adjustment by the control device 120 were effected partially or totally based on the measured values X of the workpieces not influenced by the manual adjustment, the accuracy of the compensating value U determined in the automatic adjustment shortly after the manual adjustment may be low.

In the present embodiment, the control device 120 checks to see if the MANUAL COMPENSATION command is present or not, when the automatic compensation routine of FIG. 36 is initiated and just before each compensating value Ui is applied to the automatic sizing device 114. The above checking upon initiation of the automatic compensation routine is necessary to check if manual adjustment of the sizing device 114 has been made (MANUAL COMPENSATION command was entered) before the routine is started.

Referring to the flow charts of FIGS. 30–35, there will be discussed in detail the compensating routine having the features which have been explained by reference to FIG. 36.

Figure 30A:
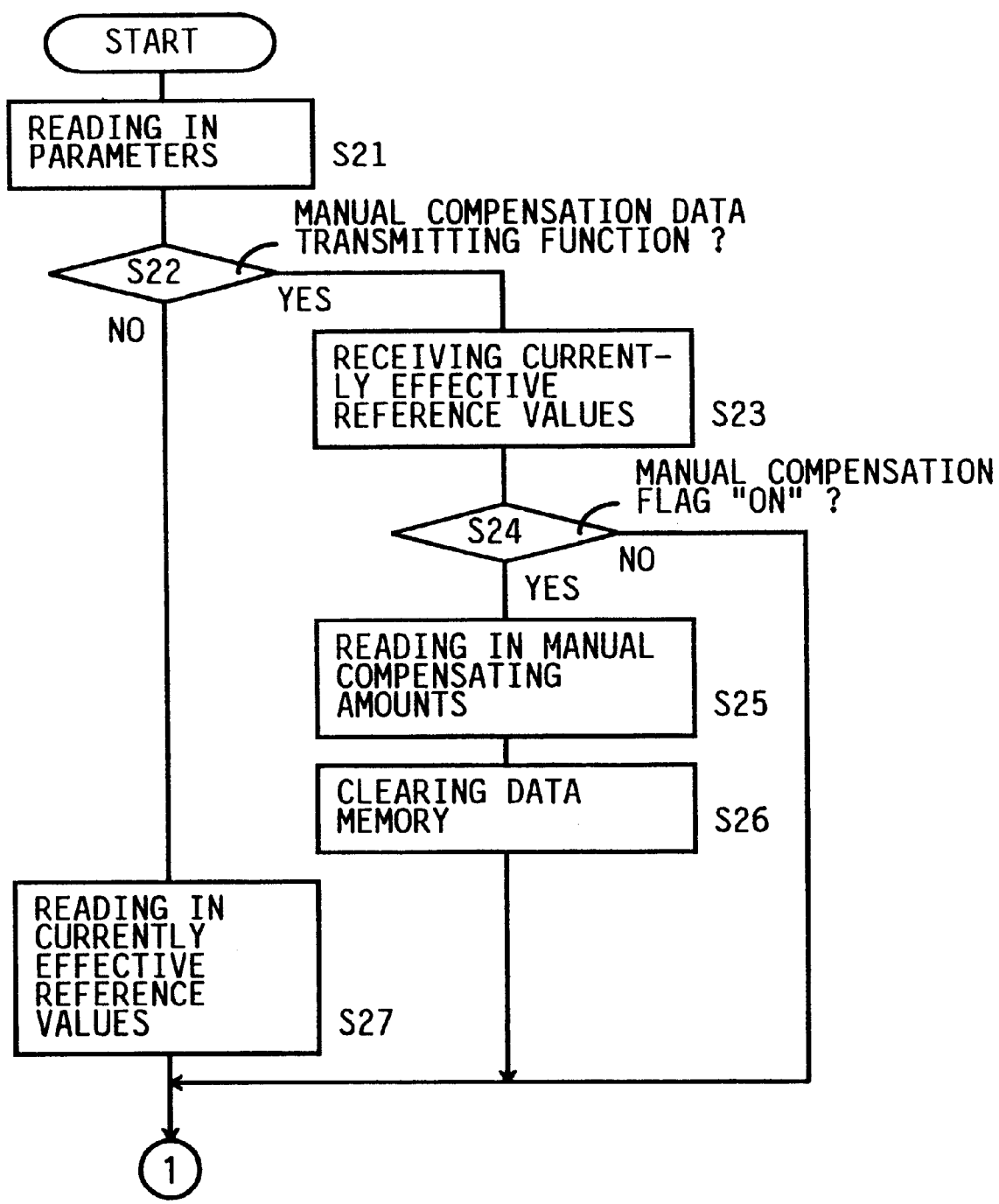
FIGS. 30A and 30B are flow charts illustrating a portion of compensating routine executed by a computer of a control device used for the grinding system of FIG. 27, for adjusting grinding condition.

Initially, step S21 of FIG. 30A is implemented to read in from the auxiliary memory 122 various manually entered parameters in the form of numerical values and control commands necessary to execute the compensating routine. The numerical values include initial values of the weighting coefficients b for obtaining the moving average P; a value representative of the maximum number Z of the measured values X usable as the moving average values P to obtain one first derivative value T in the "substitution averaging method"; and a value representative of the maximum number S of repetition (which will be described with respect to step S114) of the auxiliary compensation cycles following the primary compensation. The commands also represented by the manually entered parameters include the SPECIAL AVERAGING command, X-SHIFT command, GRADUAL COMPENSATION command, SPECIAL DIFFERENTIATION command, AUXILIARY COMPENSATION command, and other commands entered by the operator.

Step S21 is followed by S22 to determine whether the automatic sizing device 114 has the function of transmitting from its RAM to the control device 120 currently effective manual compensating values entered through the keyboard 150, and the reference values of the sizing device 114 as adjusted by these manual compensating values. As explained above, the reference values indicates the in-feed amounts of the grinding wheels 130 with respect to the two end journals 128. If the grinding system in question does not have this function, the manual compensating values and the related reference values are stored only in the RAM of the device 114, and the device 114 is not capable of positively transmitting these data to the control device 120.

For illustrative purpose, it is assumed that the sizing device 114 in this present embodiment has the above function. Therefore, an affirmative decision (YES indicated as "Y" in FIG. 30A, the same symbol "Y" being also used for the other decision steps) is obtained in step S22, and the control flow goes to step S23 in which the control device 120 is enabled to receive from the sizing device 114 data or signals indicative of the currently effective manually adjusted reference values for the two end journals 128. The received data are stored in the RAM of the control device 120, and also in the auxiliary memory 122.

Step S23 is followed by step S24 to determine whether any manual compensating values have been entered or not. This determination is effected based on the state of a MANUAL COMPENSATION flag provided in the RAM of the sizing device 114. If a negative decision (NO indicated as "N" in FIG. 30A, the same symbol being also used for the other steps) is obtained in step S24, the control flow goes directly to step S28 of FIG. 30B which will be described. If an affirmative decision (YES) is obtained in step S24, step S25 is implemented to receive currently effective manual compensating values (for the two end journals 128) transmitted from the sizing device 114. The received data are stored in the RAM of the control device 120 and the auxiliary memory 122. Step S25 is followed by step S26 to clear the calculation data memory of the control device 120. Then, the control flow goes to step S28.

If the sizing device 114 were not provided with the function of transmitting the manual compensating data to the control device 120, a negative decision (NO) is obtained in step S22, and step S27 is implemented whereby the control device 120 is enabled to positively read in from the RAM of the sizing device 114 the currently effective reference values. These reference values are stored in the RAM of the control device 120 and in the auxiliary memory 122.

There will be described the purposes of the control device 120 of storing the currently effective manual compensating values and the corresponding reference values currently set in the automatic sizing device 114.

The purpose of the control device 120 to store the currently effective reference values will be first described.

As explained above, the control device 120 is adapted to automatically determine the compensating values U by which the currently effective reference values of the sizing device 114 are adjusted or changed. On the other hand, the sizing device 114 adjusts the reference values according to the compensating values U received from the control device 120. However, the sizing device 114 has a permissible range of the reference values. That is, the sizing device 114 cannot operate to control the grinding machine 110 and is adapted to be stopped, if the reference values are outside the permissible range. Therefore, the control device 120 is adapted to inhibit the application or transmission of the automatic compensating values U to the sizing device 114, if the reference values as adjusted by the compensating values U do not fall within the permissible range. To this end, the control device 120 should know the currently effective reference values of the sizing device 114 as determined by the manually entered compensating values. The operation to inhibit the transmission of the automatic compensating values U is performed by a suitable routine, which is not shown as the understanding of this routine is not essential to understand the principle of the present invention.

Then, the purpose of the control device 120 to store the manually entered compensating values will be described.

As described above, when the X-SHIFT command is entered by the operator, the values X which would reflect the reference value as adjusted by the last compensating value Ui are estimated on the basis of the values X of the workpieces which are measured by the measuring device 116 after the application of the last compensating value Ui but which have not been influenced by the last compensating value Ui. As also described above, the estimated values X are obtained by adding the last automatic compensating value Ui to the actually measured values X. When a manual compensating value is entered by the operator, however, the estimated values X are obtained by adding the manual compensating value to the actually measured values X, so that the estimated values X reflect the manual compensating value. For this purpose, the control device 120 should have the data representative of the currently effective manual compensating value.

Irrespective of whether or not the sizing device 114 has the function of positively transmitting the manual compensation data to the control device 120, step S28 is implemented to determine whether there are any values X measured by the device 116 which have not been received yet by the control device 120. In this respect, it is noted that each workpiece (crankshaft 126) has the seven journals 128 whose diameter values X are measured by the measuring device 116. If no such measured values X are present, a negative decision (NO) is obtained in step S28, and step S29 is implemented.

Step S29 is identical with step S22 described above. If an affirmative decision (YES) is obtained in step S29, the control flow goes to step S30 identical with step S24 described above, to determine whether manual compensating values have been entered or not. If no manual compensating values have been entered, a negative decision (NO) is obtained in step S30, and step S31 is implemented to determine whether any parameters have been entered by the operator. If a negative decision (NO) is obtained in step S31, the control flow returns to step S28. If an affirmative decision (YES) is obtained in step S31, step S32 is implemented to read in the entered parameter or parameters, and step S33 is implemented to replace the already stored parameters with the newly entered parameter or parameters. Step S34 is then implemented to clear the calculation data memory, and the control flow returns to step S28.

If an affirmative decision (YES) is obtained in step S30, the control flow goes to step S35 identical with step S25, to receive and store the entered manual compensating values. Step S35 is followed by step S36 to turn on a WORKPIECE WAIT flag, and step S37 to clear the calculation data memory. Then, the control flow returns to step S28.

If the sizing device 114 does not have the function of transmitting the manual compensation data to the control device 120, a negative decision (NO) is obtained in step S29, and step S38 is implemented to read in and store the currently effective reference values of the sizing device 114. Step S38 is followed by step S39 to read in the reference values stored in the auxiliary memory 122. Then, step S40 is implemented to determine whether the currently effective reference values are different from the reference values stored in the auxiliary memory 122, namely, whether the reference values of the sizing device 114 have been changed or not. Thus, a change in the currently effective reference values of the device 114 can be detected by the control device 120, even if the device 114 is not capable of transmitting the manual compensation data to the control device 120. If the currently effective reference values of the device 114 are the same as the reference values stored in the memory 122, a negative decision (NO) is obtained in step S40, and the control flow goes directly to step S31. If the currently effective reference values have been changed, an affirmative decision (YES) is obtained in step S40, and step S41 is implemented to turn on the WORKPIECE WAIT flag. Step S41 is followed by step S42 to clear the calculation data memory. Then, the control flow goes to step S31.

If any measured value X has not been sent from the measuring device 116 to the control device 120, an affirmative decision (YES) is obtained in step S28, and step S43 is implemented to read in the measured values X and store them in the RAM of the control device 120. The measured values X are also stored in the auxiliary memory 122. Eventually, the seven diameter values X of the workpiece are stored. Subsequently, the control flow goes to step S44 of FIG. 31A.

In step S44, the control device 120 determines whether the X-SHIFT command to select the second intermittent compensation mode of FIG. 50 has been entered by the operator. This determination can be made depending upon the parameters entered by the operator.

If the X-SHIFT command is not present, a negative decision (NO) is obtained in step S44, and step S45 is implemented to determine whether the WORKPIECE WAIT flag is set at "ON".

If the WORKPIECE WAIT flag is "ON", this means that the first workpiece influenced by the currently effective manual or automatic compensating values is waiting for the measurement of the values X by the measuring device 116. If this flag is "OFF", this means that the first workpiece indicated above has been measured by the measuring device 116. This flag is provided in the RAM of the control device 120, and is set to "ON" when the control device 120 is initially turned on with power applied. According to a suitable routine (not shown), the flag is turned "OFF" each time the first workpiece influenced by the currently effective compensating value has been measured. The flag is turned "ON" each time the manual compensation or the intermittent adjustment of the automatic compensating values U is made according to the present compensating routine. If the WORKPIECE WAIT flag is "OFF", a negative decision (NO) is obtained in step S45, whereby the control flow goes to step S46.

In step S46, the control device 120 reads out the stored measured values X from the calculation data memory. Step S46 is followed by step S47 in FIG. 31B to determine whether the calculation of the moving average P is possible or not, namely, whether the number of the measured values X (for each end journal 128) is equal to "KK" or larger. Please refer to FIG. 45. If the number of the measured values X is smaller than "K", a negative decision (NO) is obtained in step S47, and step S48 is implemented to determine whether the SPECIAL AVERAGING command for the moving average P is present or not. If the command is not present, the control returns to step S28. In this case, the automatic compensating value U is determined to be "0".

If an affirmative decision (YES) is obtained in step S48 with the SPECIAL AVERAGING command being present, step S49 is performed to determine whether the SUB-AVERAGING command for the moving average P is present or not. If not, a negative decision (NO) is obtained in step S49, and the control flow goes to step S50. While the SPECIAL AVERAGING command is present, either the SUB-AVERAGING command for the sub-averaging calculation of the moving average P or the SUBSTITUTION AVERAGING command for the substitution averaging calculation of the moving average P should be present. Therefore, if the SUB-AVERAGING command is not present, this means that the SUBSTITUTION AVERAGING command is present.

In step S50, the control device 120 determines whether the substitution averaging is possible or not, namely, whether the number of the measured values X stored in the calculation data memory is smaller than the difference (K−Z), where K represents the number of the measured values X used to calculate the moving average P according to the standard or normal averaging method, while Z represents the maximum number of the measured values X that can be used as the moving average P to obtain the first derivative T, as indicated in FIG. 40. If the number of the stored measured values X is smaller than (K−Z), the substitution averaging to use the measured value x as the moving average P is not possible, or is inhibited. If not, the substitution averaging is possible or permitted. In the former case, the control flow returns to step S28. An affirmative decision (YES) is eventually obtained in step S50 as the present routine is repeatedly executed (as the number of the stored measured values X increases), whereby step S51 is implemented to determine the last measured value X as the moving average P. Step S51 is followed by step S52 to store the value X as the moving average P in the calculation data memory and the auxiliary memory 122. Then, the control goes to step S57

If the SUB-AVERAGING command is present, an affirmative decision (YES) is obtained in step S49, step S53 is implemented to calculate the moving average P according to the sub-averaging method. Step S53 is followed by step S54 to store the calculated moving average P in the calculation data memory and the auxiliary memory 122. Step S54 is also followed by step S57.

When the number of the measured values X stored in the calculation data memory has reached the predetermined value "K" as the present routine is repeated, an affirmative decision (YES) is obtained in step S47, and step S55 is implemented to calculate the moving average P for each of the two end journals 128 according to the standard method.

The operation to calculate the moving average P in step S55 of FIG. 31B will be described in detail, by reference to the flow chart of FIG. 52.

Initially, step S201 is implemented to read in the weighting coefficients b from the RAM. Step S201 is followed by step S202 to calculate a moving average P for each end journal 128 on the basis of the measured values X stored in the calculation data memory and the weighting coefficients b, according to the above equation (2).

Then, the control flow goes to step S203 to calculate differences between the stored measured values X (used for calculating the moving average P) and the calculated moving average P, and calculate a sum of these differences, for determining the sum as the vibration level of the measured values X. In this step S203, the vibration level is stored in the RAM, in relation to the associated weighting coefficients b and moving average P. Step S203 is followed by step S204 to determine whether the determined vibration level is higher than a threshold value A or not. If not, a negative decision (NO) is obtained in step S204, and step S205 is implemented to determine the moving average P (calculated in step S202) as an effective moving average P. Step S205 is followed by step S206 to store the weighting coefficients b in the RAM, so that these coefficients b are used for the calculation of the next moving average P. The routine of FIG. 52 is ended with step S206.

If the vibration level determined in step S203 is higher than the threshold value A, an affirmative decision (YES) is obtained in step S204, and the control flow goes to step S207 to change the increase rate or gradient of the weighting coefficients b according to a suitable rule. Then, step S208 is implemented to determine whether the increase rate has been changed throughout the range defined by the highest and lowest rates as indicated in the graph of FIG. 38. If not, the control flow returns to step S202.

In steps S202 and S203, the moving average P and the vibration level are calculated using the weighting coefficients b determined in step S207 according to the changed increase rate or gradient. Steps S202–S208 are repeatedly implemented until a negative decision (NO) is obtained in step S204, namely, until the vibration level is lowered to the threshold value A, as a result of change in the increase rate of the weighting coefficients b. Further, as long as the vibration level is higher than the threshold value A, steps S202–S208 are repeated until the increase rate of the weighting coefficients b has been changed throughout the range between the highest and lowest values, that is, until an affirmative decision (YES) is obtained in step S208.

If the affirmative decision (YES) is obtained in step S208, step S209 is implemented to search for the lowest one of the vibration levels stored in the RAM in step S203 (during repeated implementation of steps S202–S208). The moving average P corresponding to the lowest vibration level is determined as the effective moving average P. In the following step S206, the weighting coefficients b corresponding to the effective moving average P (lowest vibration level) are stored in the RAM so that these coefficients b are used for calculating the next moving average P.

Figure 52:
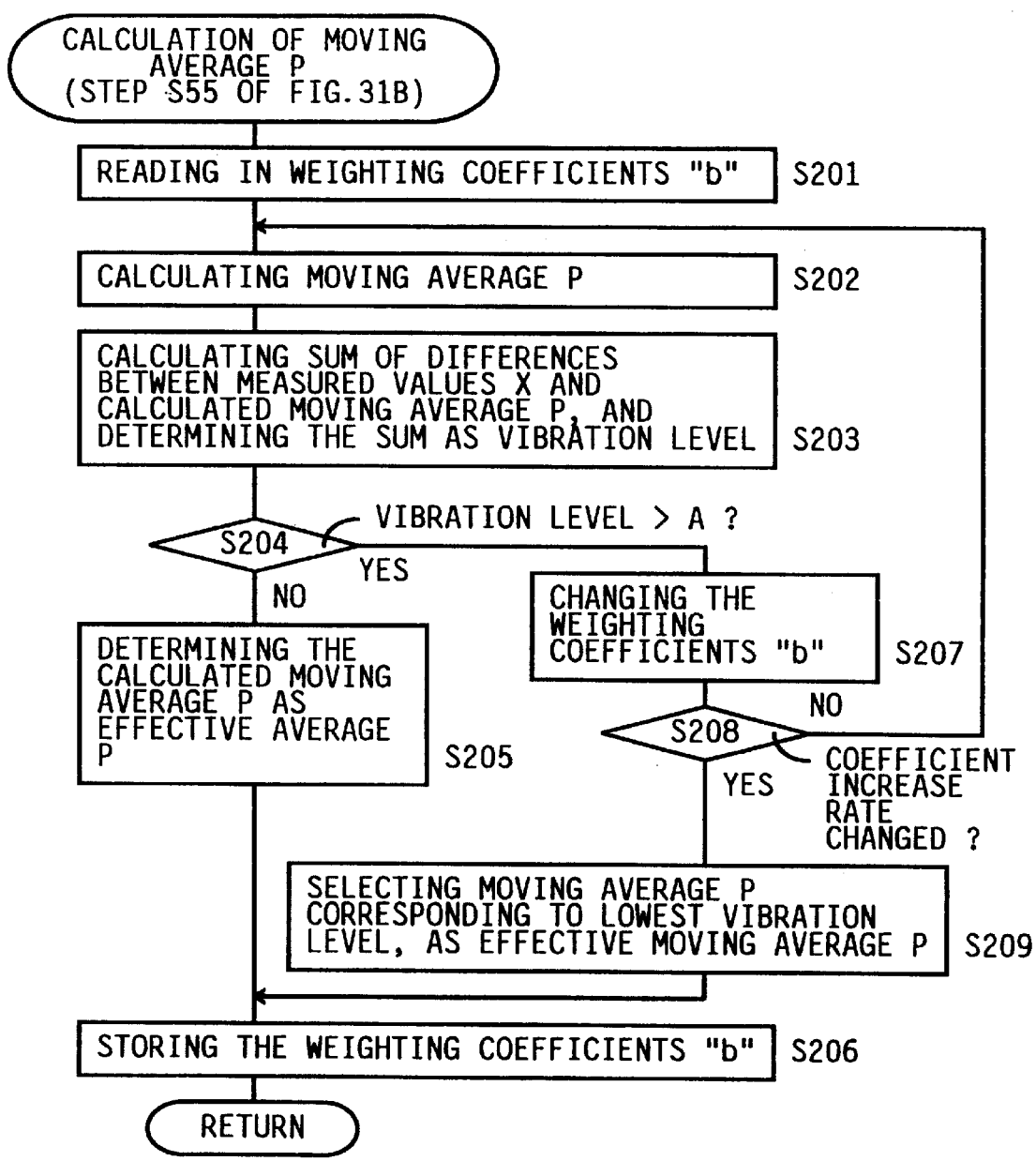
FIG. 52 is a flow chart illustrating the details of step S55 of FIG. 31.

The moving average P calculated in step S55 of FIG. 31B which has been described by reference to FIG. 52 is stored in the following step S56, in the calculation data memory of the control device 120 and in the auxiliary memory 122. Step S56 is followed by step S57.

Step S57 is provided to determine whether or not the MOVING AVERAGE ADJUSTMENT command is present for adjusting the calculated moving average P. If this command is not present, the control flow goes to step S59 of FIG. 32A. If the command is present, step S58 is implemented to adjust the moving average P for each of the two end journals 128 of the workpiece as described above with respect to the third step of FIG. 36. The thus adjusted moving average P is stored in the calculation data memory, and the control goes to step S59 of FIG. 32A.

Step S59 is provided to calculate the error value R which is equal to the moving average P minus the nominal diameter Ao of the journal 128. Step S59 is followed by step S60 in which the calculated error value R is stored in the calculation data memory and in the auxiliary memory 122.

Step S60 is followed by step S61 to determine whether the calculation of the first derivative T is possible or not, namely, whether the number of the moving average values P stored in the calculation data memory is equal to "L" or larger. If the number of the stored moving average values P is smaller than "L", a negative decision (NO) is obtained in step S61, and the control flow goes to step S62 to determine whether the SPECIAL DIFFERENTIATION command is present or not. If this command is absent, the control flow returns to step S28, and one cycle of the present routine is terminated. If the command is present, step S63 is implemented to determine whether the calculation of the first derivative T according to the special differentiation method is possible or not, namely, whether two or more moving average values are stored in the calculation data memory or not. If a negative decision (NO) is obtained in step S63, the control flow returns to step S28. If an affirmative decision (YES) is obtained in step S63, step S64 is implemented to calculate the first derivative T according to the special differentiation method. Step S64 is followed by step S65 to store the calculated first derivative T in the calculation data memory of the control device 120 and in the auxiliary memory 122. Then, the control flow goes to step S68 of FIG. 32B.

When the number of the stored moving average values P has increased to "L" as a result of repeated execution of the present routine, an affirmative decision (YES) is obtained in step S61, and step S66 is implemented to calculate the first derivative T according to the standard method, using the predetermined number L of the moving average values P. Then, step S67 is implemented to store the calculated first derivative in the calculation data memory and auxiliary memory 122. Step S67 is followed by step S68.

Step S68 is provided to determine whether the SECOND DERIVATIVE USE command which requires the use of the second derivative D to calculate the compensating value U is present or not. If this command is present, an affirmative decision (YES) is obtained in step S68, and step S69 is effected to determine whether the calculation of the second derivative D is possible or not, namely, whether the number of the first derivative values T stored in the calculation data memory is equal to "Q" or larger. If the number of the stored first derivative values T is smaller than "Q", a negative decision (NO) is obtained in step S69, and the control flow returns to step S28, whereby one cycle of the present routine is terminated. When the number of the stored first derivative values T has increased to the predetermined value "Q" as a result of repeated execution of the present routine, an affirmative decision (YES) is obtained in step S69, and the control flow goes to step S70 to calculate the second derivative D, and S71 to store the calculated second derivative D in the calculation data memory and auxiliary memory 122. The control then goes to step S75.

If the SECOND DERIVATIVE USE command is not present, a negative decision (NO) is obtained in step S68, and the control flow goes to step S72 to determine whether there is present the DEAD TIME COMPENSATION command which requires the compensating value U to be determined depending upon the dead time value MS which corresponds to the number Y of the pre-measured workpieces existing between the machine 110 and the post-process measuring device 116. If this command is absent, a negative decision (NO) is obtained in step S72, and the control goes directly to step S75. If the command is present, step S73 is implemented to read in the dead time value MS from the workpiece counter 118. Then, step S74 is implemented to store the dead time value MS in the calculation data memory and auxiliary memory 122.

Figure 32A:
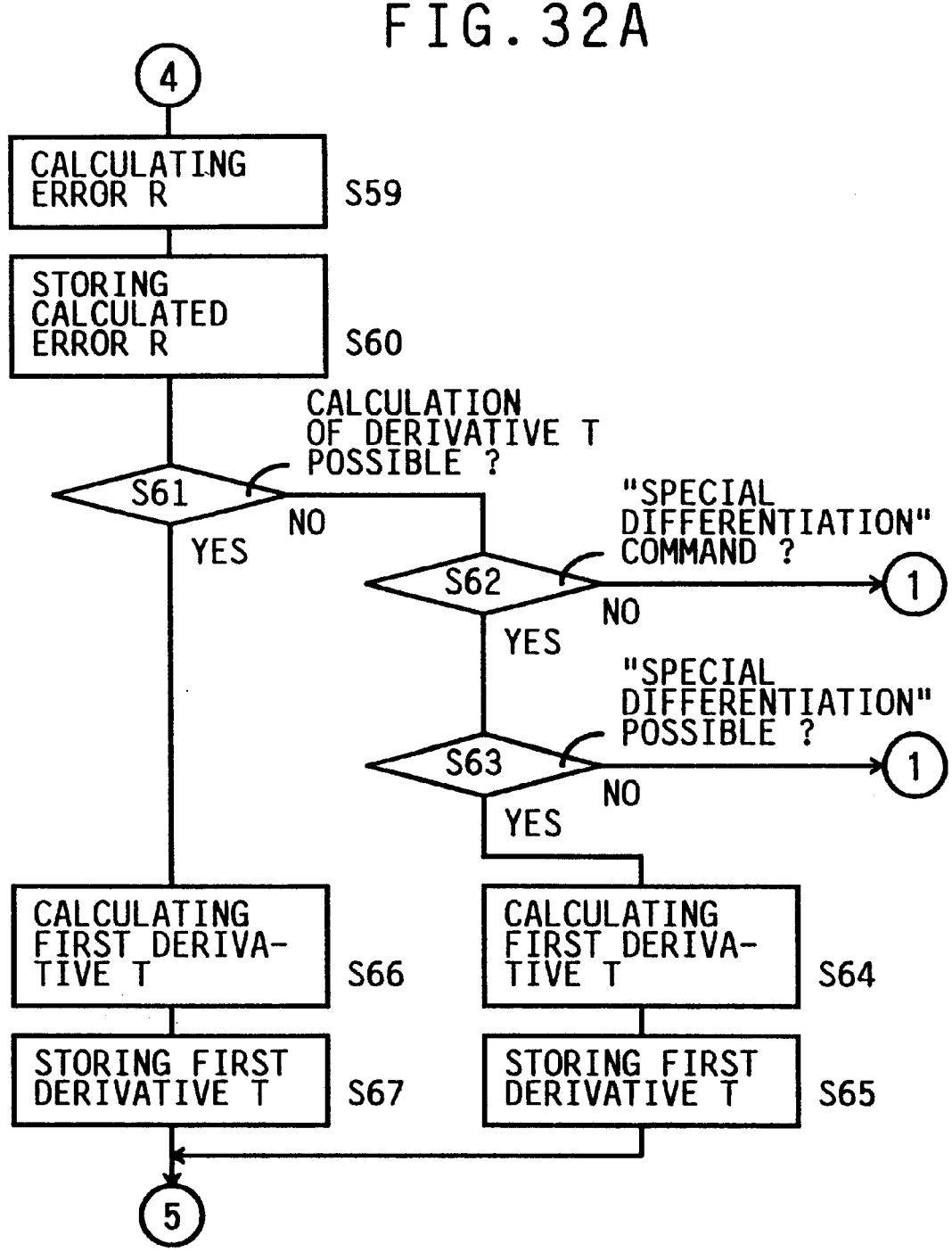
FIGS. 32A, 32B, 33, 34A, 34B, 34C, 35A and 35B are flow charts illustrating other portions of the compensating routine.
Figure 32B:
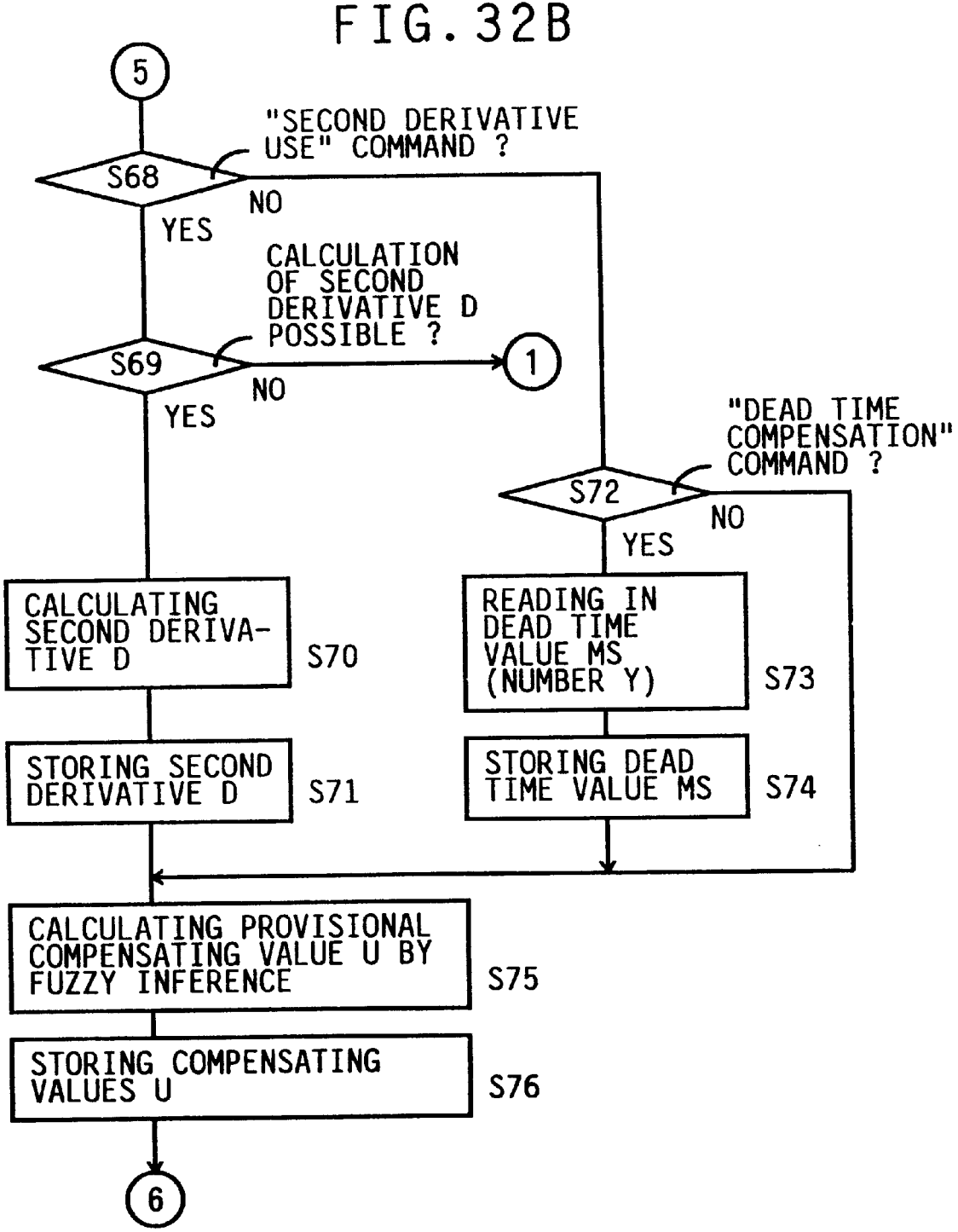
Figure 33:
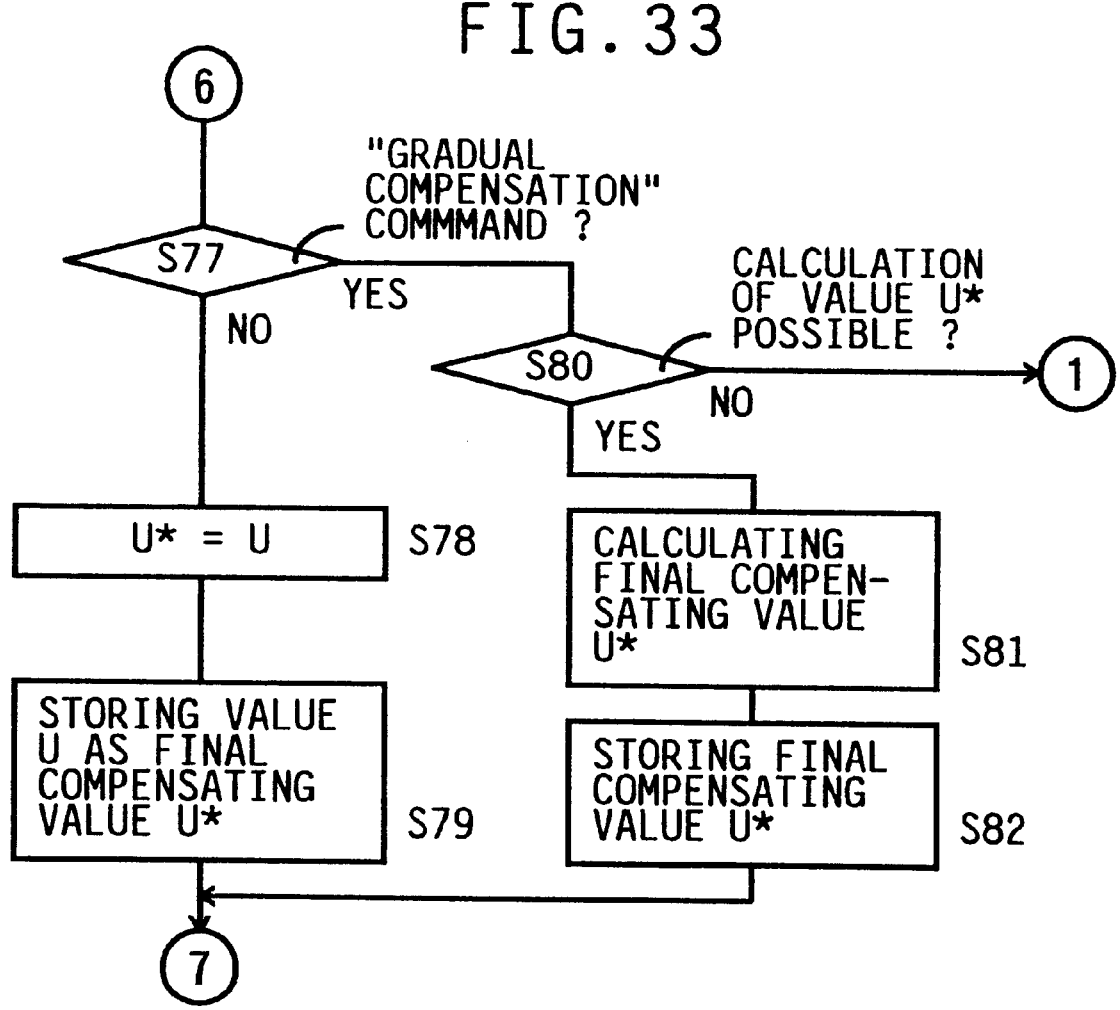
Figure 53:
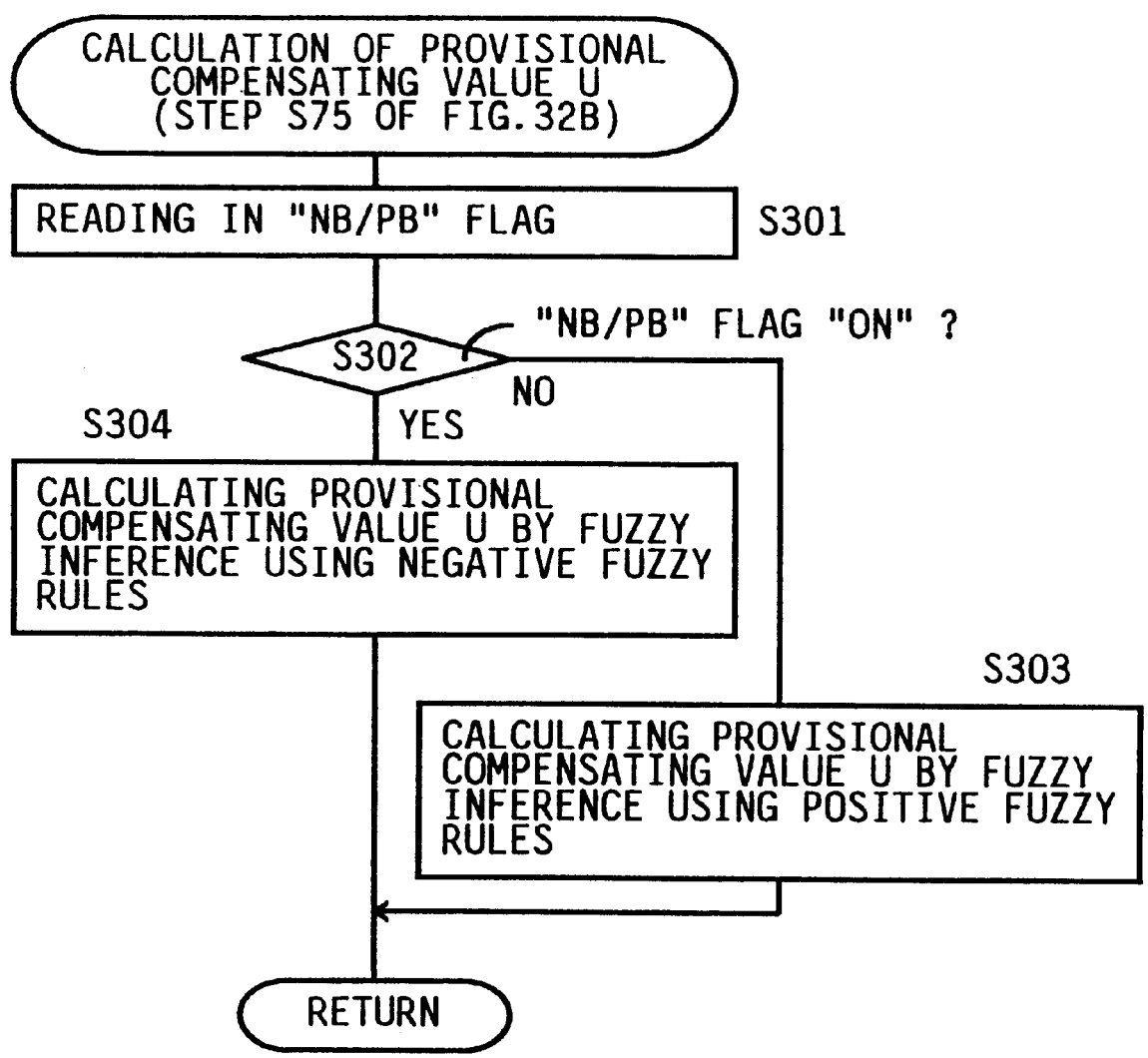
FIG. 53 is a flow chart illustrating the details of step S75 of FIG. 32.

Referring to the flow chart of FIG. 53, the fuzzy inference operation to calculate the provisional compensating value U in step S75 of FIG. 32B will be described in detail.

Initially, step S301 is implemented to read in an NB/PB flag from the RAM of the control device 120. When this NB/PB flag is set at "OFF", it indicates that the vibration level of the measured values X is sufficiently low. When the NB/PB flag is set at "ON", it indicates that the vibration level is higher than an upper limit. The NB/PB flag is reset to "OFF" when the control device 120 is turned on, and updated in steps S85 and S90 which will be described by reference to the flow chart of FIG. 54. Step S301 is followed by step S302 to determine whether the NB/PB flag is set at "ON" or not. If the flag is currently set at "OFF", a negative decision (NO) is obtained in step S302, and the control flow goes to step S303 to calculate the provisional compensating value U by fuzzy inference using the positive fuzzy rules as indicated in TABLE 9 by way of example. Thus, the operation in step S75 of FIG. 32B is terminated.

If the NB/PB flag is set at "ON", an affirmative decision (YES) is obtained in step S302, and step S304 is executed to calculate the provisional compensating value U by fuzzy inference using the negative fuzzy rules as indicated in TABLE 10 by way of example. Thus, the operation in step S75 is terminated.

In the present embodiment, the fuzzy rules used for the fuzzy inference are changed from the positive fuzzy rules to the negative fuzzy rules immediately after the NB/PB flag is changed from "OFF" to "ON", and from the negative fuzzy rules to the positive fuzzy rules immediately after the NB/PB flag is changed from "ON" to "OFF". However, it is possible to consider the hysteresis of the NB/PB flag, in determining the timing at which the positive and negative fuzzy rules are interchanged. For instance, the control device 120 is adapted to inhibit the use of the negative fuzzy rules even when the NB/PB flag has been changed from "OFF" to "ON", and allow the use of the negative fuzzy rules only after the number of cycles in which the NB/PB flag is set at "ON" has reached a predetermined value. This arrangement is effective to avoid unstable determination of the provisional compensating value U due to frequent interchange between the positive and negative fuzzy rules and consequent hunting of the measured values X.

Step S75 is followed by step S76 to store the calculated provisional compensating value U in the calculation data memory and auxiliary memory 122. Step S76 is followed by step S77 of FIG. 33.

Step S77 is provided to determine whether the GRADUAL COMPENSATION command which requires the calculated provisional compensating value U to be adjusted into the final compensating value U* is present or not. If this command is not present, a negative decision (NO) is obtained in step S77, and step S78 is implemented to determine the provisional compensating value U as the final compensating value U*. Then, step S79 is implemented to store the final compensating value U* in the auxiliary memory 122. If the GRADUAL COMPENSATION command is present, an affirmative decision (YES) is obtained in step S77, and step S80 is implemented to determine whether the calculation of the final compensating value U* is possible or not, namely, whether the number of the provisional compensating values U stored in the calculation data memory is equal to "M" or larger. If a negative decision (NO) is obtained in step S80, the control flow returns to step S28, and one cycle of the present routine is terminated. When the number of the stored provisional compensating values U has reached the predetermined value "M" as a result of repeated execution of the present routine, an affirmative decision (YES) is obtained in step S80, whereby step S81 is implemented to calculate the final compensating value U* on the basis of the predetermined number M of the stored provisional compensating value U. Step S81 is followed by step S82 to store the calculated final compensating value U* in the calculation data memory and auxiliary memory 122.

Figure 34A:
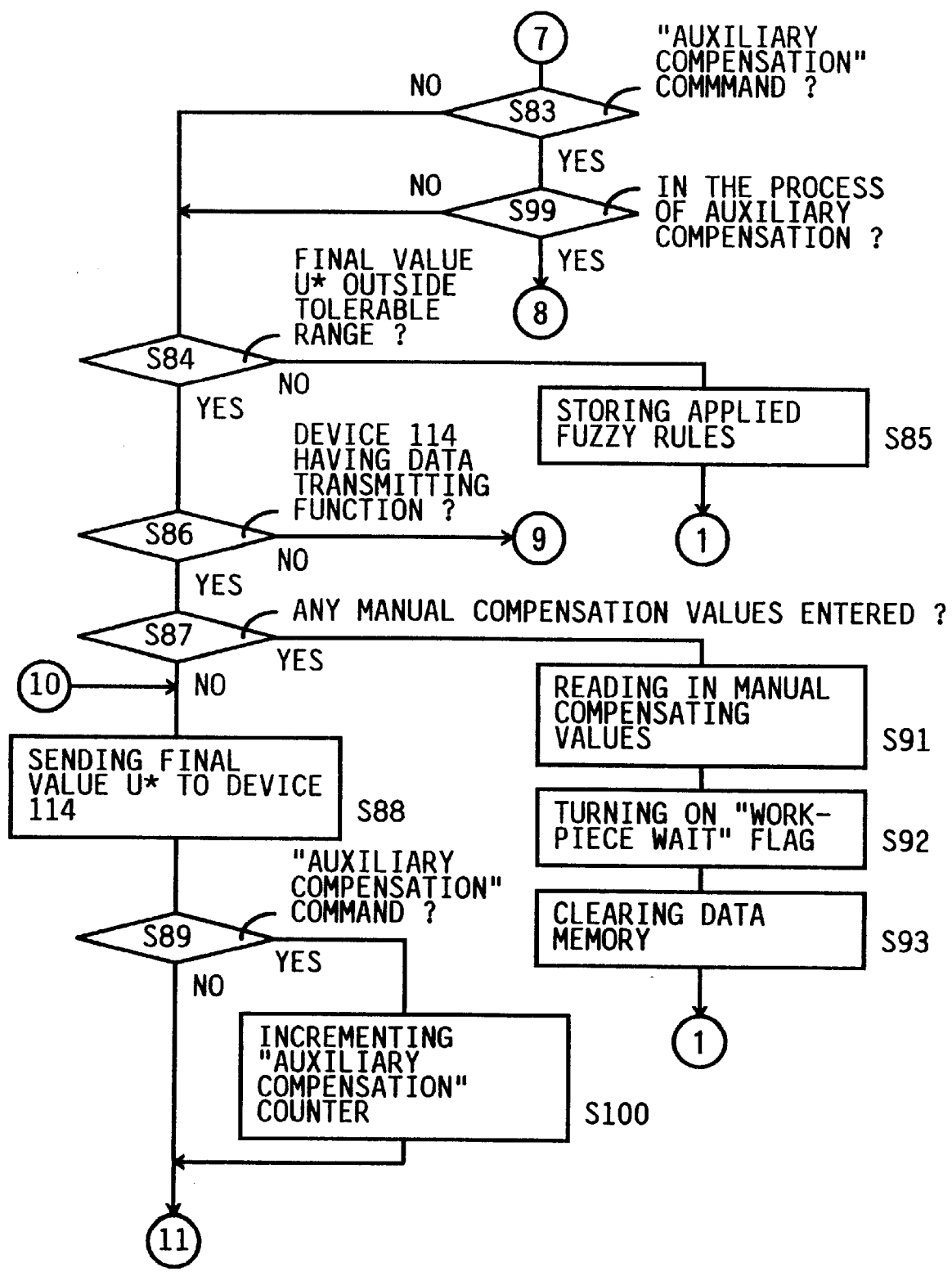

Steps S79 and S82 are followed by step S83 of FIG. 34A to determine whether there is present the AUXILIARY COMPENSATION command which requires the auxiliary compensation in addition to the primary compensation, as illustrated in FIG. 48 by way of example. If this command is absent, a negative decision (NO) is obtained in step S83, and the control flow goes to step S84 to determine whether the final compensating value U* stored in step S79 or S82 should be transmitted to the automatic sizing device 114 or not, namely, whether the final compensating value U* is outside the tolerable range or not. If the value U* falls within the tolerable range, a negative decision (NO) is obtained in step S84, and step S85 is implemented to store in the auxiliary memory 122 data representative of the fuzzy rule which was applied in step S75 of FIG. 32B to calculate the provisional compensating value U. Then, the control returns to step S28, and one cycle of the present routine is terminated.

If the final compensating value U* is outside the tolerance range, an affirmative decision (YES) is obtained in step S84, and step S86 is implemented to determine whether the automatic sizing device 114 has the function of transmitting the manual compensation data to the control device 120 or not. If the device 114 has the function, an affirmative decision (YES) is obtained in step S86, and the control flow goes to step S87 to determine whether any manual compensating value or values to adjust the reference value or values (for one or both of the two end journals 128) has/have been entered through the keyboard 150 or not. If no manual compensating value has been manually entered into the sizing device 114, a negative decision (NO) is obtained in step S87, and step S88 is implemented to transmit the final compensating value U* to the sizing device 114. The value U* remains stored in the auxiliary memory 122. Then, the control flow goes to step S89 to determine whether the AUXILIARY COMPENSATION command is present or not. Since the negative decision (NO) is obtained in step S83, the negative decision is also obtained in this step S89, whereby step S90 of FIG. 34C is implemented to store the applied fuzzy rule in the auxiliary memory 122, as in step S85.

Referring to the flow chart of FIG. 54, the operation to be performed in steps S85 of FIG. 34A and S90 of FIG. 34C will be described in detail.

Initially, step S401 is executed to read in the current count of the NB/PB counter which is adapted to count the number of application of the NB/PB fuzzy rules. Step S401 is followed by step S402 to determine whether the fuzzy rule applied in step S75 of FIG. 32B is any one of NB/PB fuzzy rules which are defined above with respect to the fifth step of FIG. 36. If the fuzzy rule applied in step S75 is not any NB/PB fuzzy rule, a negative decision (NO) is obtained in step S402, and the control goes to step S404, skipping step S403. If the fuzzy rule applied in step S75 is any one of the NB/PB fuzzy rules, an affirmative decision (YES) is obtained in step S402, and step S403 is implemented to increment the NB/PB counter. Step S403 is followed by step S404. This step S404 is provided to read in the count of the CYCLE counter adapted to count the number of cycles of the present routine of FIG. 54. Step S404 is followed by step S405 to increment the CYCLE counter. Then, the control flow goes to step S406 to determine whether the current count of the CYCLE counter is larger than a predetermined threshold value "B" or not. If not, a negative decision (NO) is obtained in step S406, and the control flow goes to step S407 to store the current counts of the NB/PB and CYCLE counters in the RAM of the control device, and then to step S408 to store the applied fuzzy rule in the auxiliary memory 122.

Figure 54:
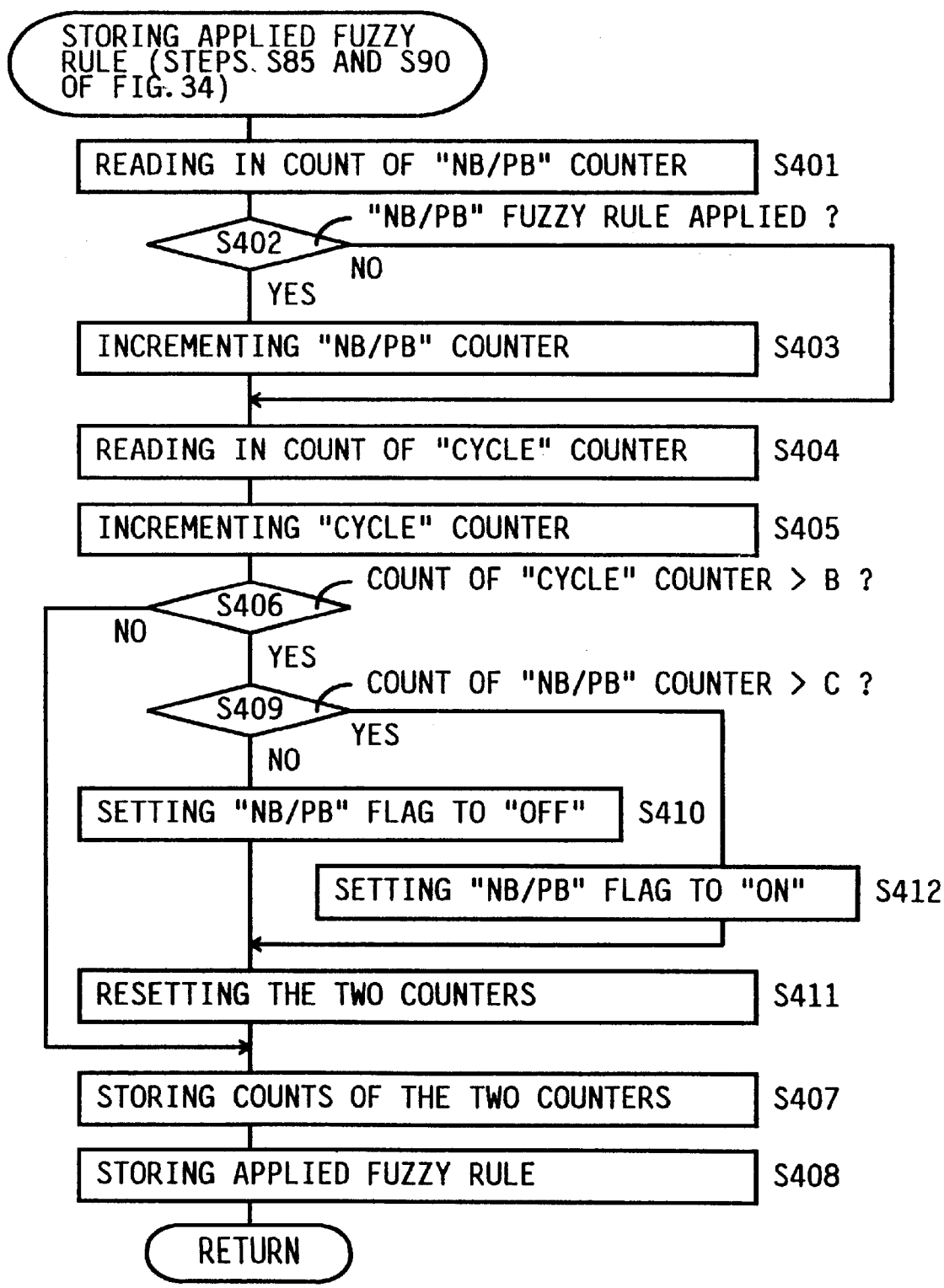
FIG. 54 is a flow chart illustrating the details of steps S85 and S90 of FIG. 34.

When the count of the CYCLE counter has increased to the predetermined threshold value "B" as a result of repeated execution of the routine of FIG. 54, an affirmative decision (YES) is obtained in step S406, and the control goes to step S409 to determine whether the current count of the NB/PB counter is larger than a predetermined threshold value "C" or not. If the count is not larger than "C", a negative decision (NO) is obtained in step S409, and step S410 is implemented to set the NB/PB flag to "OFF" (change the flag from "ON" to "OFF" or maintain the flag at "OFF"). Step S410 is followed by step S411 to reset the NB/PB and CYCLE counters to "0". Then, the control goes to steps S407 and S408. If the count of the NB/PB counter exceeds "C", an affirmative decision (YES) is obtained in step S409, and step S412 is implemented to set the NB/PB flag to "ON" (change the flag from "OFF" to "ON" or maintain the flag at "ON"). Step S412 is followed by steps S411 and the subsequent steps.

If any manual compensating values have been entered into the sizing device 114, an affirmative decision (YES) is obtained in step S87 of FIG. 34A, and the control flow goes to step S91 to receive the currently effective manual compensating values and the corresponding reference values from the sizing device 114, and store these data. Then, steps S92 and S93 are implemented to turn the WORKPIECE WAIT flag to "ON", and clear the calculation data memory. The control then returns to step S28.

Figure 34B:
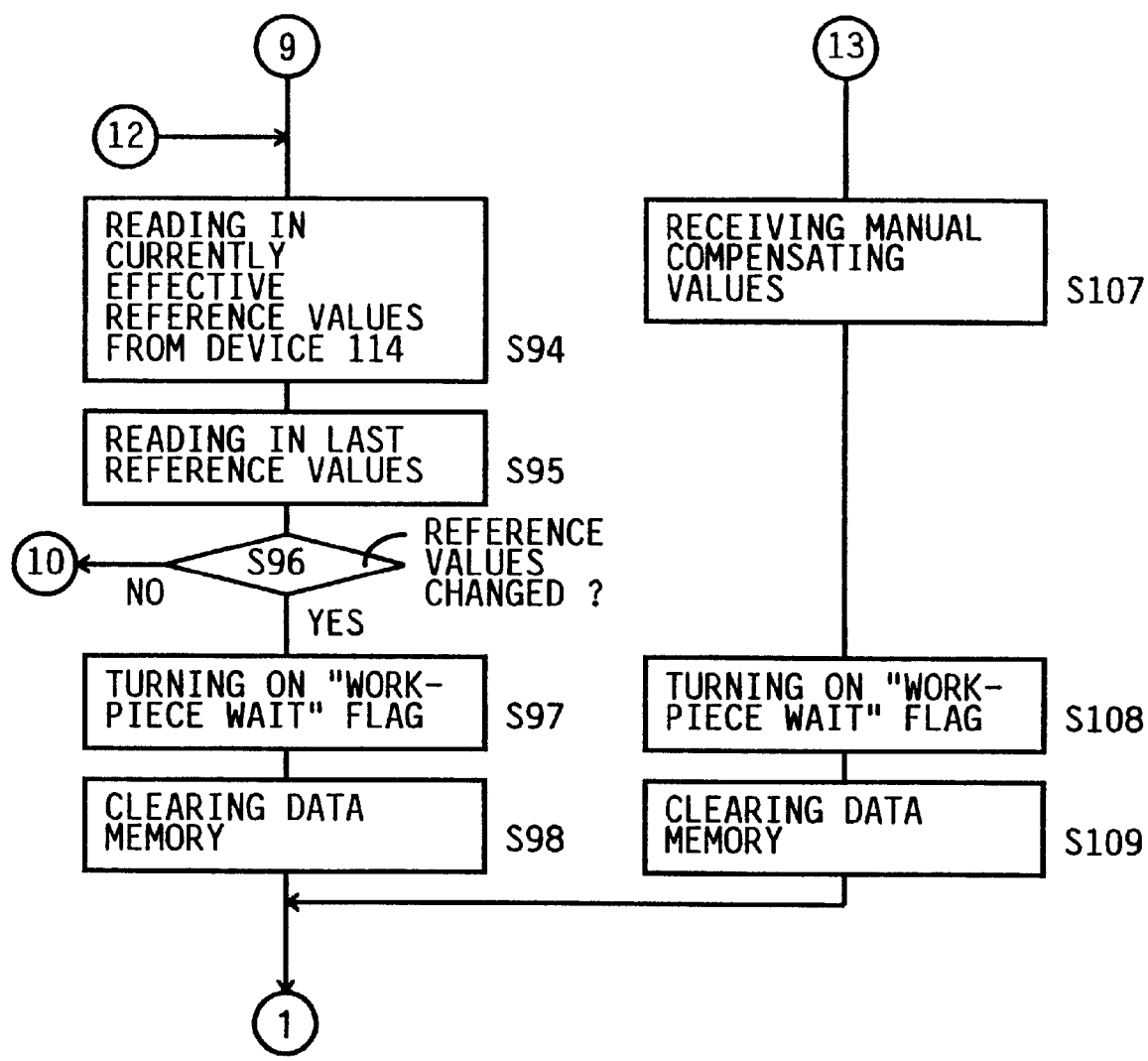
Figure 34C:
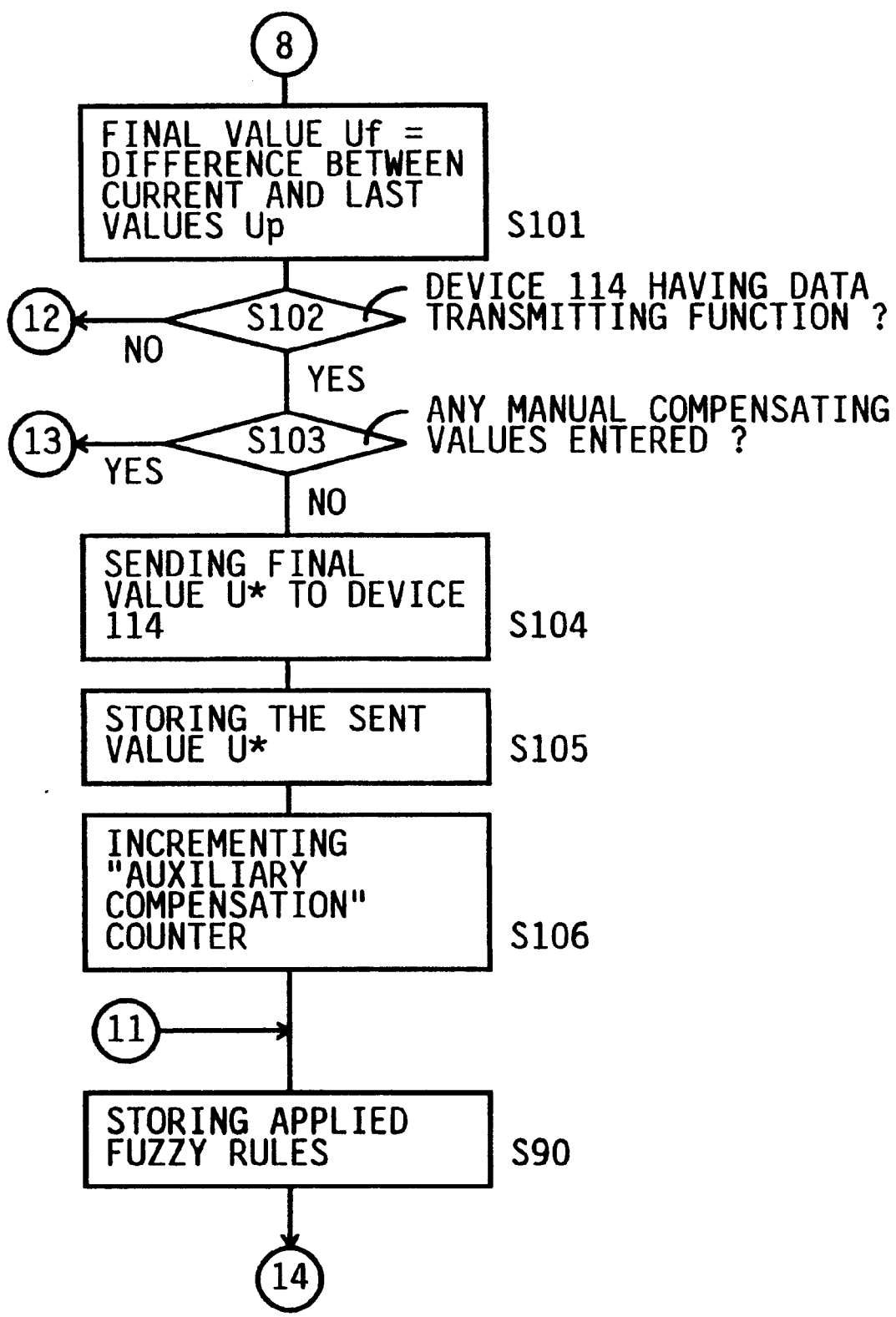

If the sizing device 114 has not the function of transmitting the manual compensation data to the control device 120, a negative decision (NO) is obtained in step S86, and step S94 of FIG. 34B is implemented to read in the currently effective reference values set in the sizing device 114, and store these reference values in the RAM of the control device 120 and in the auxiliary memory 122. Step S94 is followed by step S95 to read in from the RAM the last reference values. Then, step S96 is implemented to determine whether the effective reference values have been changed in the sizing device 114 which does not have the data transmitting function. If a negative decision (NO) is obtained in step S96, the step S88 described above is effected. If an affirmative decision (YES) is obtained in step S96, the control flow goes to step S97 to turn "ON" the WORKPIECE WAIT flag, and to step S98 to clear the calculation data memory. Then, the control returns to step S28.

If the AUXILIARY COMPENSATION command is present, an affirmative decision (YES) is obtained in step S83 of FIG. 34A, and step S99 is executed to determine whether the auxiliary compensation is in progress, namely, whether the current count of an AUXILIARY COMPENSATION counter to count the number of the auxiliary compensation cycles is equal to "1" or larger. If the count of this counter is currently "0", a negative decision (NO) is obtained in step S99, the control flow goes to step S84 and the following steps, which include step S88 to perform the primary compensation as described above, and step S89 determine whether the AUXILIARY COMPENSATION command is present. Since this command is present, the AUXILIARY COMPENSATION counter is incremented in step S100 following step S89.

If the count of the AUXILIARY COMPENSATION counter is "1" or more, an affirmative decision (YES) is obtained in step S99, the control flow goes to step S101 and the following steps of FIG. 34C to effect the auxiliary compensation. In step S101, a difference between the present and last final compensating values U* is obtained as an automatic compensating value to be transmitted to the sizing device 114. That is, the present and last final compensating values U* correspond to the present and last provisional compensating values Up described above with respect to the auxiliary compensation in the first intermittent compensation mode. Further, the automatic compensating value to be transmitted to the sizing device 114 corresponds to the final compensating value Uf described above in connection with the provisional value Up. Step S101 is followed by step S102 to determine whether the sizing device 114 has the function of transmitting the manual compensation data to the control device 120 or not. If the device 114 has the function, an affirmative decision (YES) is obtained in step S102, step S103 is implemented to determine whether any manual compensating values have been entered in the sizing device 114 or not. If a negative decision (NO) is obtained in step S103, step S104 is implemented to transmit the automatic compensating value Uf obtained in step S101 to the sizing device 114. Step S104 is followed by step S105 to store in the auxiliary memory 122 the compensating value Uf transmitted to the sizing device 114. Then, step S106 is effected to increment the AUXILIARY COMPENSATION counter. Step S106 is followed by step S90 described above. If any manual compensating values have been entered, an affirmative decision (YES) is obtained in step S103, the control flow goes to step S107 of FIG. 34B to receive the manual compensating values from the sizing device 114, and to step S108 to turn "ON" the WORKPIECE WAIT flag. Then, step S109 is effected to clear the calculation data memory. The control then returns to step S28.

If the sizing device 114 does not have the function of transmitting the manual compensating data to the control device 120, a negative decision is obtained in step S102, step S94 and the following steps of FIG. 34B are executed to transmit the automatic compensating values Uf to the sizing device 114 if the negative decision (NO) is obtained in step S96. In this case, the affirmative decision (YES) is obtained in step S89, and the AUXILIARY COMPENSATION counter is incremented in step S100.

Step S90 is followed by step S110 of FIG. 35A to determine whether the AUXILIARY COMPENSATION command is present or not. If a negative decision (NO) is obtained in step S110, steps S111 and S112 are implemented to turn "ON" the WORKPIECE WAIT flag, and clear the calculation data memory. Step S112 is followed by step S113 to determine whether the X-SHIFT command is present or not. If this command is absent, the control returns to step S28.

If the AUXILIARY COMPENSATION command is present, an affirmative decision (YES) is obtained in step S110, the control flow goes to step S114 of FIG. 35B to determine whether the auxiliary compensation cycles should be terminated or not, namely, whether the count of the AUXILIARY COMPENSATION counter has become equal to the predetermined maximum number "S" (which was read in from the auxiliary memory 122 in step S21 of FIG. 30A). If the count is smaller than "S", the control returns to step S28.

When the count of the AUXILIARY COMPENSATION counter has become equal to "S" as a result of repeated execution of the present routine, an affirmative decision (YES) is obtained in step S114, and the control flow goes to step S115 to calculate a sum of at least the compensating values Uf of repeated auxiliary compensation cycles which follow the primary compensation. Step S115 is followed by step S116 to determine whether the auxiliary compensation cycling should be continued or not, namely, whether the sum obtained in step S115 is substantially "0" or not. If the sum is not substantially "0", a negative decision (NO) is obtained in step S116, and steps S117 and S118 are implemented to turn "ON" the WORKPIECE WAIT flag, and clear the calculation data memory. Step S118 is followed by step S119 to determine whether the X-SHIFT command is present or not. If a negative decision (NO) is obtained in step S119, the control returns to step S28.

If the sum obtained in step S115 is substantially "0", an affirmative decision (YES) is obtained in step S116, and the control flow goes to step S120 to determine whether the TOLERABLE RANGE command is present or not. If the TOLERABLE RANGE command is not present, but the AUXILIARY COMPENSATION CYCLE command is present, a negative decision (NO) is obtained in step S120, and step S121 is implemented to set the AUXILIARY COMPENSATION counter to "1". Then, the control returns to step S28. In this case, therefore, the affirmative decision (YES) is obtained in step S99 of FIG. 34A in the next execution cycle of the present routine, and the control flow goes to step S101 and the following steps of FIG. 34C.

If the TOLERABLE RANGE command is present, an affirmative decision (YES) is obtained in step S120 of FIG. 35B, and step S122 is implemented to set the AUXILIARY COMPENSATION counter to "0". Then, the control returns to step S28. In this case, the negative decision (NO) is obtained in step S99 in the next execution cycle of the present routine, and the control flow goes to step S84 and the following steps of FIG. 34A.

Figure 30B:
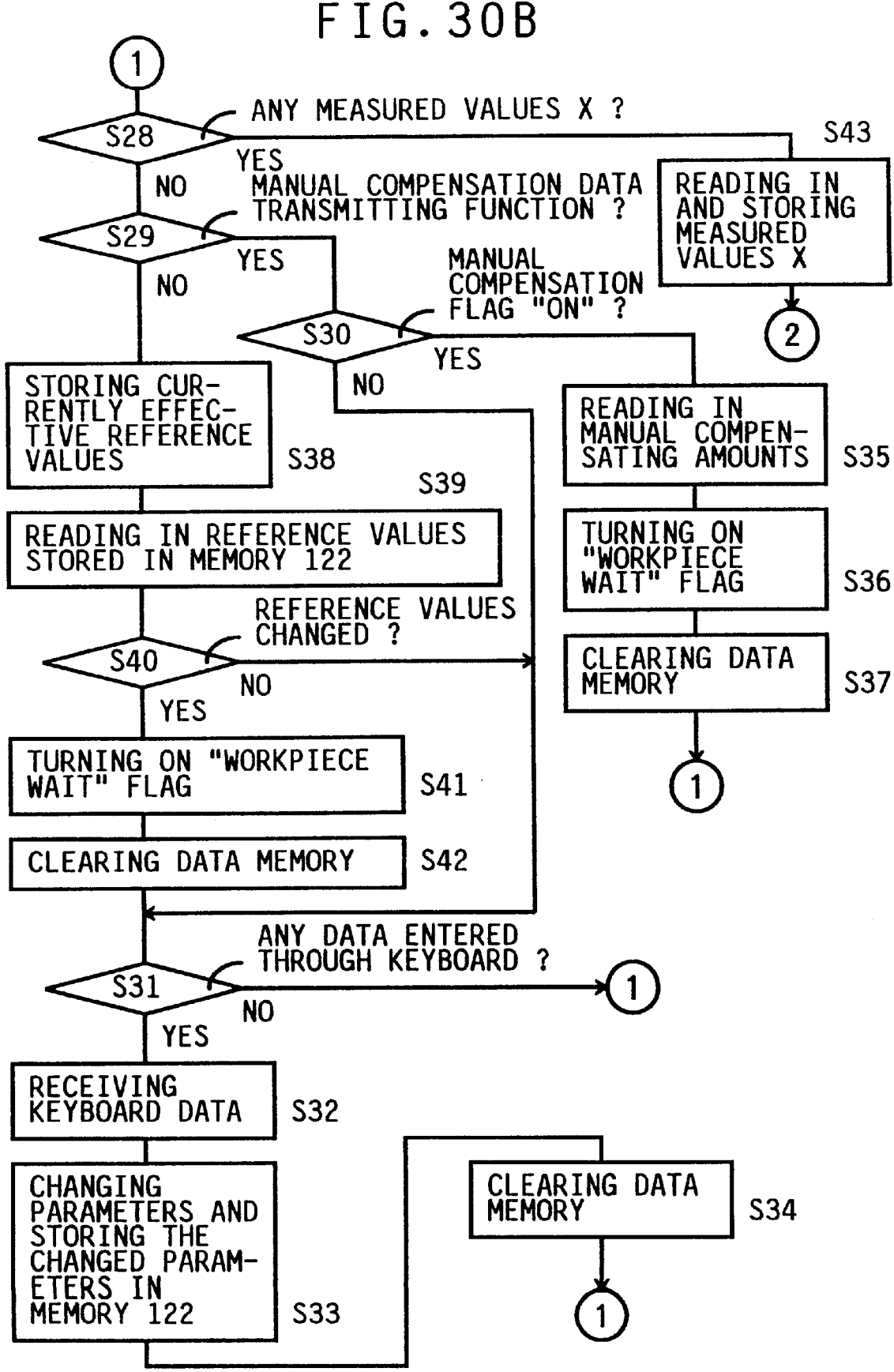
Figure 31A:
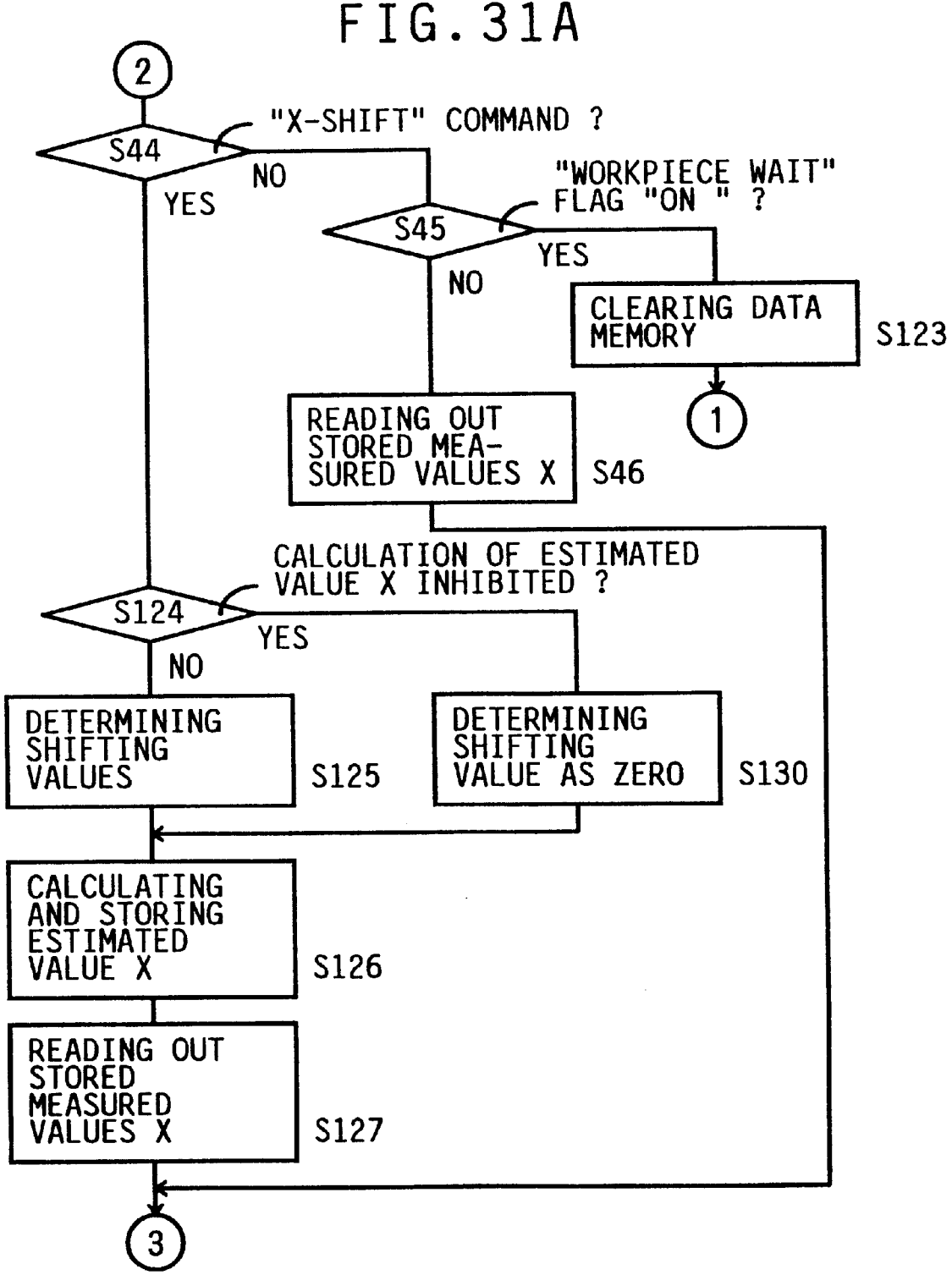
FIGS. 31A and 31B are flow charts illustrating another portion of the compensating routine.
Figure 31B:
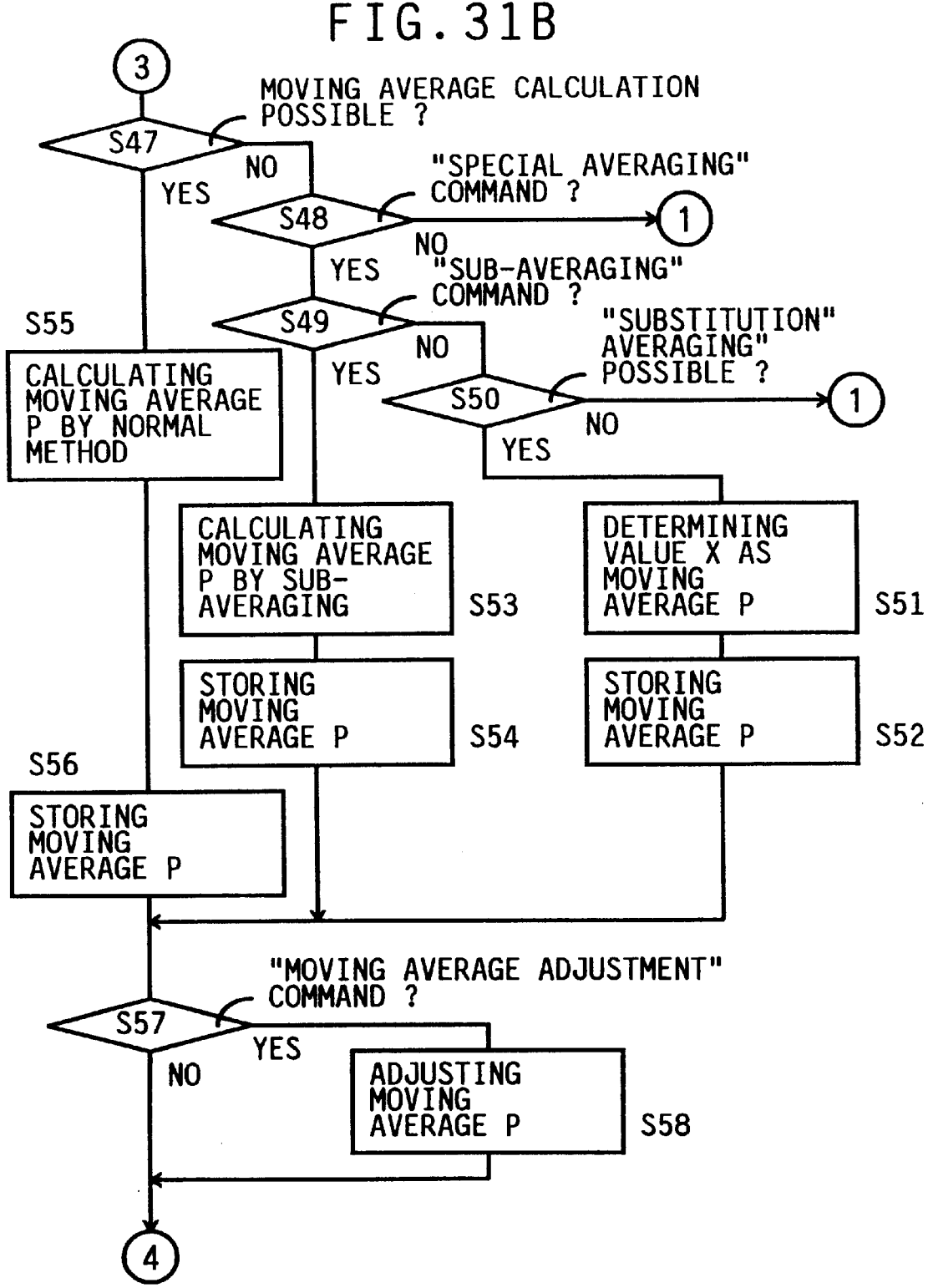

If step S45 of FIG. 31A is implemented when the WORKPIECE WAIT flag is set at "ON", the affirmative decision (YES) is obtained in this step S45, whereby the control flow goes to step S123 to clear the calculation data memory, and returns to step S28. Consequently, the measured values X stored in the calculation data memory in step S43 of FIG. 30B are erased, for example. Therefore the values X and the other values measured or calculated immediately after the adjustment of the reference values by the manual or automatic compensation values are not stored until the WORKPIECE WAIT flag is set to "OFF", that is, until the first workpiece influenced by the manual or automatic compensating values has been measured by the measuring device 116. In other words, the measured values X, calculated moving average values P and other calculated values begin to be stored when the negative decision (NO) is obtained in step S45 with the WORKPIECE WAIT flag set to "OFF".

While the above description refers to the operation of the present embodiment when the the X-SHIFT command is absent, there will be described an operation when the X-SHIFT command is present.

In the presence of the X-SHIFT command for placing the control device in the second intermittent compensating mode, an affirmative decision (YES) is obtained in step S44 of FIG. 31A, whereby the control flow goes to steps S124 and the following steps. Step S124 is provided to determine whether the calculation of the estimated values X should be inhibited or not, namely, whether the measurement of the first workpiece influenced by the currently effective manual or automatic compensating values is completed by the measuring device 116 or not. If so, the calculation of the estimated values X used in the second intermittent compensating mode is not necessary, and this mode of intermittent compensation would increase the error of the measured values X.

The determination as to whether the measurement of the first workpiece influenced by the currently effective manual or automatic compensating values is completed is made on the basis of the number Y of the pre-measured workpieces (crankshafts 126) existing between the grinding machine 110 and the measuring device 116 at the time the reference values of the sizing device 114 are adjusted by the currently effective manual or automatic compensating values. The number Y of the workpieces which is counted by the workpiece counter 118 is set in a suitable decrement counter in the RAM of the control device 120. The count of this counter is decremented when the measuring device 116 has measured each workpiece. The control device 120 determines that the measurement of the first influenced workpiece in question is completed when the count of the decrement counter is zeroed.

If the first influenced workpiece has not been measured by the measuring device 116, a negative decision (NO) is obtained in step S124, and step S125 is executed to determine the currently effective manual or automatic compensating values as shifting values to be used to obtain the estimated values X. Step S125 is followed by step S126 to calculate the estimated values X by adding the determined shifting values to the currently measured values X (for the two end journals 128). The calculated estimated values X are stored in the calculation data memory of the control device 120 and in the auxiliary memory 122. Then, the control flow goes to step S127 to read out from the calculation data memory the measured or estimated values X, so that the moving average P is calculated from these values X in step S47 and the following steps as described above.

When the X-SHIFT command is subsequently detected to be present in step S113 of FIG. 35A, step S113 is followed by step S128 to read out from the workpiece counter 118 the dead time value MS (corresponding to the number Y of the pre-measured workpieces), and the number Y is set in the decrement counter in the RAM of the control device 120, so that the number Y is used in the next cycle of implementation of step S124. The number Y is also stored in the auxiliary memory 122. The control then returns to step S28.

Similarly, an affirmative decision (YES) is obtained in step S119 of FIG. 35B, and the control flow goes to step S129 to read in the dead time value MS (number Y). The number Y is set in the decrement counter of the RAM and stored in the memory 122.

Thus, the number Y of the pre-measured workpieces is set when the intermittent compensation for automatic adjustment is terminated. Further, the number Y is also set when the manual compensation is terminated, though the manner to set the number Y is not illustrated in the flow charts. For the initial execution of the present routine, a predetermined value is stored in the ROM of the control device, as an initial number of the pre-measured workpieces to be used in step S124.

When the measurement of the first workpiece influenced by the manual or automatic compensating values is completed during repeated execution of the present routine, an affirmative decision (YES) is obtained in step S124 of FIG. 31A, and the shifting values used in step S126 are determined to be "0". In this case, therefore, the actually measured values X are stored in the calculation data memory.

Thus, the estimated values X are stored in the calculation data memory immediately after the adjustment of the references values of the sizing device 114, until the first workpiece influenced by the manual or automatic compensating values has been measured, regardless of the "ON" or "OFF" state of the WORKPIECE WAIT flag. This arrangement is effective to reduce the interval between the moments of determinations of two successive automatic compensating values obtained in the second intermittent compensating mode (as illustrated in FIG. 50).

While the third embodiment of the present invention has been described above by reference to FIGS. 3–5 and 28–54, it is to be understood that the above embodiment may be modified as needed.

In the above third embodiment, the vibration level of the measured values X is determined on the basis of the relationship between the actually measured values and the calculated moving average values P, and on the basis of the fuzzy rules applied in the fuzzy inference to determine the compensating values U. These two techniques both relate to the determination or estimation of the vibration level in the process of determining the compensating values U. However, other techniques may be employed to determine the vibration level of the measured values X in the process of determining the compensating values U.

For example, the vibration level may be determined by suitable techniques utilizing the moving average P, which include: a technique which relies on an average of a plurality of moving average values P; a technique which relies on a power spectral density at a predetermined frequency of the noisy component waves of the moving average P; and a pattern recognition technique which utilizes a neural network or correlation function. These techniques may be modified to be applied to the compensating values U.

The vibration level of the measured values X may also be determined based on the measured values X per se. In this case, the above techniques may be employed with some modifications as needed.

The determination of the vibration level may be based on the relationship between the compensating values U sent to the sizing device 114 and the measured values X which are influenced by the compensating values U. The determination may also be made on the basis of a response of the measured values X to the compensating values U.

To determine the compensating values U, the illustrated third embodiment uses not only different sets of weighting coefficients b (or different rates of increase of coefficients b) for obtaining the moving average P, but also different groups of fuzzy rules (positive and negative fuzzy rules) for effecting the fuzzy inference on the basis of the error value R and derivative T. However, only one of these two techniques or other techniques may be used to determine the compensating coefficients U. For instance, the third embodiment may be modified to use: different values for the number K (FIG. 39) of the measured values X used to calculate the moving average P according to the standard method; different regression lines used to calculate the moving average (FIG. 42), e.g., first and second order regression lines; different values for the number L (FIG. 39) of the moving average values P to calculate the first derivative T according to the standard differentiation method; different numbers of the fuzzy labels used for at least one parameter or variable ("R", "T", "U"); different values of the fuzzy labels; different groups of the membership functions for at least one parameter (See FIGS. 3–5); different methods (e.g., "gravity center" method and "surface area" method) by which the fuzzy inference values obtained by the fuzzy rules are converted into the compensating values U; different values for the number M (FIG. 45) of the provisional compensating values U to obtain the final compensating value U*; and different values for the width N (FIG. 46) of the tolerable range for the compensating value U.

In illustrated third embodiment, the calculation data memory is not cleared even when the set of weighting coefficients b or the group of fuzzy rules is changed, and the compensating values U are determined based on the data which have been stored in the data memory before the coefficients b or fuzzy rules are changed. This arrangement is effective to avoid frequent occurrences of shortage of the stored data and consequent deterioration of the dimensional accuracy of the processed workpieces, which would be expected if the calculation data memory were cleared upon changing of the weighting coefficients b or fuzzy rules. It is also recognized that the use of the data stored prior to the changing of the coefficients b or fuzzy rules would not significantly deviate the obtained compensating values U from the optimum values. However, the third embodiment may be adapted to clear the calculation data memory each time the weighting coefficients b or fuzzy rules are changed.

In the third embodiment, when the SPECIAL AVERAGING command is present (step S48 of FIG. 31B), the moving average values P are obtained one after another (measured values X are substituted for the moving average P) even before the number of the measured values X stored in the calculation data memory is smaller than the predetermined value "K" (FIGS. 40 and 41, steps S49, S50, S51 and S53). Accordingly, the error values R are successively obtained and stored in the calculation data memory, as the measured values X are obtained, so that a derivative T and a final compensating value U* are obtained when the number of the measured values X has become equal to a certain predetermined value (which may be equal to "K"). However, the third embodiment may be adapted such that the moving average values P are not obtained until the number of the stored measured values X has become equal to the predetermined number "K", and such that the moving average values P and the other values are obtained at one time to determine the compensating value U* when the number of the stored measured values X has become equal to the certain predetermined value.

As described above, the third embodiment is designed as a feedback compensating apparatus used for the automatic sizing device 114 which controls the grinding system in which the working portions of the workpiece in the form of the cylindrical surfaces of the plurality of journals 128 on the crankshaft 126 are ground to a nominal outside diameter value. It will be understood that the third embodiment may be modified so as to be used with an automatic sizing device for other types of working systems, for example, the automatic sizing device 22 for a cylinder bore honing system as illustrated in FIG. 1 which has been discussed with respect to the first and second embodiments.

Of course, the feedback compensating apparatus according to the third embodiment may be adapted to a working system in which the workpiece has only one working portion to be processed.

Figure 46:
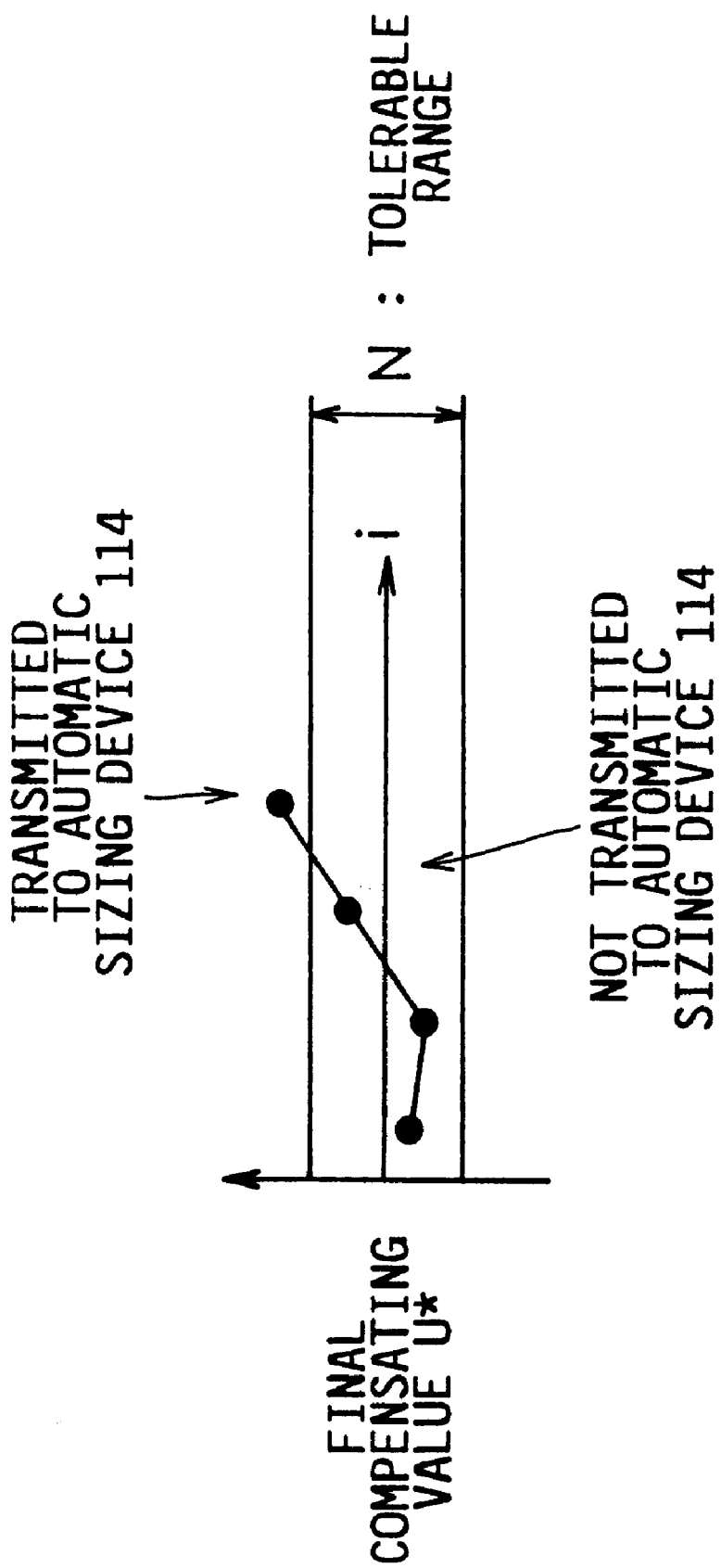
FIG. 46 is a view schematically showing an operation performed in seventh step of FIG. 36.

Although the third embodiment is adapted such that the final compensating value U* is not transmitted from the control device 120 to the automatic sizing device 114 if the value U* falls within the tolerable range N as indicated in FIG. 46, it is possible that the control device 120 transmits the final compensating value U* to the automatic sizing device 114, irrespective of whether the value U* is within the tolerable range, while the sizing device 114 determines whether the received value U* falls within the range N or not. In this case, the currently effective reference value is not adjusted by the device 114 when the value U* is within the range N.

In the third embodiment, the two in-process measuring heads 112 are provided for the two end journals 128, respectively. However, the present invention is applicable to a working system in which an in-process measuring head is provided for each of the working portions on the workpiece.

While the present invention has been described in its presently preferred embodiments and some modifications thereof, it is to be understood that the present invention may be otherwise embodied, in the light of the foregoing teachings.

What is claimed is:

1. A feedback compensating apparatus for a working system including a working machine for performing a working operation on at least one working portion of each of a plurality of workpieces, to process said each working portion as desired, such that working operations on said plurality of the workpieces take place successively one after another, and machine control means for determining a working condition of said working machine on the basis of an extraneous signal, and for controlling said working machine according to the determined working condition, the apparatus comprising;

a measuring device for measuring actual dimensions of the working portions of the workpieces processed or under processing by said working machine;

said measuring device including a post-process measuring device for measuring the actual dimensions of the working portions of the workpieces previously processed by said working machine, said post-process measuring device being positioned relative to said working machine such that there exists at least one pre-measured workpiece previously processed by said machine and which has not been measured by said post-process measuring device;

data obtaining means for obtaining dimensional data on the basis of outputs of said Post-Process measuring device said dimensional data including a dimensional error of the working portions of the workpieces, and a derivative of said dimensional error of the workpieces, said derivative representing a gradient of a straight line approximating successive measured values represented by the outputs of said post-process measuring device, said successive measured values including a currently measured value currently obtained by said post-process measuring device and at least one measured value which precedes said currently measured value; and compensating means for determining a compensating signal as said extraneous signal on the basis of said dimensional data, and for applying said compensating signal to said machine control means, to adjust said working condition of said working machine.

2. A feedback compensating apparatus according to claim 1, wherein said plurality of workpieces consist of a plurality of cylinder blocks for an engine of a motor vehicle, and said at least one working portion consists of at least one cylinder bore formed in each of said cylinder blocks, said working machine consisting of a honing machine for honing an inner cylindrical surface of each of said at least one cylinder bore.

3. A feedback compensating apparatus according to claim 1, wherein said plurality of workpieces consist of a plurality of crankshafts for an engine of a motor vehicle, and said at least one working portion consists of at least one journal formed on each of said crankshafts, said working machine consisting of a cylindrical grinding machine for grinding an outer cylindrical surface of each of said at least one journal.

4. A feedback compensating apparatus according to claim 1, wherein said measuring device further includes an in-process measuring device for measuring the actual dimensions of the working portions during said working operation on each working portion said machine control means performing an in-process control of said working condition on the basis of an output of said in-process measuring device, and wherein said data obtaining means obtains as said dimensional error differences between the actual dimensions of said processed working portions measured by said post-process measuring device and a nominal value of said working portions, said data obtaining means further obtaining, as said derivative representing said gradient, a derivative of said differences, said compensating means determining said compensating signal on the basis of said differences and said derivative of said differences, and applying said compensating signal to said machine control means so as to adjust a reference value which is set in said machine control means as said working condition, said data obtaining means and said compensating means cooperating to perform a post-process control of said working condition, so that said machine control means controls said working condition by comparing an output of said in-process measuring device with said reference value as adjusted according to said compensating signal as determined by said compensating means.

5. A feedback compensating apparatus according to claim 1, wherein said compensating means comprises fuzzy inference means for effecting fuzzy inference to obtain a fuzzy inference value, on the basis of said dimensional data, said fuzzy inference value affecting said compensating signal.

6. A feedback compensating apparatus according to claim 1, wherein said compensating means determines said compensating signal in the form of a compensating value representative of an amount of adjustment of said working condition, such that said compensating value is changed toward zero, when said dimensional error and said derivative obtained by said data obtaining means are larger than respective threshold values.

7. A feedback compensating apparatus according to claim 1, wherein said compensating means determines said compensating signal in the form of successive compensating values representative of respective amounts of adjustment of said working condition, on the basis of said dimensional data on the working portions successively processed by said machine, said compensating means comprising determining means for determining said successive compensating values such that a present one of said successive compensating values is determined on the basis of said dimensional data currently obtained by said data obtaining means, and at least one preceding compensating value of said successive compensating values which precedes said present one compensating value, and wherein said determining means determines a present provisional compensating value as said present one of said successive compensating values on the basis of said dimensional error and said derivative of said dimensional error, and adjusts said present provisional compensating value into a present final compensating value such that said present final compensating value lies on a line which is determined by said present provisional compensating value and a plurality of preceding provisional compensating values which precede said present provisional compensating value, said line assuring a gradual change in said amounts of adjustment of said working condition.

8. A feedback compensating apparatus according to claim 7, wherein said determining means determines, as said line assuring said gradual change in said amounts of adjustment of said working condition, a first order regression line on the basis of said present provisional compensating value and said preceding provisional compensating values.

9. A feedback compensating apparatus according to claim 1, wherein said data obtaining means obtains on the basis of said outputs of said measuring device, said dimensional error, and as said derivative of said dimensional error a first derivative of said dimensional error, and a derivative of said second derivative of said dimensional error.

10. A feedback compensating apparatus according to claim 1, wherein said data obtaining means includes means for obtaining a present value of an estimated dimension of the working portions of the workpieces on the basis of a predetermined first number of successive measured values represented by outputs of the measuring device, said data obtaining means further obtaining a present dimensional error value which is a difference between said present value of said estimated dimension and a nominal dimension of the working portion of each workpiece, said data obtaining means further obtaining a present value of said derivative, on the basis of a predetermined second number of successive dimensional error values which include said present dimensional error value, and wherein said data obtaining means includes at least one of the dimension estimating means and derivative obtaining means, said dimension estimating means obtaining said present value of said estimated dimension in a first manner when the number of the successive measured values currently available is not smaller than said predetermined first number, and in a second manner different from said first manner, when the number of said successive measured values currently available is smaller than said predetermined first number, and in a second manner different from said first manner, when the number of said successive measured values currently available is smaller than said predetermined first number, said derivative obtaining means including means for obtaining said present value of said derivative in a third manner when the number of the successive dimensional error values currently available is not smaller than said predetermined second number, and in fourth manner different from said third manner, when the number of said successive dimensional error values currently available is smaller than said predetermined second number.

11. A feedback compensating apparatus according to claim 1, wherein said each workpiece has at least three working portions in the form of at least three coaxial outer cylindrical surfaces arranged in an axial direction thereof, said working machine including an array of working tools which correspond to said at least three working portions, respectively, said array of working tools being moved relative to said each workpiece to simultaneously process said working portions, and wherein said measuring device further includes an in-process measuring device and a post-process measuring device, said in-process measuring device having two in-process measuring heads for measuring diameter values of respective two end working portions of said at least three working portions, during a working operation of said machine on said each workpiece, said two end working portions being located near opposite axial ends of said each workpiece, said post-process measuring device measuring diameter values of said at least three working portions, respectively, after said each workpiece is processed by said machine, said machine control means performing an in-process control of an operating angle of said array of working tools relative to said each workpiece and terminating said working operation of the machine on said each workpiece, on the basis of said diameter values of said two end working portions measured by laid in-process measuring heads, in relation to two reference values set for said two end working portions, respectively, said compensating means comprising:

determining means for determining two compensating values for adjusting said two reference values, on the basis of said diameter values of all of said at least three working portions of said each workpiece measured by said post-process measuring device, said determining means including diameter adjusting means for adjusting the diameter values of said two end working portions of the workpiece measured by said post-process measuring device so that the diameter values of said all of said at least three working portions measured by said post-process measuring device lie on a line which assures a gradual chance of said diameter values in said axial direction; and applying means for applying said two compensating values to said machine control means.

12. A feedback compensating apparatus according to claim 1, wherein the working machine performs the working operations successively on said plurality of workpieces of at least one kind, and wherein said data obtaining means obtains a set of dimensional data for each of said at least one kind of the workpieces, said apparatus further comprising:

number data obtaining means for obtaining the number of said pre-measured workpieces of each of said at least one kind processed by said machine and which have not been measured by said post-process measuring device, said compensating means including means for determining as said extraneous signal a compensating value for said each said at least one kind of the workpieces, on the basis of said set of dimensional data and said number of said pre-measured workpieces of the corresponding kind which have been obtained by said data obtaining means and said number data obtaining mans, respectively, said compensating means for applying said compensating value to said machine control means.

13. A feedback compensating apparatus according to claim 1, wherein said measuring device successively measured the workpieces processed by said working machine, wherein said compensating means includes:

determining means for determining as said extraneous signal a compensating value for adjusting said working condition of said working machine, on the basis of said dimensional data obtained by said data obtaining means, said determining means updating said compensating value from time to time on an intermittent basis while said workpieces processed by said machine are measured successively by said measuring device, such that said determining means chances said compensating value from a last value to a present value, only after a first one of the workpieces processed by said machine under the working condition adjusted by said last value has been measured by said measuring device, whereby said compensating value is not updated for a period after said last value is determined and before said first one of the workpieces has been measured; and applying means for applying said compensating value to said machine control means.

14. A feedback compensating apparatus according to claim 1, wherein said compensating means includes:

determining means for determining as said extraneous signal a compensating value for adjusting said working condition of said machine for the workpieces to be processed subsequently by said machine, on the basis of the actual dimensions of the working portion of the workpieces which have been measured by said measuring device, and according to a compensation rule which changes with a change in a variation amount of measured values of said actual dimensions successively obtained by said post-process measuring device; and applying means for applying said compensating value to said machine control means.

15. A feedback compensating apparatus according to claim 1, where in s aid compensating means applies said compensating value to said machine control means to adjust said working condition of said machine when said compensating value is outside a predetermined tolerable range, and inhibits the application of said compensating value to said machine control means when said compensating value falls within said tolerable range.

16. A feedback compensating apparatus according to claim 1, further comprising manual compensating means for effecting a manual adjustment of said working condition of said machine, said manual compensating means determining also as said extraneous signal a manual compensating value to adjust said working condition of said machine, in response to manual compensating data entered by an operator of said machine, said manual compensating means applying said manual compensating value to said machine control means, and wherein said compensating means functions as automatic compensating means for effecting an automatic adjustment of said working condition, said automatic compensating means determining as said compensating signal an automatic compensating value for adjusting said working condition of said machine for the workpieces to be processed subsequently by said machine, on the basis of said dimensional data obtained by said data obtaining means, said automatic compensating means applying said automatic compensating value to said machine control means, said automatic compensating means interrupting an operation to effect said automatic adjustment when said manual adjustment by said manual compensating means is started, and resuming said operation to effect said automatic adjustment, at a moment not earlier than a moment when a first one of the workpieces processed by said machine under the working condition adjusted by said manual compensating value has been measured by said post-process measuring device.

17. A feedback compensating apparatus according to claim 1, wherein said data obtaining means obtains, as said straight line approximating said successive measured values represented by the outputs of said post-process measuring device, a first order regression line on the basis of a present one of said successive measured values, and at least one preceding measured value of said successive measured values which precedes said present one measured value.

18. A feedback compensating apparatus according to claim 1, wherein said data obtaining means obtains a moving average of a present one of said successive measured values represented by the outputs of said post-process measuring device, and at least one preceding measured value of said successive measured value which precedes said present one measured value, data obtaining means obtaining said dimensional error on the basis of said moving average.

19. A method of processing at least one working portion provided on each of a plurality of workpieces, such that said workpieces are successively processed one after another by a working machine, comprising the steps of:

operating a post-process measuring device to measure actual dimensions of the working portions of the workpieces which have been processed by said working machine, such that between said machine and said post-process measuring device, there exists at least one pre-measured workpiece previously processed by said machine and which has not been measured by said measuring device;

obtaining dimensional data including a dimensional error of the processed working portions of the workpieces, and a derivative of said dimensional error of the workpieces, said derivative representing a gradient of a straight line approximating successive measured values represented by the outputs of said post-process measuring device, said successive measured values consisting of a currently measured value currently obtained by said post-process measuring device and at least one measured value which precedes said currently measured value; and feeding back said dimensional data to said working machine, to adjust a working condition of said machine on the basis of said dimensional data, for subsequent working operation on the working portions of the workpieces according to the adjusted working condition.

20. A method according to claim 19, wherein said step of obtaining dimensional data comprises obtaining, as said straight line approximating said successive measured values represented by the outputs of said post-process measuring device, a first order regression line on the basis of a present one of said successive measured values, and at least one preceding measured value of said successive measured values which precedes present one measured value.

21. A method according to claim 19, wherein said step of obtaining dimensional data comprising obtaining a moving average of a present one of said successive measured values represented by the outputs of said post-process measuring device, and at least one preceding measured value of said successive measured value which precedes said present one measured value.

22. A feedback compensating apparatus for a working system including a working machine for successively processing a plurality of workpieces, and machine control means for determining a working condition of said working machine on the basis of an extraneous signal, and controlling said working machine according to the determined working condition, the apparatus comprising;
  a measuring device for measuring actual dimensions of working portions of the workpieces processed by said working machine,
  said measuring device including a post-process measuring device for measuring the actual dimensions of the working portions of the workpieces previously processed by said working machine, said post-process measuring device being positioned relative to said working machine such that there exists at least one pre-measured workpiece which has been processed by said machine and which has not been measured by said post-process measuring device and further comprising;
  data obtaining means for obtaining dimensional data on the basis of outputs of said post-process measuring device, said dimensional data including a dimensional error of the processed workpieces, and a derivative of said dimensional error of the workpieces, said data obtaining mans obtaining a present value of an estimated dimension of the working portions of the workpieces on the basis of a predetermined first number of successive measured values represented by the outputs of said post-process measuring device, said predetermined first number of successive measured values consisting of a currently measured value currently obtained by said post-process measuring device and at least one measured value which precedes said currently measured value;
  said data obtaining means for obtaining a present dimensional error value which is a difference between said present value of said estimated dimension and a nominal dimension of the working portion of said each workpiece, said data obtaining means including means for obtaining a present value of said derivative, on the basis of a predetermined second number of successive dimensional error values, when said present dimensional error value is obtained, said predetermined second number of successive dimensional error values including said present dimensional error value and at least one error value which precedes said present dimensional error value, said derivative representing a gradient of a straight line approximating said successive dimensional error values;
  said data obtaining means including at least one of the dimension estimating means and the derivative obtaining means, said present value of said estimate dimension in a first manner when the number of the successive measured values currently available is not smaller than said predetermined first number, and in a second manner different from said first manner, when the number of said successive measured values currently available is smaller than said predetermined first number, said derivative obtaining means obtaining said present value of said variable in a third manner when the number of the successive dimensional error value currently available is not smaller than said predetermined second number, and in a fourth manner different from said third manner, when the number of said successive dimensional error values currently available is smaller than said predetermined second number; and
  compensating means for determining a compensating signal as said extraneous signal on the basis of said present value of said estimated dimension and said present value of said derivative, and for applying said compensating signal to said machine control means, to adjust said working condition of said working machine.

23. A feedback compensating apparatus according to claim 22, wherein said dimension estimating means obtains said present value of said estimated dimension in said first manner by inserting said predetermined first number of successive measured values into a predetermined equation, when the number of said successive measured values currently available is not smaller than said predetermined first number, said dimension estimating means obtaining said present value of said estimated dimension in said second manner by substituting said currently measured value for said present value of said estimated dimension, when said successive measured values currently available is smaller than said predetermined first number.

24. A feedback compensating apparatus according to claim 22, wherein said dimension estimating means obtains said present value of said estimated dimension in said first manner by inserting said predetermined first number of successive measured values into a predetermined equation, when the number of said successive measured values currently available is not smaller than said predetermined first number, said dimension estimating means obtaining said present value of said estimated dimension in said second manner by inserting successive measured values currently available whose number is smaller than said predetermined number, into an appropriate one of other equations which correspond to respective numbers smaller than said predetermined first number, when the number of said successive measured values currently available is smaller than said predetermined first number.

25. A feedback compensating apparatus according to claim 22, wherein said derivative obtaining means obtains said present value of said variable in said third manner by inserting said predetermined second number of successive dimensional error values into a predetermined equation, when the number of said successive dimensional error values currently available is not smaller than said predetermined second number, said derivative obtaining means obtaining said present value of said variable in said fourth manner by inserting successive dimensional error values currently available whose number is smaller than said predetermined number, into an appropriate one of other equations which correspond to respective numbers smaller than said predetermined second number, when the number of said successive dimensional error values currently available is smaller than said predetermined second number.

26. A method of processing a plurality of workpieces by a working system including a working machine for successively processing said plurality of workpieces, and machine control means for determining a working condition of said working machine on the basis of an extraneous signal, and for controlling said working machine according to the determined working condition, and a post-process measuring device for measuring actual dimensions of working portions of the workpieces processed by said working machine, said method comprising the steps of:
  operating said post-process measuring device to measure the actual dimensions of the working portions of the workpieces which have been processed by said machine, such that between said machine and said measuring device, there exists at least one pre-measured workpiece which has been processed by said machine and which has not been measured by said measuring device;
  obtaining dimensional data on the basis of outputs of said post-process measuring device, said dimensional data including a dimensional error of the processed workpieces, and a derivative of said dimensional error of the workpieces, said step of obtaining dimensional data including the sub-steps of (a) obtaining a present value of an estimated dimension of the working portions of the workpieces on the basis of a predetermined first number of successive measured values represented by the outputs of said measuring device, when each of the workpieces is measured by the measuring device, said predetermined first number of successive measured values consisting of a currently measured value currently obtained by said measuring device and at least one measured value which precedes said currently measured value, (b) obtaining a present dimensional error value which is a difference between said present value of said estimated dimension and a nominal dimension of the working portion of said each workpiece, and (c) obtaining a present value of said derivative, on the basis of a predetermined second number of successive dimensional error values, when said present dimensional error value is obtained, said predetermined second number of successive dimensional error values including said present dimensional error value and at least one error value which precedes said present dimensional error value;

determining a compensating signal as said extraneous signal on the basis of said present value of said estimated dimension and said present value of said derivative; and applying said compensating signal to said machine control means, to adjust said working condition of said working machine, and wherein said step of obtaining dimensional data comprises at least one of two substeps (d) and (e), said substep (d) comprising obtaining said present value of said estimated dimension in a first manner when the number of the successive measured values currently available is not smaller than said predetermined first number, and in a second manner different from said first manner, when the number of said successive measured values currently available is smaller than said predetermined first number, said substep (e) including obtaining said present value of said derivative in a third manner when the number of the successive dimensional error values currently available is not smaller than said predetermined second number, and in a fourth manner different from said third manner, when the number of said successive dimensional error values currently available is smaller than said predetermined second number.

27. A feedback compensating apparatus for a working system including (a) a working machine for successively processing a plurality of workpieces one after another, each of said workpieces having at least three working portions in the form of at least three coaxial outer cylindrical surfaces arranged spaced from one another in an axial direction thereof, said working machine including an array of working tools which correspond to said at least three working portions, respectively, said array of working tools being moved relative to said each workpiece to simultaneously process said working portions, (b) an in-process measuring device having two in-process measuring heads for measuring diameter values of respective two end working portions of said at least three working portions, during a working operation of said machine on said each workpiece, said two end working portions being located near opposite axial ends of said each workpiece, (c) a post-process measuring device for measuring diameter values of said at least three working portions, respectively, after said each workpiece is processed by said machine, (d) and machine control means for performing an in-process control of an operating angle of said array of working tools relative to said each workpiece and terminating said working operation of the machine on said each workpiece, on the basis of said diameter values of said two end working portions measured by said in-process measuring heads, in relation to two reference values set for said two end working portions, respectively, said feedback compensating apparatus being used with said post-process measuring device and said machine control means, said apparatus comprising:

determining means for determining two compensating values for adjusting said two reference values, on the basis of said diameter values of all of said at least three working portions of said each workpiece measured by said post-process measuring device, said determining means including diameter adjusting means for adjusting the diameter values of said two end working portions of the workpiece measured by said post-process measuring device so that the diameter values of all of said at least three working portions measured by said post-process measuring device lie on a line which assures a gradual change in said axial direction; and applying means for applying said two compensating values to said machine control means.

28. A feedback compensating apparatus for a working system including (a) a working machine for successively processing a plurality of workpieces one after another, each of said workpieces having at least three working portions in the form of at least three coaxial outer cylindrical surfaces arranged in an axial direction thereof, said working machine including an array of working tools which correspond to said at least three working portions, respectively, said array of working tools being moved relative to said each workpiece to simultaneously process said working portions, (b) an in-process measuring device having two in-process measuring heads for measuring diameter values of respective two end working portions of said at least three working portions, during a working operation of said machine on said each workpiece, said two end working portions being located near opposite axial ends of said each workpiece, (c) a post-process measuring device for measuring diameter values of said at least three working portions, respectively, after said each workpiece is processed by said machine, and (d) machine control means for performing an in-process control of an operating angle of said array of working tools relative to said each workpiece and terminating said working operation of the machine on said each workpiece, on the basis of said diameter values of said two end working portions measured by said in-process measuring heads, in relation to two reference values set for said two end working portions, respectively, said feedback compensating apparatus being used with said post-process measuring device and said machine control means said apparatus comprising:

determining means for determining two compensating values for adjusting said two reference values, on the basis of said diameter values of all of said at least three working portions of said each workpiece measured by said post-process measuring device, said determining means including diameter adjusting means for adjusting the diameter values of said two end working portions of the workpiece measured by said post-process measuring device so that the diameter values of said all of said at least three working portions measured by said post-process measuring device lie on a line which assures a gradual change in said axial direction; and applying means for applying said two compensating values to said machine control means, wherein said determining means includes:

diameter adjusting means for adjusting the diameter values of said two end working portions of the workpiece measured by said post-process measuring device, so that the diameter values of all of said at least three working portions measured by said post-process measuring device lie on a first order regression line;

data obtaining means for obtaining dimensional error data relating to a dimensional error of each of said two end working portions, on the basis of the diameter values of said two end working portions adjusted by said diameter adjusting means; and means for determining said two compensating values for adjusting said two reference values, on the basis of said dimensional error data.

29. A method of processing a plurality of workpieces by a working system including (a) a working machine for successively processing said plurality of workpieces one after another, each of said workpieces having at least three working portions in the form of at least three coaxial outer cylindrical surfaces arranged spaced from one another in an axial direction thereof, said working machine including an array of working tools which correspond to said at least three working portions, respectively, said array of working tools being moved relative to said each workpiece to simultaneously process said working portions, (b) an in-process measuring device having two in-process measuring heads for measuring diameter values of respective two end working portions of said at least three working portions, during a working operation of said machine on said each workpiece, said two end working portions being located near opposite axial ends of said each workpiece, (c) a post-process measuring device for measuring diameter values of said plurality of working portions, respectively, after said each workpiece is processed by said machine, and (d) machine control means for performing an in-process control of an operating angle of said array of working tools relative to said each workpiece and terminating said working operation of the machine on said each workpiece, on the basis of said diameter values of said two end working portions measured by said in-process measuring heads, in relation to two reference values set for said two end working portions, respectively, said method comprising the steps of:

determining two compensating values for adjusting said two reference values, on the basis of said diameter values of all of said at least three working portions of said each workpiece measured by said post-process measuring device, said step of determining two compensating values including adjusting the diameter values of said two end working portions of the workpiece measured by said post-process measuring device so that the diameter values of all of said at least three working portions measured by said post-process measuring device lie on a line which assures a gradual change in said axial direction; and applying said two compensating values to said machine control means.

30. A feedback compensating apparatus for a working system including (a) a working machine for performing a working operation on each of at least one working portion of each of a plurality of workpieces of at least one kind, to process said each working portion as desired, such that working operations on said plurality of workpieces take place successively one after another, (b) machine control means for determining a working condition of said machine on the basis of an extraneous signal, and controlling said machine according to the determined working condition, and (c) a post-process measuring device for measuring actual dimensions of the working portions of the workpieces processed by said machine, said feedback compensating apparatus being used with said machine control means and said post-process measuring machine, said apparatus comprising:

dimensional data obtaining means for obtaining a set of dimensional error data relating to a dimensional error of the processed working portions of the workpieces, for each of said at least one kind of the workpieces, on the basis of outputs of said post-process measuring device;

number data obtaining means for obtaining the number of pre-measured workpieces of each of said at least one kind which have been processed by said machine and which have not been measured by said post-process measuring device; and compensating means for determining as said extraneous signal a compensating value for said each kind of the workpieces, on the basis of said set of dimensional error data and said number of said pre-measured workpieces of the corresponding kind which have been obtained by said dimensional data obtaining means and said number data obtaining means, respectively, said compensating means applying said compensating value to said machine control means, to adjust said working condition of said machine for the workpieces of said each kind to be subsequently processed.

31. A feedback compensating apparatus according to claim 30, wherein said plurality of workpieces are of a single kind, and said compensating means includes memory means for storing a plurality of control rules which correspond to selected respective values of said number of said pre-measured workpieces and which define respective different relationships between said compensating value and said set of dimensional error data for said single kind of workpieces, said memory means also storing a plurality of data groups which correspond to said plurality of control rules and which define relationships between said number of said pre-measured workpieces to be obtained by said number data obtaining means, and an optimum degree of influence of said control rules to be given on said compensating value to be determined, said compensating means determining the optimum degree of influence of each of said control rules, which optimum degree corresponds to said number of said pre-measured workpieces obtained by said number data obtaining means, said compensating means determining said compensating value based on the determined optimum degree of influence, said plurality of control rules and said dimensional error data.

32. A method of processing a plurality of workpieces by a working system including (a) a working machine for performing a working operation on each of at least one working portion of each of said workpieces of at least one kind, to process said each working portion as desired, such that working operations on said plurality of workpieces take place successively one after another, (b) machine control means for determining a working condition of said machine on the basis of an extraneous signal, and controlling said machine according to the determined working condition, and (c) a post-process measuring device for measuring actual dimensions of the working portions of the workpieces processed by said machine, said method comprising the steps of:

obtaining a set of dimensional error data relating to a dimensional error of the processed working portions of the workpieces, for each of said at least one kind of the workpieces, on the basis of outputs of said post-process measuring device;

obtaining the number of pre-measured workpieces of each of said at least one kind which have been processed by said machine and which have not been measured by said post-process measuring device;

determining as said extraneous signal a compensating value for said each kind of the workpieces, on the basis of said set of dimensional error data and said number of said pre-measured workpieces of the corresponding kind which have been obtained by said dimensional data obtaining means and said number data obtaining means, respectively; and applying said compensating value to said machine control means, to adjust said working condition of said machine for the workpieces of said each kind to be subsequently processed.

33. A feedback compensating apparatus for a working system including (a) a working machine for successively processing a plurality of workpieces, (b) machine control means for determining a working condition of said working machine on the basis of an extraneous signal, and controlling said working machine according to the determined working condition, and (c) a post-process measuring device for measuring actual dimensions of working portions of the workpieces processed by said working machine, said working system permitting existence between said machine and said measuring device, of at least one pre-measured workpiece which has been processed by said machine and which has not been measured by said measuring device, said feedback compensating apparatus being used with said machine control means and said measuring device, said apparatus comprising:

determining means for determining as said extraneous signal a compensating value for adjusting said working condition of said working machine for the workpieces to be processed subsequently by said machine, on the basis of the actual dimensions of the working portions of the workpieces which have been measured by said measuring device, said determining means updating said compensating value from time to time on an intermittent basis while said workpieces processed by said machine are measured successively by said measuring device, such that said determining means changes said compensating value from a last value to a present value, only after a first one of the workpieces processed by said machine under the working condition adjusted by said last value has been measured by said measuring device, whereby said compensating value is not updated for a period after said last value is determined and before said first one of the workpieces has been measured; and applying means for applying said compensating value to said machine control means.

34. A feedback compensating apparatus according to claim 33, wherein said determining means includes memory means for storing measured values of said actual dimensions of the processed workpieces obtained by said measuring device, and determines a present value of said compensating value on the basis of a predetermined number of said measured values stored in said memory means, when the number of said measured values stored in said memory means has become equal to or larger than said predetermined number, said determining means clearing said memory means and resuming an operation to store therein said measured values obtained by said measuring device, after completion of determination of said present value.

35. A feedback compensating apparatus according to claim 33, wherein said determining means includes memory means for storing measured values of said actual dimensions of the processed workpieces obtained by said measuring device, and determines a present value of said compensating value on the basis of a predetermined number of said measured values stored in said memory means, when the number of said measured values stored in said memory means has become equal to or larger than said predetermined number, said determining means clearing said memory means and resuming an operation to store therein said measured values obtained by said measuring device, after a moment when said measuring device has measured a first one of the workpieces processed by said machine under the working condition adjusted by said present value.

36. A feedback compensating apparatus for a working system including (a) a working machine for successively processing a plurality of workpieces, (b) machine control means for determining a working condition of said working machine on the basis of an extraneous signal and controlling said working machine according to the determined working condition, and (c) a post-process measuring device for measuring actual dimensions of working portions of the workpieces processed by said working machine, said working system permitting existence between said machine and said measuring device, of at least one pre-measured workpiece which has been processed by said machine and which has not been measured by said measuring device, said feedback compensating apparatus being used with said machine control means and said measuring device, said apparatus comprising:

determining means for determining, as said extraneous signal a compensating value for adjusting said working condition of said working machine for the workpieces to be processed subsequently by said machine, on the basis of the actual dimensions of the working portions of the workpieces which have been measured by said measuring device, said determining means updating said compensating value from time to time on an intermittent basis while said workpieces processed by said machine are measured successively by said measuring device, such that said determining means changes said compensating value from a last value to a present value, only after a first one of the workpieces processed by said machine under the working condition adjusted by said last value has been measured by said measuring device, whereby said compensating value is not updated for a period after said last value is determined and before said first one of the workpieces has been measured; and applying means for applying said compensating value to said machine control means, wherein said determining means includes memory means for storing measured values of said actual dimensions of the processed workpieces obtained by said measuring device, said determining means effects primary compensation and auxiliary compensation to update said compensating value, said primary compensation including determining a primary compensating value on the basis of a predetermined first number of said measured values stored in said memory means, when the number of said measured values stored in said memory means has become equal to said predetermined first number, said auxiliary compensation including continuing to store said measured values in said memory means even after completion of determination of said primary compensating value, and determining a present provisional compensating value on the basis of a predetermined second number of said measured values stored in said memory means, when each of the processed workpiece is measured by said measuring device, during a time period between a moment of the completion of determination of said primary compensating value and a moment not later than a moment when a workpiece immediately preceding a first one of the workpieces processed by said machine under the working condition adjusted by said primary compensating value has been measured by said measuring device, said determining means determining as a final auxiliary compensating value a difference of said present provisional compensating value from a last provisional compensating value which immediately precedes said present provisional compensating value, said primary compensating value being used as said last provisional compensating values upon determination of said final auxiliary compensating value for the first time, said determining means clearing said memory means and resuming an operation to store therein said measured values obtained by said measuring device, after a moment when said measuring device has measured said first one of the workpieces, said applying means applying said primary compensating value and said final auxiliary compensating values to said machine control means.

37. A feedback compensating apparatus according to claim 36, wherein said determining means includes a counter for counting the number of said final auxiliary compensating values successively determined in said auxiliary compensation, said determining means terminating said auxiliary compensation if a sum of at least a predetermined number of said final auxiliary compensating values when the counted number of the determined final auxiliary compensating values has become equal to said predetermined number, is not substantially equal to zero, and continuing said auxiliary compensation with said counter cleared, if said sum is substantially zero.

38. A feedback compensating apparatus for a working system including (a) a working machine for successively processing a plurality of workpieces, (b) machine control means for determining a working condition of said working machine on the basis of an extraneous signal, and controlling said working machine according to the determined working condition, and (c) a post-process measuring device for measuring actual dimensions of working portions of the workpieces processed by said working machine, said working system permitting existence between said machine and said measuring device, of at least one pre-measured workpiece which has been processed by said machine and which has not been measured by said measuring device, said feedback compensating apparatus being used with said machine control means and said measuring device, said apparatus comprising:

determining means for determining, as said extraneous signal, a compensating value for adjusting said working condition of said working machine for the workpieces to be processed subsequently by said machine, on the basis of the actual dimensions of the working portions of the workpieces which have been measured by said measuring device, said determining means updating said compensating value from time to time on an intermittent basis while said workpieces processed by said machine are measured successively by said measuring device, such that said determining means changes said compensating value from a last value to a present value, only after a first one of the workpieces processed by said machine under the working condition adjusted by said last value has been measured by said measuring device, whereby said compensating value is not updated for a period after said last value is determined and before said first one of the workpieces has been measured; and applying means for applying said compensating, value to said machine control means, wherein said determining means includes memory means for storing measured values of said actual dimensions of the processed workpieces obtained by said measuring device, and determines a present value of said compensating value on the basis of a predetermined number of said measured values stored in said memory means, when the number of said measured values stored in said memory means has become equal to or larger than said predetermined number, said determining means clearing said memory means after completion of determination of said present value, said determining means obtaining an estimated value of said actual dimensions of the workpieces, on the basis of said present value of said compensating value and a present one of said measured values, when each of the processed workpieces is measured by said measuring device to obtain said present one of said measured values, during a time period between a moment when said operation to store said measured values in said memory means is resumed and a moment not later than a moment when a workpiece immediately preceding a first one of the workpieces processed by said machine under the working condition adjusted by said present value of said compensating value has been measured by said measuring device, said determining means determining said estimated value as a dimension of the workpiece which would be measured by said measuring device if said workpiece were processed under the working condition of said machine adjusted by said present value of said compensating value, said determining means storing said estimated value in said memory means, as said actual dimension of said workpiece, immediately preceding said first one of the workpieces, each time said estimated value is obtained during said time period.

39. A feedback compensating apparatus for a working system including (a) a working machine for successively processing a plurality of workpieces, (b) machine control means for determining a working condition of said working machine on the basis of an extraneous signal, and controlling said working machine according to the determined working condition, and (c) a post-process measuring device for measuring actual dimensions of working portions of the workpieces processed by said working machine, said working system permitting existence between said machine and said measuring device, of at least one pre-measured workpiece which has been processed by said machine and which has not been measured by said measuring device, said feedback compensating apparatus being used with said machine control means and said measuring device, said apparatus comprising:

determining means for determining, as said extraneous signal, a compensating value for adjusting said working condition of said working machine for the workpieces to be processed subsequently by said machine, on the basis of the actual dimensions of the working portions of the workpieces which have been measured by said measuring device, said determining means updating said compensating value from time to time on an intermittent basis while said workpieces processed by said machine are measured successively by said measuring device, such that said determining means chances said compensating value from a last value to a present value, only after a first one of the workpieces processed by said machine under the working condition adjusted by said last value has been measured by said measuring device, whereby said compensating value is not updated for a period after said last value is determined and before said first one of the workpieces has been measured; and applying means for applying said compensating value to said machine control means, wherein said determining means includes memory means for storing measured values of said actual dimensions of the processed workpieces obtained by said measuring device, said determining means effects primary compensation and auxiliary compensation to update said compensating value, said primary compensation including determining a primary compensating value on the basis of a predetermined first number of said measured values stored in said memory means, when the number of said measured values stored in said memory means has become equal to or larger than said predetermined first number, said auxiliary compensation including continuing to store said measured values in said memory means even after completion of determination of said primary compensating value, and determining a present provisional compensating value on the basis of a predetermined second number of said measured values stored in said memory means, when each of the processed workpieces is measured by said measuring device, during a time period between a moment of the completion of determination of said primary compensating value and a moment not later than a moment when a workpiece immediately preceding a first one of the workpieces processed by said machine under the working condition adjusted by said primary compensating value has been measured by said measuring device, said determining means determining as a final auxiliary compensating value a difference of said present provisional compensating value from a last provisional compensating value which immediately precedes said present provisional compensating value, said primary compensating value being used as said last provisional compensating values upon determination of said final auxiliary compensating value for the first time, said determining means clearing said memory means after completion of said auxiliary compensation, and obtaining an estimated value of said actual dimensions of the workpieces, on the basis of said final auxiliary compensating value and a present one of said measured values, when each of the processed workpieces is measured by said measuring device to obtain said present one of said measured values, during a time period between a moment when said operation to store said measured values in said memory means is resumed and a moment not later than a moment when a workpiece immediately preceding a first one of the workpieces processed by said machine under the working condition adjusted by said primary compensating value has been measured by said measuring device, said determining means determining said estimated value as a dimension of the workpiece which would be measured by said measuring device if said workpiece were processed under the working condition of said machine adjusted by said present value of said compensating value, said determining means storing said estimated value in said memory means each time said estimated value is obtained during said time period, said applying means applying said primary compensating value and said final auxiliary compensating value to said machine control means.

40. A feedback compensating apparatus according to claim 39, wherein said determining means includes a counter for counting the number of said final auxiliary compensating values successively determined in said auxiliary compensation, said determining means terminating said auxiliary compensation if a sum of at least a predetermined number of said final auxiliary compensating values when the counted number of the determined final auxiliary compensating values has become equal to said predetermined number, is not substantially equal to zero, and continuing said auxiliary compensation with said counter cleared, if said sum is substantially zero.

41. A method of processing a plurality of workpieces by a working system including (a) a working machine for successively processing the workpieces, (b) machine control means for determining a working condition of said working machine on the basis of an extraneous signal, and controlling said working machine according to the determined working condition, and (c) a measuring device for measuring actual dimensions of working portions of the workpieces processed by said working machine, said working system being adapted to permit existence between said machine and said measuring device, of at least one pre-measured workpiece which has been processed by said machine and which has not been measured by said measuring device, said method comprising the steps of:

determining as said extraneous signal a compensating value for adjusting said working condition of said working machine for the workpieces to be processed subsequently by said machine, on the basis of the actual dimensions of the working portions of the workpieces which have been measured by said measuring device, said determining means updating said compensating value from time to time on an intermittent basis while said workpieces processed by said machine are measured successively by said measuring device, such that said compensating value is changed from a last value to a present value, only after a first one of the workpieces processed by said machine under the working condition adjusted by said last value has been measured by said measuring device, whereby said compensating value is not updated for a period after said last value is determined and before said first one of the workpieces has been measured; and applying said compensating value to said machine control means.

42. A feedback compensating apparatus for a working system including a working machine for successively processing the workpieces, and machine control means for determining a working condition of said working machine on the basis of an extraneous signal, and controlling said working machine according to the determined working condition, the apparatus comprising;

a post-process measuring device for measuring actual dimensions of working portions of the workpieces processed by said working machine compensating;

said post-process measuring device being positioned relative to said working machine such that there exists at least one pre-measured workpiece which has been processed by said machine and which has not been measured by said post-process measuring device;

manual compensating means for effecting a manual adjustment of said working condition of said machine, said manual compensating means for determining as said extraneous signal a manual compensating value to adjust said working condition of said machine, in response to manual compensating data entered by an operator of said machine, said manual compensating means for applying said manual compensating value to said machine control means; and automatic compensating means for effecting an automatic adjustment of said working condition, said automatic compensating means including means for determining also as said extraneous signal an automatic compensating value for adjusting said work condition of said machine for the workpieces to be processed subsequently by said machine, on the basis of the actual dimensions of the working portion of the workpieces which have been measured by said post-process measuring device, said automatic compensating means for applying said automatic compensating value to said machine control means, said automatic compensating means including means for interrupting an operation to effect said automatic adjustment when said manual adjustment by said manual compensating means is started, and for resuming said operation to effect said automatic adjustment, at a moment not earlier than a moment when a first one of the workpieces processed by said machine under the working condition adjusted by said manual compensating value has been measured by said measuring device.

43. A feedback compensating apparatus according to claim 42, wherein said automatic compensating means includes memory means for storing the dimensions of the processed workpieces which are successively measured by said measuring device, said automatic compensating means determining said automatic compensating value on the basis of the dimension of the workpiece measured last by said measuring device, and at least one dimension previously measured and stored in said memory means, said automatic compensating means resuming the operation to effect said automatic adjustment by storing the dimensions to be subsequently measured with said memory means cleaned, at said moment not earlier than said moment when said first one of the workpiece has been measured.

44. A feedback compensating apparatus for a working system including a working machine for successively processing workpieces, machine control means for determining a working condition of said working machine on the basis of an extraneous signal, and controlling said working machine according to the determined working condition, and a measuring device for measuring actual dimensions of working portions of the workpieces processed by said working machine, said feedback compensating apparatus being used with said machine control means and said measuring device, said apparatus comprising:

determining means for determining as said extraneous signal a compensating value for adjusting said working conditions of said machine for the workpieces to be processed subsequently by said machine, on the basis of the actual dimensions of the working portion of the workpieces which have been measured by said measuring device, and according to a compensation rule which chances with a change in a dynamic variation amount of measured values of said actual dimensions successively obtained by said measuring device; and applying means for applying said compensating value to said machine control means;

wherein said determining means determines said compensating value such that said dynamic variation amount of said measured values of said actual dimensions successively obtained by said measuring device is represented by a derivative of said dimensional error of the workpieces obtained by said data obtaining means, said derivative representing a gradient of a straight line approximating said measured values of said actual dimensions.

45. A method of processing a plurality of workpieces by a working system including a working machine for successively processing the workpieces, machine control means for determining a working condition of said working machine on the basis of an extraneous signal, and controlling said working machine according to the determined working condition, and a measuring device for measuring actual dimensions of working portions of the workpieces processed by said working machine, said method comprising the steps of:

determining as said extraneous signal a compensating value for adjusting said working condition of said machine for the workpieces to be processed subsequently by said machine, on the basis of the actual dimensions of the working portion of the workpieces which have been measured by said measuring device, and according to a compensation rule which changes with a change in a dynamic variation amount of measured values of said actual dimensions successively obtained by said measuring device; and applying said compensating value to said machine control means;

wherein said step of determining said compensating value comprises determining said compensating value such that said dynamic variation amount of said measured values of said actual dimensions successively obtained by said measuring device is represented by a derivative of said dimensional error of the workpieces obtained by said data obtaining means, said derivative representing a gradient of a straight line approximating said measured values of said actual dimensions.

* * * * *

UNITED STATES PATENT AND TRADEMARK OFFICE
CERTIFICATE OF CORRECTION

PATENT NO.      : 6,415,200 B1
APPLICATION NO. : 08/016979
DATED           : July 2, 2002
INVENTOR(S)     : Chisato Kato et al.

It is certified that error appears in the above-identified patent and that said Letters Patent is hereby corrected as shown below:

Front page - delete "(*) Notice: This patent issued on a continued prosecution application filed under 37 C.F.R. § 1.53(d), and is subject to the twenty year patent term provisions of 35 U.S.C. § 154(a)(2)"; and insert therefor:

--(*) Notice: This patent issued on an application that was filed prior to June 8, 1995, and is subject to the longer term of twenty years from the U.S. filing date or seventeen years from the issue date.--

In claim 1, column 75, line 61, "Post-Process" should read --post-process--.

In claim 9, column 77, line 33, before "derivative", delete "second".

In claim 12, column 78, line 60, "mans" should read --means--.

In claim 13, column 79, line 9, "chances" should read --changes--.

In claim 15, column 79, line 34, "where in s aid" should read --wherein said--.

In claim 22, column 81, line 19, "mans" should read --means--.

In claim 39, column 91, line 7, "chances" should read --changes--.

In claim 41, column 92, line 30, before "measuring device", insert --post-process--; and
line 46, after "machine", insert --and existing between said machine and said measuring device--.

UNITED STATES PATENT AND TRADEMARK OFFICE
CERTIFICATE OF CORRECTION

PATENT NO.       : 6,415,200 B1
APPLICATION NO. : 08/016979
DATED            : July 2, 2002
INVENTOR(S)      : Chisato Kato et al.

It is certified that error appears in the above-identified patent and that said Letters Patent is hereby corrected as shown below:

In claim 44, column 94, line 12, "chances" should read --changes--.

Signed and Sealed this

Eighteenth Day of September, 2007

JON W. DUDAS
*Director of the United States Patent and Trademark Office*